(12) United States Patent
Voronov et al.

(10) Patent No.: US 7,277,127 B2
(45) Date of Patent: Oct. 2, 2007

(54) IMAGER FLICKER COMPENSATION SYSTEMS AND METHODS

(75) Inventors: German Voronov, Bat-Yam (IL); Eugene Fainstain, Netania (IL)

(73) Assignee: TransChip, Inc., Ramat-Gan (IL)

( * ) Notice: Subject to any disclaimer, the term of this patent is extended or adjusted under 35 U.S.C. 154(b) by 0 days.

(21) Appl. No.: 11/223,758

(22) Filed: Sep. 9, 2005

(65) Prior Publication Data
US 2006/0054783 A1    Mar. 16, 2006

Related U.S. Application Data

(60) Provisional application No. 60/609,195, filed on Sep. 9, 2004.

(51) Int. Cl.
*H04N 9/73* (2006.01)
*G01J 1/44* (2006.01)

(52) U.S. Cl. .............................. 348/226.1; 348/228.1; 250/214 C

(58) Field of Classification Search .............. 348/226, 348/227.1, 228.1; 250/214 C
See application file for complete search history.

(56) References Cited

U.S. PATENT DOCUMENTS

| 2004/0012692 A1* | 1/2004 | Arazaki | 348/226.1 |
| 2004/0179114 A1* | 9/2004 | Silsby et al. | 348/226.1 |

* cited by examiner

*Primary Examiner*—Thanh X. Luu
*Assistant Examiner*—Brian J Livedalen
(74) *Attorney, Agent, or Firm*—Townsend and Townsend and Crew LLP

(57) ABSTRACT

A method of capturing an image of a scene includes providing an imaging device having an array of pixels. Each pixel is configured to provide a pixel output. The method also includes determining a frequency of light produced by a light source illuminating the scene and capturing an image of the scene using the pixel array. A first capture time for one or more pixels in the array is different from a second capture time of one or more other pixels in the array. The method further includes, for each pixel in the array, determining a relative phase of the light with respect to the capture time of the pixel, determining a compensating gain based on the relative phase of the light and the frequency of the light, and adjusting the pixel output of the pixel in relation to the compensating gain.

12 Claims, 40 Drawing Sheets

IMAGER FLICKER COMPENSATION SYSTEMS AND METHODS

CROSS-REFERENCES TO RELATED APPLICATIONS

This application is a non-provisional of, and claims the benefit of, commonly assigned U.S. Provisional Patent Application No. 60/609,195, entitled "IMAGER FLICKER COMPENSATION," filed on Sep. 9, 2004, now abandoned which application is incorporated herein by reference for all purposes.

This application is related to co-pending, commonly assigned, U.S. patent application Ser. No. 10/474,798, entitled "CMOS IMAGER FOR CELLULAR APPLICATIONS AND METHODS OF USING SUCH", filed on Oct. 8, 2003, which is a nationalization of International Patent Application No. PCT/US02/17358, entitled "CMOS IMAGER FOR CELLULAR APPLICATIONS AND METHODS OF USING SUCH," filed on May 29, 2002, which application is a non-provisional of, and claims the benefit of, U.S. Provisional Application No. 60/294,388, entitled "CMOS IMAGER FOR CELLULAR APPLICATIONS," filed on May 29, 2001, the entire disclosure of each of which are incorporated herein for all purposes.

BACKGROUND OF THE INVENTION

The present invention relates generally to systems and methods for detecting and/or transmitting images. More particularly, the present invention relates to detecting and transmitting images in relation to a cellular telephone.

Image processors typically detect light reflected off of a subject, and convert the detected light to an electrical image. The electrical image is then sampled at a frequency that may be the reciprocal of the integration time. In many cases, such a frequency is different from the frequency of light reflected off the subject. In such cases, a modulation of the displayed image can result. Such modulation appears as a flicker and can be very distracting.

To overcome this problem, some image processors allow for manual selection between different integration times that allow a user to reduce the flicker. For example, where an image processor will be used in a 60 Hz and a 50 Hz lighting environment, a manual selection between an integration time associated with either 60 Hz or 50 Hz can be provided. This alleviates some flicker, but requires adjustment from a user. Furthermore, such an approach is limited to reducing flicker in a limited number of pre-determined environments, and thus may not be able to address various flicker situations. This is particularly problematic for mobile devices that are used in ever changing environments.

Further, a limited reservoir of power typically exists for mobile devices. As such, power consuming imaging applications are often incompatible with mobile devices. Various approaches exist to increase the amount of power available to mobile devices, such that the power requirements of an imaging application are not prohibitive. However, such approaches often are both expensive and can result in increased dimensions of a mobile device.

In some cases, light detected by an image processor is detected by a pixel array and a variety of analog processing circuitry. Output from the pixel array representing the amount of detected light is processed by analog circuitry to produce an image which is subsequently converted from the analog domain to the digital domain. The digital image is subsequently provided to a monitor of some sort for viewing.

Testing such an imaging device can include reflecting light off a known image, and determining if the image was properly acquired and/or processed by the imaging device. This method provides an effective approach for testing such devices, however, the method is subject to a number of variables including lighting and image stability which can effect testing of the imaging device. Providing such a test, and controlling for such variables can be costly and time consuming. Further, such an approach tests the imaging device holistically, and is limited in its ability to identify sub-components of the imaging device which may have failed.

Hence, for at least the aforementioned reasons, there exists a need in the art to provide advanced systems, methods and devices for detecting and/or transmitting images.

BRIEF SUMMARY OF THE INVENTION

The present invention provides systems, devices, and methods for imaging. More particularly, the present invention provides devices and methods for capturing images, formatting the images, and/or transmitting the images via a cellular telephone network or other wireless network.

Various aspects of the present invention include an imaging device with one or more of the following units: a control unit, a serial interface unit, a parallel interface unit, an imaging unit, and a translation unit. In some embodiments, flicker detection and/or correction functionality is incorporated. Additionally, in some embodiments, a built-in self test associated with various analog circuitry in the imaging device is included. Further, in some embodiments, systems and methods for reducing power consumption by various analog circuitry within the imaging device are included. Yet further, in some embodiments, a parallel to serial conversion unit and associated serial output interface are included. These and many other novel aspects of the present invention are provided in greater detail in the proceeding portions of this document.

One particular embodiment of the present invention provides an imaging device and methods for using such that provide for advanced testing ability. In one aspect, an imaging device includes a pixel array. The imaging device further includes a selector that is operable to select between an input derived from the pixel array and at least one reference input. Such selection between the input derived from the pixel array and the at least one reference input is based at least in part on a signal derived from a digital domain. Further, the imaging device includes an analog to digital converter that is operable to convert a signal derived from the selector to the digital domain. In some cases, such an embodiment provides an ability to verify the functionality of analog circuitry within the imaging device using a digital tester.

In some aspects of the embodiment, the output of the selector is passed through an analog processing circuit that can include one or more circuits selected from a group consisting of: a level shift circuit, a programmable offset circuit, and a programmable gain amplifier. In various aspects of the embodiment, the imaging device further comprises an analog processing selector that is operable to bypass one or more portions of the analog processing circuit. In other aspects, the imaging device further includes a comparator receiving an output from the analog to digital converter. Such a comparator is selected from a group consisting of: a programmable hardware comparator, a programmable software comparator, and a hardwired comparator.

In some aspects of the embodiment, the pixel array includes at least one pseudo-pixel, and the imaging device additionally includes a pixel array selector that is operable to select the pseudo-pixel such that input derived from the pixel array is derived from the pseudo-pixel. Other aspects include a column amplifier that receives and amplifies the output from the pseudo-pixel.

In some aspects, the reference input to the selector is a reset level that includes a pixel under reset condition, and the imaging device further includes a circuit for selecting the reset level and pairing it with an output from the pixel array. In this way, the selector is operable to provide a differential pair consisting of the input derived from the pixel array and the reset level. In other aspects, the reference input to the selector is tied to a pad of the imaging device, and in yet other aspects, the reference input to the selector comprises one or more voltages generated internal to the imaging device.

In other embodiments of the present invention, imaging devices and methods for using such are provided to detect and/or reduce image flicker. Such an imaging device includes an image sensor with one or more rows of pixels, where each of the pixels provides a pixel value. The device further includes a storage element and a summing circuit. Such a summing circuit can be a hardware summing circuit, either programmable or hardwired, or a software summing circuit including for example a programmable core. The summing circuit is operable to sum the pixel values for each of the one or more rows to create row sums, and to store the row sums to the storage element. In addition, the imaging device includes a programmable core that includes instructions executable by the programmable core to: determine a first energy value and a second energy value associated with the row sums; compare the first energy value and the second energy value to estimate a flicker frequency; and constrain an exposure duration associated with the image sensor to approximate a multiple of the flicker frequency. Such a programmable core can also be used for the summing circuit.

In some aspects of the embodiment, the summing circuit is further operable to calculate row sums for a plurality of frames, where each of the plurality of frames includes pixel values from one or more rows of pixels, and where the instructions are further executable by the programmable core to: determine a first energy value and a second energy value associated with the row sums for each frame; calculate a variance between first energy values across the plurality of frames; calculate a variance between second energy values across the plurality of frames; and wherein the comparing the first energy value and the second energy value to estimate a flicker frequency comprises comparing the variance of the first energy values with the variance of the second energy values. In yet other aspects of the embodiment, the instructions are further executable by the programmable core to: compare the variance of the first energy values with the variance of the second energy values, and to compare the greater variance with a predefined threshold where constraining the exposure frequency is done when the greater variance is greater than the predefined threshold.

In various aspects, a confidence counter is implemented to control switching from an exposure frequency to a multiple of an estimated flicker frequency. In such aspects, a change of frequencies can be limited to situations where the confidence counter changes sign.

In one particular aspect of the embodiment, the summing circuit is further operable to calculate row sums for a plurality of frames, wherein each of the plurality of frames includes pixel values from the two or more rows of pixels. Further, the imaging device further includes an interrupt associated with the summing circuit, wherein assertion of the interrupt indicates that summing for the two or more rows of pixels for a frame is complete; and wherein the instructions are further executable by the programmable core to: receive the interrupt; determine a first energy value and a second energy value associated with the row sums for each frame; determine if a sufficient number of frames have been received to calculate a variance between first energy values and a variance between second energy values; calculate the variance between first energy values across the plurality of frames; calculate the variance between second energy values across the plurality of frames; and wherein the comparing the first energy value and the second energy value to estimate a flicker frequency comprises comparing the variance of the first energy values with the variance of the second energy values.

Some aspects of the invention provide a method for automatically detecting flicker in an imaging device. The method includes providing an imaging device, wherein the imaging device includes an image sensor with two or more rows of pixels, and wherein each of the pixels provides a pixel value. In addition, the method includes retrieving at least a portion of the two or more rows of pixels, and summing the pixel values to create a row sum for each of the rows of pixels; and determining a first energy value and a second energy value associated with the row sums. The first and second energy values are compared to estimate a flicker frequency.

Various embodiments of the present invention include a pixel with a charge evacuation mechanism for reducing noise evident at the output of the pixel. In one aspect, the pixel includes a reset element used in relation to charging a light sensitive element. The evacuation mechanism is used to dissipate charge build up about the reset element. Dissipation of the charge results in a reduction of noise at the output of the pixel. In particular embodiments, such a pixel and/or charge evacuation mechanism is implemented using complementary metal oxide semiconductor ("CMOS"), field effect transistor ("FET") technology.

Further, aspects of the present invention include systems and methods for utilizing such pixels. More particularly, such methods include approaches for applying various control signals to the pixel and systems include elements for producing the various control signals.

One particular aspect of the invention provides a MOS pixel that includes a reset transistor with a reset drain and a reset gate. Further, the pixel includes a charge evacuation element that is electrically coupled to the reset drain and is operable to evacuate charge accumulated in a channel of the reset transistor. In some embodiments, the charge evacuation element is a MOS transistor with a charge evacuation drain, a charge evacuation source, and a charge evacuation gate. In particular cases, the charge evacuation source and the charge evacuation drain are both electrically coupled to the reset drain. In various embodiments, the pixel further includes a light sensitive element electrically coupled to the reset drain.

Further embodiments comprise a source follower transistor that includes a source follower gate and a source follower drain, the source follower gate being electrically coupled to the reset drain. Such embodiments further include a selection transistor with a selection drain, a selection source, and a selection gate, where the selection source is electrically coupled to the source follower drain. A selection signal is electrically coupled to the source gate such that assertion thereof causes a representation of a signal from the node of the light sensitive element to be present on an output of the pixel.

In some embodiments, the charge evacuation element is a MOS transistor with a charge evacuation source and a charge evacuation drain, both of which are coupled to the reset drain. The charge evacuation element further includes a charge evacuation gate. Further, such embodiments can include a reset signal driving the reset gate and a complement of the reset signal driving the charge evacuation gate. In some instances, the complement of the reset signal is delayed from the reset signal.

Other embodiments of the present invention provide a circuit including a reset transistor comprising a reset gate and a reset drain. The circuit further includes a photodiode with a node of the photodiode electrically coupled to the reset drain, and a charge evacuation transistor that includes a charge evacuation gate, a charge evacuation drain, and a charge evacuation source. The charge evacuation source and the charge evacuation drain are both electrically coupled to the reset drain and the charge evacuation transistor is operable to evacuate charge accumulated in a channel of the reset transistor.

Various embodiments of the circuit also include a source follower transistor comprised of a source follower gate and a source follower drain. The source follower gate is electrically coupled to the reset drain. the circuit further includes a selection transistor comprised of a selection source, a selection gate, and a selection drain. The selection source is electrically coupled to the source follower drain. A selection signal is provided that when asserted causes a representation of a signal from the photodiode to be present on an output of the pixel.

Yet other embodiments of the present invention provide an imaging system. Such an imaging system includes a group of pixel elements. One or more of the pixel elements includes a reset element, a charge evacuation element, and a light sensitive element. In some cases, the imaging system further includes an optical device, wherein the optical device transfers light to the group of pixel elements, and wherein the light strikes the light sensitive element of the pixel elements. In addition, a timing circuit is included that provides at least one control signal to the group of pixel elements. In one particular instance, the group of pixel elements are arranged in a rectangular array.

Yet another embodiment of the present invention provides an image sensor including a plurality of pixel devices. The plurality of pixel devices are arranged as a plurality of rows and a plurality of columns. Each of the pixel devices includes: a light detecting element, and a charge evacuation element for dissipating unwanted charge built up in the image sensor.

Yet additional embodiments provide methods for detecting an image. Such methods include providing a pixel device that comprises a charge evacuation element, and applying a charge evacuation control signal to the charge evacuation element, wherein a charge accumulation in a channel of a reset transistor of the pixel device is reduced.

Other embodiments provide systems and method for reducing power consumption in an imaging device. In one aspect, an imaging device is included with an image sensor and a sub-sample control system. The sub-sample control system is operable to identify one or more signals from the image sensor that are not processed. The imaging device further includes an analog processing circuit that receives the one or more signals from the image sensor at one or more inputs, and a processing control system that is operable to limit switching of the one or more inputs. In some aspects, the analog processing circuit comprises a column amplifier that receives the one or more inputs. In various aspects, the analog processing circuit comprises a level shift circuit, and/or a programmable or black offset circuit.

In some aspects, the processing control system is operable to maintain a common mode feedback loop of an amplifier associated with the analog processing circuit in an active state, while limiting switching of the one or more inputs. In other aspects, the imaging device further includes a digital processing circuit, and the processing control system is further operable to disable the digital processing circuit.

Yet other embodiments of the present invention provide a CMOS imager that includes an image sensor, and a parallel to serial data conversion unit. The parallel to serial data conversion unit receives an image derived from the image sensor and converts the image to a serial data stream. The serial data stream is output via a serial output interface. In some aspects of the embodiment, the image sensor comprises one or more pixels, and wherein the one or more pixels include a charge evacuation element. in other aspects, the serial output interface includes a clock signal and a data signal. The clock signal is only active when valid data is presented on the data signal. In yet other aspects, the serial output includes a clock signal, a data signal, and a qualifying signal. The qualifying signal indicates the presence of valid data on the data signal.

Still other embodiments provide a method of capturing an image of a scene. The method includes providing an imaging device having an array of pixels. Each pixel is configured to provide a pixel output. The method also includes determining a frequency of light produced by a light source illuminating the scene and capturing an image of the scene using the pixel array. A first capture time for one or more pixels in the array is different from a second capture time of one or more other pixels in the array. The method further includes, for each pixel in the array, determining a relative phase of the light with respect to the capture time of the pixel, determining a compensating gain based on the relative phase of the light and the frequency of the light, and adjusting the pixel output of the pixel in relation to the compensating gain. The imaging device may be a CMOS imaging device. Determining a frequency of light produced by a light source illuminating the scene may include capturing an image of a generally uniform scene and determining a variation between pixel outputs for one or more pixels in the array of pixels. Determining a compensating gain based on the relative phase of the light and the frequency of the light also may include determining a compensating gain based on a color associated with the pixel. Determining a frequency of light produced by a light source illuminating the scene may include calculating a sum of pixel outputs for a plurality of pixels in a row of pixels and spectrally analyzing the sum. Calculating at least two energy values associated with the sum may include comparing the at least two energy values.

In still other embodiments, an image capture device includes an array of pixels. Each pixel is configured to provide a pixel output. The device also includes a programmable core. The programmable core includes instructions executable by the programmable core to determine a frequency of light produced by a light source illuminating a scene and cause the pixel array to capture an image of the scene. A first capture time for one or more pixels in the array is different from a second capture time of one or more other pixels in the array. The core also includes instructions executable by the programmable core to, for each pixel in the array, determine a relative phase of the light with respect to the capture time of the pixel, determine a compensating gain based on the relative phase of the light and the frequency of the light, and adjust the pixel output of the pixel in relation to the compensating gain. The image capture device may be a CMOS image capture device. In programming the core to determine a frequency of light produced by a light source illuminating the scene, the instructions may program the core to capture an image of a generally uniform scene and determine a variation between pixel outputs for one or more pixels in the array of pixels. In programming the core to determining a compensating gain based on the relative phase of the light and the frequency of the light, the instructions may program the core to determine a compensating gain based on a color associated with the pixel. In programming the core to determine a frequency of light produced by a light source illuminating the scene, the instructions may program the core to calculate a sum of pixel outputs for a plurality of pixels in a row of pixels and spectrally analyze the sum. In programming the core to determine a frequency of light produced by a light source illuminating the scene, the instructions may further program the core to calculate at least two energy values associated with the sum and compare the at least two energy values.

In still other embodiments, an image capture device includes an array of pixels. Each pixel is configured to provide a pixel output. The device also includes means for determining a frequency of light produced by a light source illuminating a scene, means for determining a phase of the light relative to a pixel capture time, means for determining a compensating gain for each pixel in the array based on the frequency and the phase, and means for adjusting each pixel's pixel output, during an image capture, in relation to the pixel's compensating gain. The image capture device may be a CMOS image capture device. The means for determining a frequency of light produced by a light source illuminating the scene may include means for capturing an image of a generally uniform scene and means for determining a variation between pixel outputs for one or more pixels in the array of pixels. Each pixel of the array may include a plurality of sub-pixels, in which case the image capture device may include means for determining a compensating gain for each sub-pixel of each pixel. The means for determining a frequency of light produced by a light source illuminating the scene may include means for calculating a sum of pixel outputs for a plurality of pixels in a row of pixels and means for spectrally analyzing the sum. The means for determining a frequency of light produced by a light source illuminating the scene may include means for calculating at least two energy values associated with the sum and means for comparing the at least two energy values.

These and other aspects are more fully developed in the detailed description below. Thus, the summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

A further understanding of the nature and advantages of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
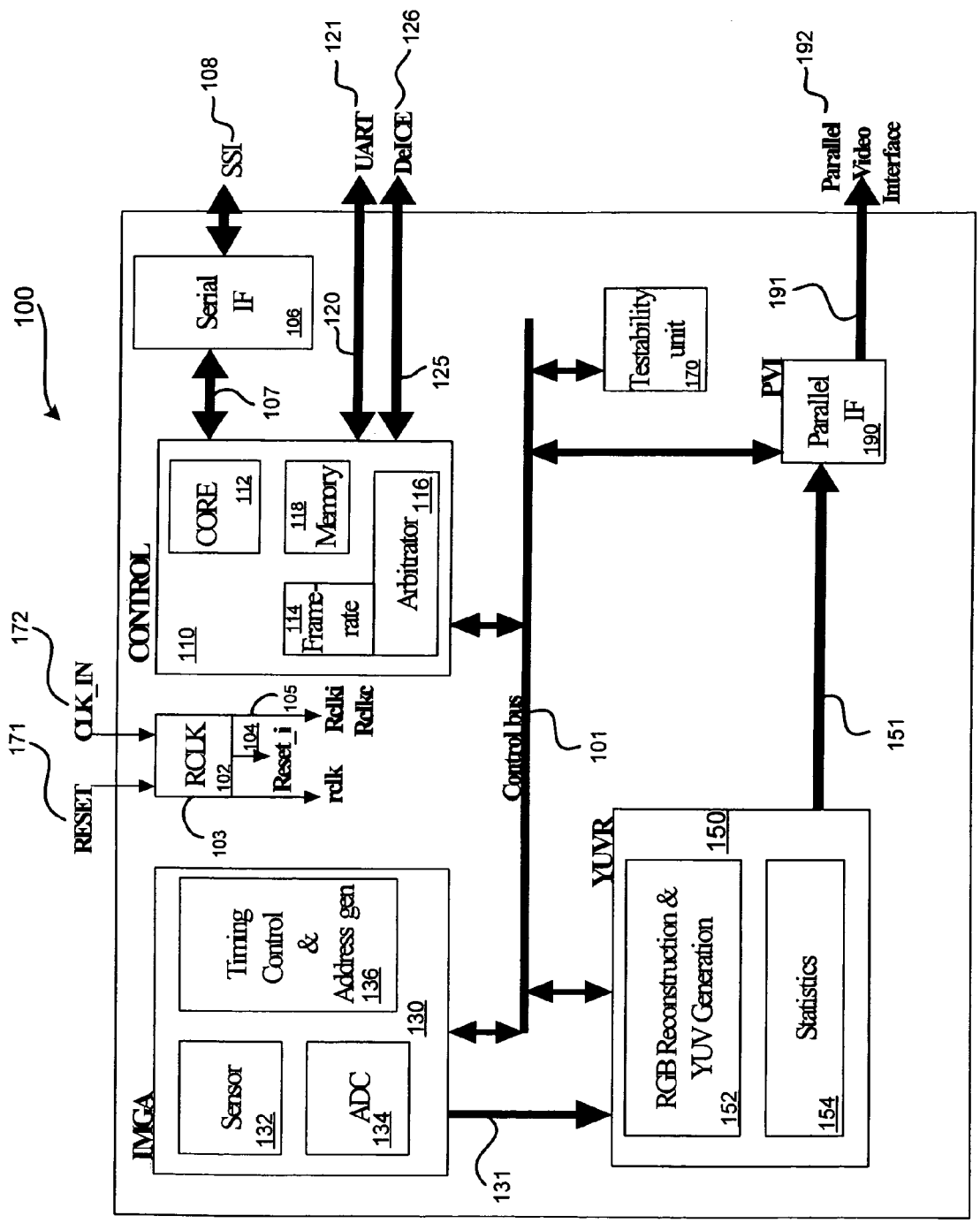
FIG. 1 is a block diagram of a CMOS imager in accordance with various embodiments of the present invention.

The present invention provides systems, devices, and methods for imaging. More particularly, the present invention provides devices and methods for capturing images, formatting the images, and/or transmitting the images via a cellular telephone network or other wireless network.

In one particular embodiment of the present invention, an imaging device including a CMOS sensor is provided. The imaging device includes an imager array, sensor timing control, and image processing algorithms integrated onto a single chip. Such an imaging device can produce CIF (i.e., 352×288) resolution image for still capture, and QCIF (i.e., 176×144) resolution image for video applications. In addition, the imaging device can perform various correction algorithms on a captured image to create a corrected YCrCb (4:2:2) image.

In an embodiment, the imager array is 384×316 physical pixels including 376×296 active pixels. The pixels can be mapped to a configurable size of output Bayer grid array (e.g., windowing). Pixel size can be 6.4 µm×6.4 µm. QCIF resolution can be created by either or both of down-sampling and filtering.

In some embodiments, a resulting Bayer grid (raw RGB output) or a recreated YCrCb image is sent out on a digital ten (10) bit parallel interface. The ten (10) bit parallel interface provides access to a captured video image on a line by line basis. In addition, an output clock and other qualifying signals are provided in association with the ten (10) bit parallel interface.

The imaging device can include electronic exposure control from 375 nsec up to a full frame (e.g., 33.33 msec at a maximum frame rate of thirty frames per second). Further, automatic dark level offset, a separate gain for each of the color components, and configurable offset for dynamic range stretching, as well as, image enhancement algorithms can be provided. Such image enhancement algorithms can include black level offset, fault pixel correction, color interpolation, color and white balance correction, gamma correction, and/or auto exposure and auto white balance algorithms. In addition, noise reduction processes can be applied to reduce noise in general, and fixed pattern noise ("FPN") in particular.

The imaging device can operate on a single 2.8 volt power supply and a reduced-power mode can be implemented to reduce power consumption when full operation of the imaging device is not necessary. In addition, the imaging device can include a sleep mode for further reducing power consumption.

In some embodiments, the imaging device is designed for use under the control of an external processor, which in some cases is a Digital Signal Processor. The external processor can act as a system host ("Host"). As such, the external processor controls the mode of the imaging device, monitors system status, and compresses an output image stream. For example, the external processor can control the frame-rate, the size of the requested image, and several registers for image processing, such as gamma-correction and gain registers. Such control can be provided via a programmable core integrated with the imaging device.

Block Diagram

FIG. 1 illustrates a block diagram of an imaging device 100 in accordance with embodiments of the present invention. Imaging device 100 includes a serial interface unit 106, a control unit 110, an imaging unit 130, a translation unit 150, a testability unit 170, and a parallel interface unit 190. The various units are electrically coupled via a control bus 101, an image bus 131, a translation bus 151, a parallel interface bus 191, a UART bus 120, a DeICE bus 125, and a serial bus 107. Inputs and outputs to/from imaging device 100 can be provided via an I2C input/output ("I/O") 108, a UART I/O 121, a DeICE I/O 126, and/or a parallel video interface 192. In addition, imaging device 100 includes a clock unit 102 with a reset 171 and a clock 172 input.

Serial Interface

In one embodiment, serial I/O 108 includes a clock and data input. Such a serial interface can be used to program various registers of imaging device 100. Various different serial interface types that are known in the art can be incorporated into imaging device 100 in accordance with the present invention.

Control Unit

Control unit 110 implements parameters used in relation to the different units within imaging device 100, and calculates various parameters for image enhancement. In some embodiments, control unit 110 includes a programmable processor core 112, and in one particular embodiment, programmable processor core 112 is a 80186Turbo processor core. Control unit 110 also includes a core memory 118, and interface hardware (not shown) to UART I/O 121 and DeICE 126 I/O. Further, control unit 110 includes an arbitrator 116 for controlling access to control bus 101, and a frame-rate mechanism 114 for controlling the frame rate output video images from imaging device 100.

Via arbitrator 116, programmable processing core 112, serial I/O 108, UART I/O 121, and/or DeICE I/O 126 can access registers maintained on imaging device 100 over control bus 101. In one particular embodiment, when programmable processing core 112 is disabled by, for example, entering a clock disable mode, serial I/O 108 is granted immediate access to control bus 101 without adhering to an arbitration scheme implemented by arbitrator 116. Such a clock disable mode is discussed in more detail with reference to clock unit 102. For purposes of the immediate discussion, clock unit 102 produces a control line that indicates if programmable processing core 112 is active, or if it is held in reset mode or has its clock shut down. Alternatively, when programmable processing core 112 is active, arbitrator 116 grants access to control bus 101 according to a determined priority scheme. One such priority scheme is described in the 80186Turbo reference manual.

Programmable processor core 112 serves as the main control source for imaging device 100, controlling other units via control bus 101. Such control can be provided by manipulating address, data and read/write signals associated with control bus 101. As just one example, programmable processing core 112 sets up the working mode of imaging device 100 according to the parameters that are received from a host (not shown) via serial I/O 108, UART I/O 121, and/or DeICE I/O 126. In addition, programmable processing core 112 can regulate the operation of the various units within imaging device 100.

In one particular embodiment, programmable processor core 112 supports a twenty-bit address memory space for data and program memories, and a fourteen-bit address spaced for I/O mapped peripherals. In other embodiments, only a twelve-bit memory space and an eight-bit I/O space (program and data) are supported.

Programs controlling the operation of imaging device 100 can be loaded to core memory 118 via serial I/O 108, and/or via UART I/O 121. Once the program is loaded, control unit 110 calculates and updates various image processing parameters according to a selected working mode. After a complete frame is read from imaging unit 130 and processed by translation unit 150, control unit 110 reads statistical results of the frame, and produces the exposure, gain and auto-white balance parameters for the next frames. In this way, control unit 110 continuously monitors operation of imaging device 100 and modifies such operation to assure that it conforms to the downloaded program.

In one particular embodiment, various parameters associated with the operation of imaging device 100 are written to registers associated with the various units within imaging device 100. Such a process can be performed by writing the parameters to core memory 118, after which programmable processing core 112 writes the values to registers maintained within the various units to which the parameters pertain. Alternatively, such parameters can be written directly to the various units by the Host. To facilitate such processes, imaging unit 130, translation unit 150, and parallel interface unit 190 can include double buffered registers so that parameters can be loaded into such registers at any time without interfering with continuing processes.

Imaging device 100 operates in a default standby mode, with sensor 132 turned off and translation unit 150 and parallel interface unit 190 inactive. Once the program is loaded, control unit 110 awaits instructions from the Host. The Host can pass commands to control unit 110 by writing to memory 118 at HOST-FIFO address space. After writing data to the HOST-FIFO address space, the Host can activate an interrupt to programmable processing core 112. Programmable processing core 112 then reads the data and responds according to the instructions.

Once the frame counters are active, a vertical synchronization interrupt signal ("VSYNC") is asserted every time a frame boundary for an image is detected. VSYNC is used by programmable processing core 112 to govern software frame-rate control, or by frame-rate mechanism 114 to govern hardware frame-rate control. When an image is being processed by imaging device 100, statistics are collected in translation unit 150. At the end of a frame processing, translation unit 150 activates an interrupt signal, END_TRANSLATION, indicating that programmable processing core 112 can read the statistics from translation unit 150. Programmable processing core 112 utilizes these statistics to calculate exposure, gain and color processing parameters for the next frames. In some embodiments, such calculations are provided in accordance with auto-exposure, auto-white-balance, and/or dynamic range algorithms. The calculations result in a new set of parameters that are written by control unit 110 to registers maintained in association with imaging unit 130 and translation unit 150 before the following VSYNC.

Further, control unit 110 can be interrupted by either or both of UART I/O 121 and serial I/O 108. Such interrupts are generally processed as soon as programmable processing core 112 becomes available. Reasonable response time to such interrupts helps assure that the I/O pipelines do not become overfilled. The following Table 1 lists a series of tasks completed as imaging device 100 is programmed and started.

TABLE 1

Imaging Device Tasks

| EVENT | Task | Comments |
|---|---|---|
| Reset | Programmable processing core 112 is frozen | |
| Deassert Reset | | |
| | Execute boot program - check configuration register. If boot from UART I/O 121, wait for UART message. If from serial I/O 108, program is loaded, and can subsequently be executed. According to program, initiate registers and activate imager frame counters. | |
| VSYNC Asserts | Interrupt processes. Activate translation unit 150 for next frame. Execute frame-rate control routine. | First frame exposure has started, no image is being read out. |
| VSYNC Asserts | Interrupt processes. | |
| | Execute frame-rate control routine | Image is being sent from imaging unit 130 to translation unit 150 in accordance with a frame-rate control. |

TABLE 1-continued

Imaging Device Tasks

| EVENT | Task | Comments |
|---|---|---|
| END_TRANSLATION Asserts | Interrupt processes. | |
| | Read statistics results from translation unit 150. Calculate gain and offset for imaging unit 130. Calculate exposure parameters, white balance correction, and color correction matrix. Write calculated parameters to various units. | The algorithm defines the sequence of the calculations. In some instances, not all calculations are performed for every frame. |
| VSYNC Asserts | Interrupt processes. Execute frame-rate control routine. | |

In one embodiment, programmable processing core 112 includes six interrupts. Such interrupts can include, but are not limited to, two software timer interrupts used for timeout purposes, and interrupts associated with UART I/O 121 and serial I/O 108. Additionally, VSYNC and END_TRANS-LATION are provided. As previously discussed, VSYNC indicates a frame boundary has been detected, and END_TRANSLATION indicates that translation unit 150 has completed processing a frame. Upon assertion of END_TRANSLATION, translation has gathered and/or calculated various statistics associated with the processed frame that can now be read and utilized by programmable processing core 112.

Programmable processing core 112 utilizes the statistics to perform one or more of the following algorithms: auto exposure (e.g., exposure parameters calculation), auto white balance (e.g., white balance coefficients calculation and/or full color matrix calculation), and dynamic range stretching, (e.g., gain and offset calculations). Thus, for example, if the auto-exposure and auto-white-Balance options are enabled, the parameters calculated by programmable processing core 112 in relation to such controls are passed to imaging unit 130 where they are used to control exposure and processing of subsequent image frames.

In addition, programmable processing core 112 can turn its own clock off by writing to a disable clock register maintained in clock unit 102. In some embodiments, the clock is turned back on whenever any activity is detected on a receive pin associated with UART I/O 121, or if any interrupt signal is activated. Disabling programmable processing core 112 helps to conserve power.

In addition to controlling the rate of image output via parallel video interface 192, control unit 110 also controls the frame-rate associated with image processing internal to imaging device 100. In an embodiment, three registers are used to effectuate frame rate control. The first, Frame_rate_en, holds an enable bit for a frame-rate mechanism 114. When frame-rate mechanism 114 is disabled, the array content is read according to a second register, Frame_rate_read, and the data is sent out on parallel interface 192. When frame-rate mechanism 114 is activated, two eight-bit registers define whether a particular frame is to be read out, or dropped. When a frame is to be output via parallel video interface 192, a control signal, c_readframe, which is synchronized to a frame boundary signal, Im_Frame 910, is sent to imaging unit 130 to enable output of the frame data to translation unit 150. In addition, a control signal, C_Outframe, which is also synchronized to Im_Frame 910 signal is sent to parallel interface unit 190 to enable the data received from translation unit 150 to be output via parallel video interface 192 at a rate defined by the Frame_rate_send register value.

Figure 2:
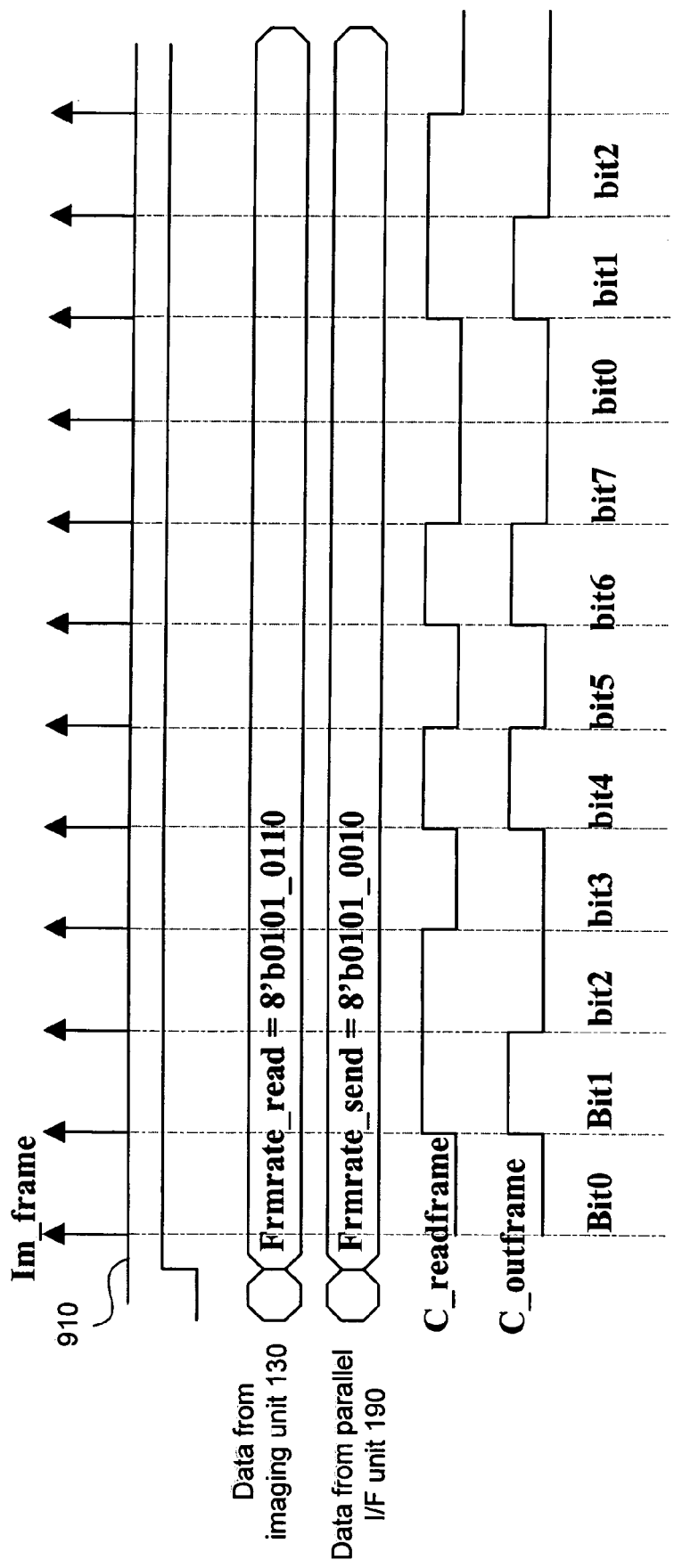
FIG. 2 is a timing diagram of frame rate control implemented in the CMOS imager of FIG. 1.

As illustrated in FIG. 2, when c_readframe is asserted high, the content of a pixel array within sensor 132 is transferred from imaging unit 130 to translation unit 150. When C_Outframe is asserted high, the data is sent out on parallel video interface 192. In some embodiments, when C_Outframe is deasserted, the output data is ignored by parallel interface unit 190, but the output pins are driven. While the data lines of parallel video interface 192 are driven, the vertical and horizontal synchronization signals associated with the data are not driven. In other embodiments, when C_Outframe is deasserted, the output data is ignored by parallel interface unit 190, and the output pins are not driven to conserve power and reduce noise.

Clock Unit

Clock unit 102 receives clock input 172 signal and reset input 171. Based on these signals, as well as control signals from control unit 110, clock unit 102 produces the various clock and reset signals to the different units within imaging device 100. In addition, clock unit 102 samples the configuration pins while reset signal 171 is asserted, and produces several configuration signals based upon the sensed configuration arrangement. The configuration inputs determine the working clock rate, the type of serial interface (SSI or I2C compatible) that is operational on serial I/O 108 and the program-loading source (serial interface or UART) that is operational on UART I/O 121. Further, clock unit 102 produces a control line that indicates if programmable processing core 112 is active, or if it is held in reset mode or has its clock shut down. As previously discussed, this signal enables the bypass of arbitrator 116 for accessing control bus 101.

Clock unit 102 produces the device's general reset signal. An internal reset signal, Reset_i 104, is activated when reset input 171 is asserted, by the setting of a software reset register, or by change in phase locked loop configuration. Clock unit 102 also synchronizes Reset_i 104 to an internal clock signal, Rclk 103.

Clock unit 102 also produces a signal that resets programmable processing core 112. This reset signal is activated when Reset_i 104 is active and/or by a special reset command from serial interface unit 106. When the configuration of imaging device 100 calls for program loading through serial interface unit 106, programmable processing core 112 is held in reset state by this signal until released by a load complete command.

For power reduction purposes, in some embodiments clock signals from clock unit 102 may be turned off. This can be accomplished under direction from either programmable processing core 112 or the Host. As previously discussed, the clocks can be restored whenever an interrupt signal is detected. Alternatively, clocks going to units other than control unit 110 can be turned off, and subsequently restored by issuing a command from programmable processing core 112.

In an embodiment, clock unit 102 produces the following signals: an Rclk 601, an Aclk 603, a Reg_clk 609, an Rc_pix signal 605, an Rclkc, an Rclky, and an Rclkp. Rclk 601 is the main internal clock signal generated from clock input 172. A division factor is applied to clock input 172 to produce Rclk 601, such division factor being determined by reading the configuration pins when reset input 171 is asserted. Aclk 603 is a clock signal to the analog part of imaging unit 130 and is synchronous to Rclk 601, with a one-half Rclk 601 cycle skew between them, at the rate of the pixel-cycles. Thus, the positive going edge of Aclk 603 follows every fourth positive edge of Rclk 601.

Figure 3:
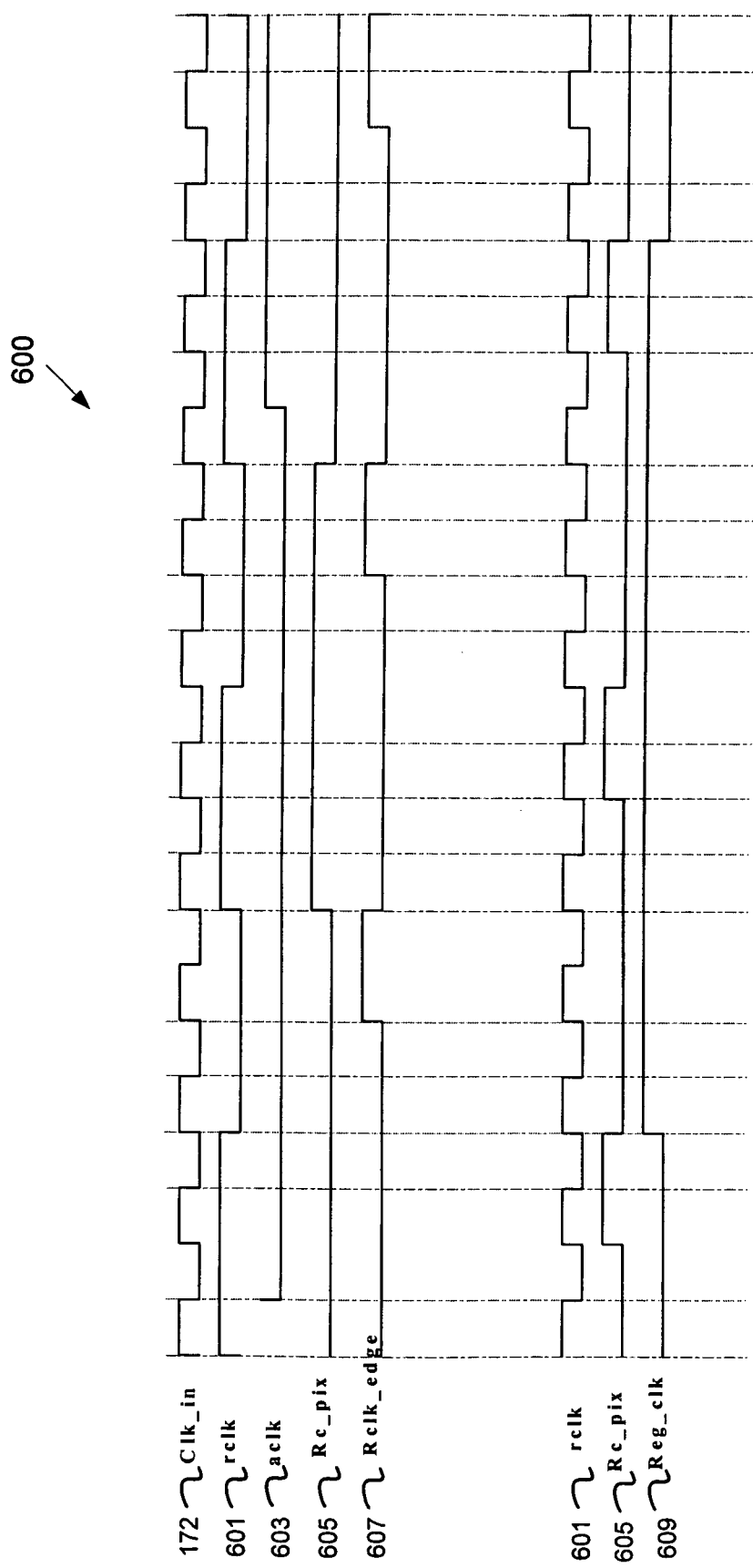
FIG. 3 is a timing diagram illustrating the various clocks used in relation to the CMOS imager of FIG. 1.

Reg_clk 609 is a clock signal to the voltage regulators. It is one-sixteenth the rate of Rclk 601. The rising edge of Reg_clk 609 coincides with the rising edge of Rclk 601, when Rc_pix 605 is asserted. Rc_pix 605 is a signal in the digital domain that marks the Rclk 601 cycle that coincides with the first low cycle of Aclk 603. The first positive going clock edge after an indication that a phase lock loop is ready is qualified as Rc_pix 605. Rclkc is a clock signal to control unit 110 that is identical to Rclk 601. Similarly, Rclky is identical to Rclk 601 and is the clock signal to translation unit 150. Rclkp is a clock signal to parallel interface 190 that is derived from clock input 172. Rclkp can either be identical in frequency to clock input 172, or divided according to a clock division register, Rclkp_config. Rclkp is used for serial output mode and is typically eight to sixteen times the rate of a pixel-clock when serial output is required. Rclk_edge 607 is a qualifying signal to parallel interface unit 190 and is used for serial output mode. FIG. 3 is an exemplary timing diagram 600 illustrating one example of the timing of the various signals generated by clock unit 102.

The operating mode of imaging device 100 determines the clock configuration. The following Table 2 lists some possible operating modes, and the clocking scheme that is associated with each of the modes:

TABLE 2

Clock Modes

| Input frequency | Supported fps | Supported output format | Rclk divide factor | Rclkp divide factor |
|---|---|---|---|---|
| 8 MHz | 15 fps | Bayer, YUV parallel (CIF, QCIF) | 1 | NA |
| | | Bayer 1x serial - QCIF | 1 | 1 |
| 12 MHz | 20 fps | Bayer, YUV parallel (CIF, QCIF) | 1 | NA |
| | | Bayer 1x serial - QCIF | 1 | 1 |
| 16 MHz | 30 fps | Bayer, YUV parallel (CIF, QCIF) | 1 | NA |
| | | Bayer 1x serial - QCIF | 1 | 1 |
| | 15 fps | Bayer, YUV parallel (CIF, QCIF) | 2 | NA |
| | | Bayer 1x serial - QCIF | 2 | 2 |
| | | Bayer 1x serial - CIF | 2 | 1 |
| | | YUV 1x serial - QCIF | 2 | 1 |
| | | Bayer 2x serial - QCIF | 2 | 1 |
| 32 MHz | 30 fps | Bayer, YUV parallel (CIF, QCIF) | 2 | NA |
| | | Bayer 1x serial - QCIF | 2 | 2 |

TABLE 2-continued

Clock Modes

| Input frequency | Supported fps | Supported output format | Rclk divide factor | Rclkp divide factor |
|---|---|---|---|---|
| | | Bayer 1x serial - CIF | 2 | 1 |
| | | YUV 1x serial - QCIF | 2 | 1 |
| | | Bayer 2x serial - QCIF | 2 | 1 |
| | 15 fps | Bayer, YUV parallel (CIF, QCIF) | 4 | NA |
| | | Bayer 1x serial - QCIF | 4 | 4 |
| | | Bayer 1x serial - CIF | 4 | 2 |
| | | YUV 1x serial - QCIF | 4 | 2 |
| | | YUV 1x serial - CIF | 4 | 1 |
| | | Bayer 2x serial - QCIF | 4 | 2 |
| | | Bayer 2x serial - CIF | 4 | 1 |
| | | YUV 2x serial - QCIF | 4 | 1 |
| 64 MHz | 30 fps | Bayer, YUV parallel (CIF, QCIF) | 4 | NA |
| | | Bayer 1x serial - QCIF | 4 | 4 |
| | | Bayer 1x serial - CIF | 4 | 2 |
| | | YUV 1x serial - QCIF | 4 | 2 |
| | | YUV 1x serial - CIF | 4 | 1 |
| | | Bayer 2x serial - QCIF | 4 | 2 |
| | | Bayer 2x serial - CIF | 4 | 1 |
| | | YUV 2x serial - QCIF | 4 | 1 |
| | 15 fps | Bayer, YUV parallel (CIF, QCIF) | 8 | NA |
| | | Bayer 1x serial - QCIF | 8 | 8 |
| | | Bayer 1x serial - CIF | 8 | 4 |
| | | YUV 1x serial - QCIF | 8 | 4 |
| | | YUV 1x serial - CIF | 8 | 2 |
| | | Bayer 2x serial - QCIF | 8 | 4 |
| | | Bayer 2x serial - CIF | 8 | 2 |
| | | YUV 2x serial - QCIF | 8 | 2 |
| | | YUV 2x serial - CIF | 8 | 1 |

Various combinations of frequencies for the input clock, Rclk and Rclkp are summarized in Table 3 below:

TABLE 3

Various Input and Output Clock Frequencies

| clock input 172 | Rclk dividing factor | Rclkp dividing factor) |
|---|---|---|
| 8 MHz, 12 MHz, 16 MHz | 1 | 1 |
| 16 MHz, 32 MHz | 2 | 1 |
| | 2 | 2 |
| 32 MHz, 64 MHz | 4 | 1 |
| | 4 | 2 |
| | 4 | 4 |
| 64 MHz | 8 | 1 |
| | 8 | 2 |
| | 8 | 4 |
| | 8 | 8 |

Imaging Unit

Imaging unit 130 provides the central functionality of imaging device 100. Imaging unit 130 includes a timing control and address generator unit ("TCAG") 136 that receives timing signals from control unit 110 and produces the sequence signals to sensor 132 and ADC 134 for integration (e.g., exposure control), read and reset operations. Sensor 132 includes a CIF size pixel array, level shift circuitry, gain control circuitry, programmable or black offset circuitry, gamma-correction circuitry and readout circuits.

Figure 4:
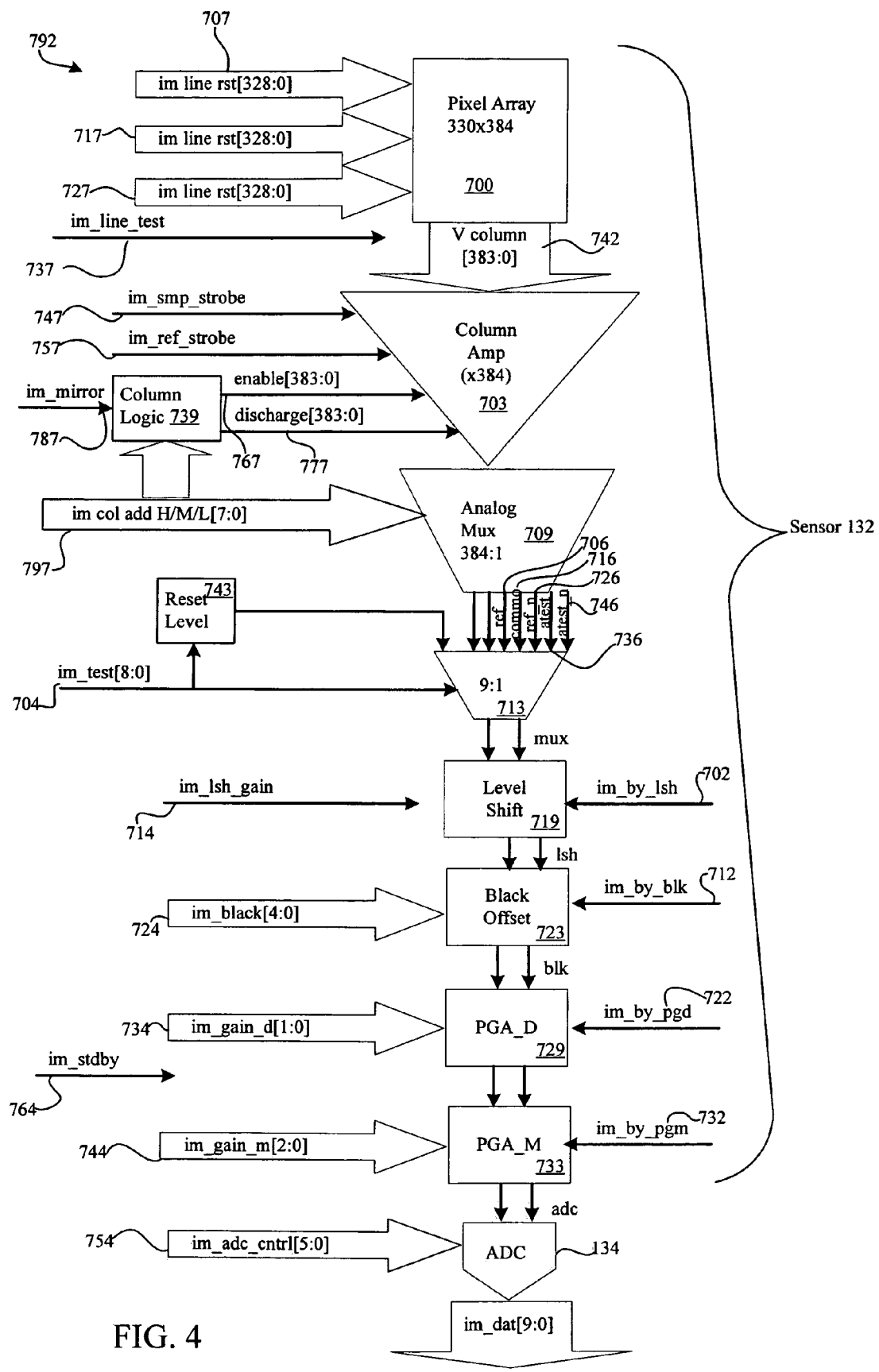
FIG. 4 is a block diagram of a sensor in accordance with one embodiment of the present invention.

FIG. 4 illustrates a block diagram 792 of the analog processing portion of imaging unit 130 including sensor 132 and ADC 134. Sensor 132 includes a pixel array 700, a column amplifier 703, an analog multiplexer ("MUX") 709, a source selector mux 713, a level shift block 719, a black offset block 723, a first stage programmable gain amplifier 729, and a second stage programmable gain amplifier 733.

In addition, sensor 132 includes a column logic block 739 and a reset level block 743. It should be noted that column amplifier 703 represents a vector of column amplifiers. Column logic within imaging device 100 can be designed such that only two of the 384 total column amplifiers within column amplifier 703 are active at any given time.

Figure 5:
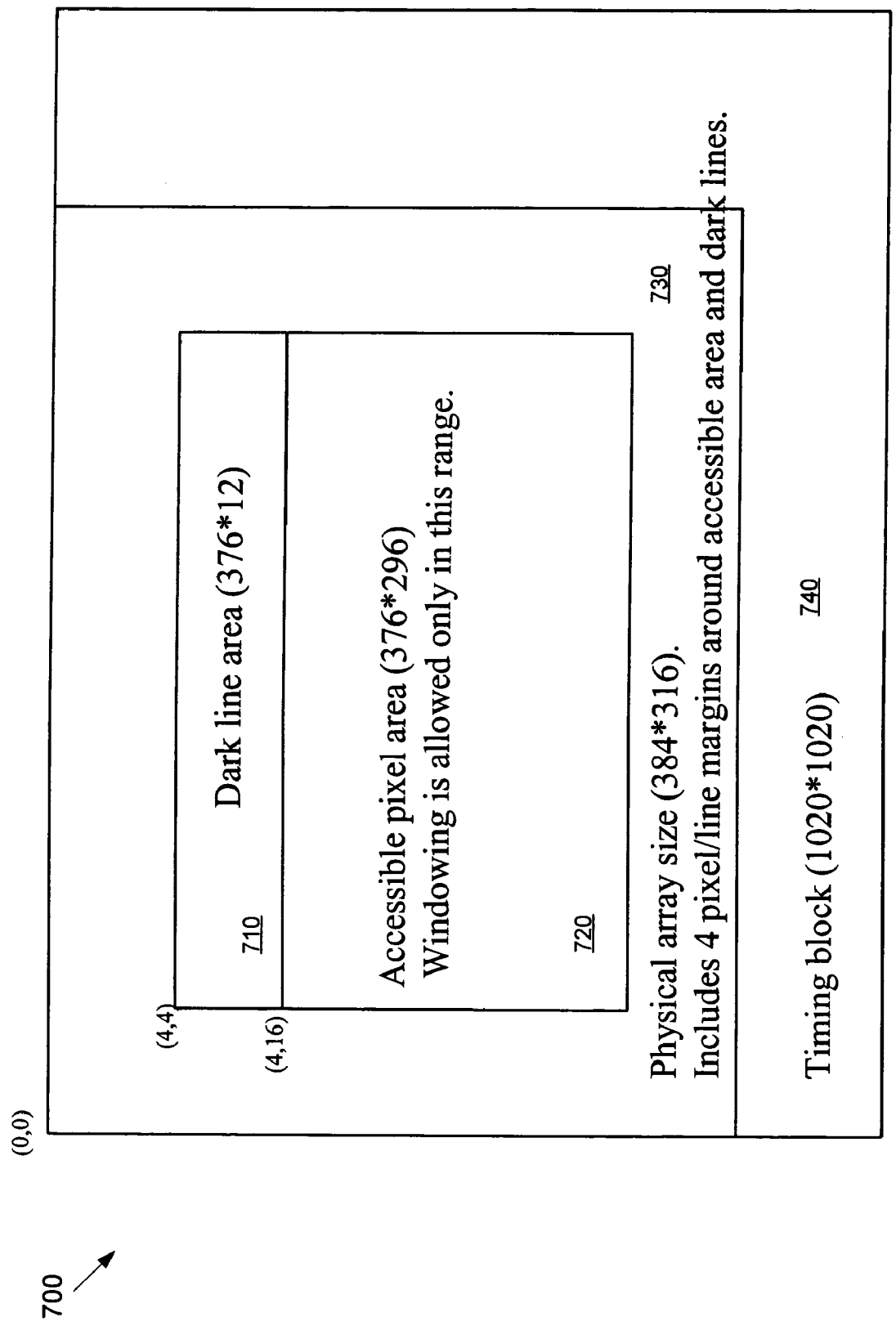
FIG. 5 is a block diagram of a virtual image window in accordance with various embodiments of the present invention.
Figure 6:
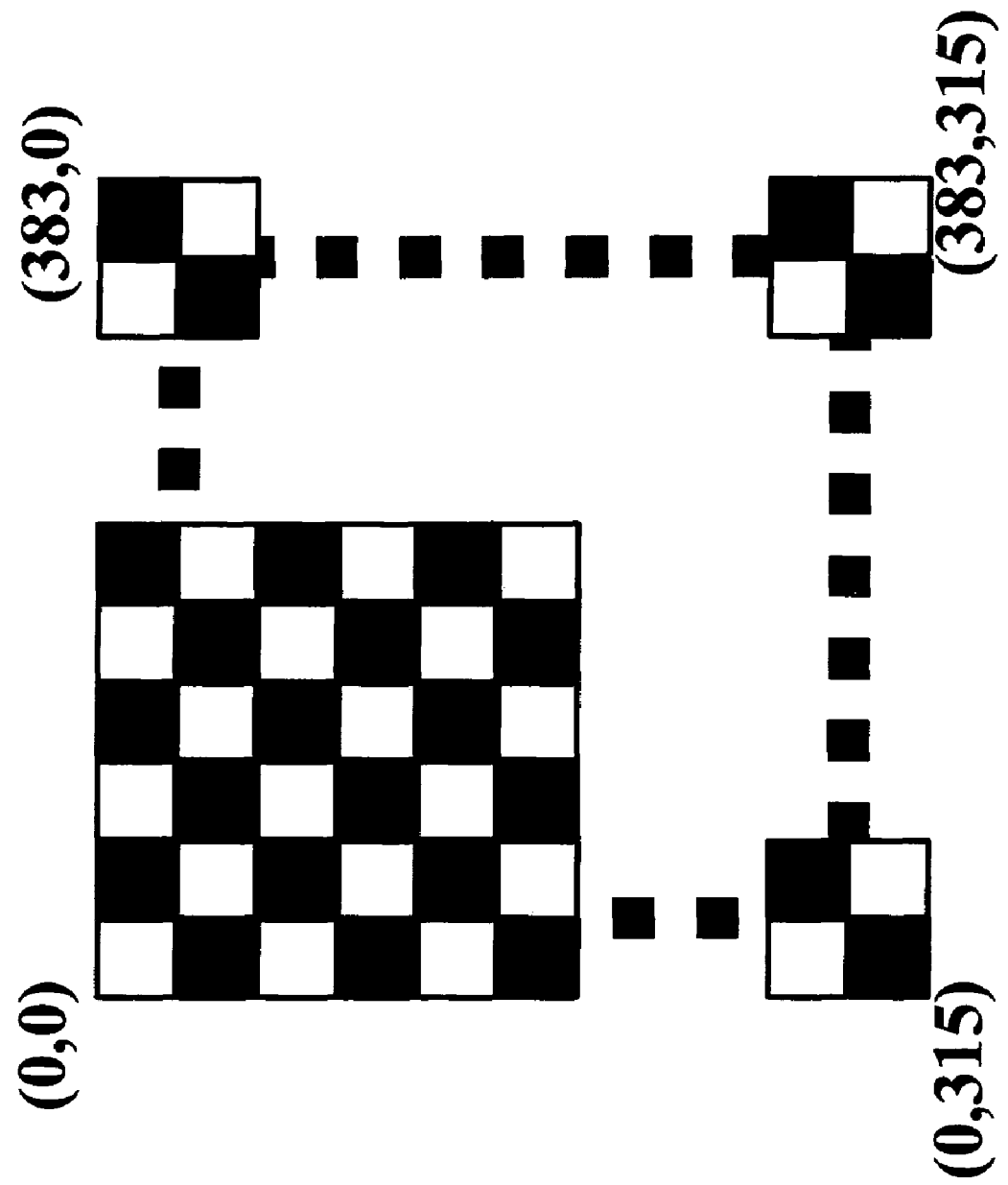
FIG. 6 illustrates a Bayer grid array.

FIG. 5, illustrates one embodiment of pixel array 700 associated with sensor 132. Pixel array 700 includes an array of 376 by 296 active pixels 720 surrounded by four black columns 730 on each side. It is also surrounded by sixteen black lines 710 above and four black lines below the active image array, totaling 384 by 316. Each pixel in pixel array 700 is covered by a color filter, thus creating a Bayer grid format 800 as illustrated in FIG. 6.

Referring again to FIG. 4, sensor 132 receives a number of timing and address signals from TCAG 136 (FIG. 1). More particularly, pixel array 700 receives the decoded and time-shaped line reset, Im_line_rst[328:0] (element 707), and line select, Im_line_sel[328:0] (element 727), signals.

Figure 7:
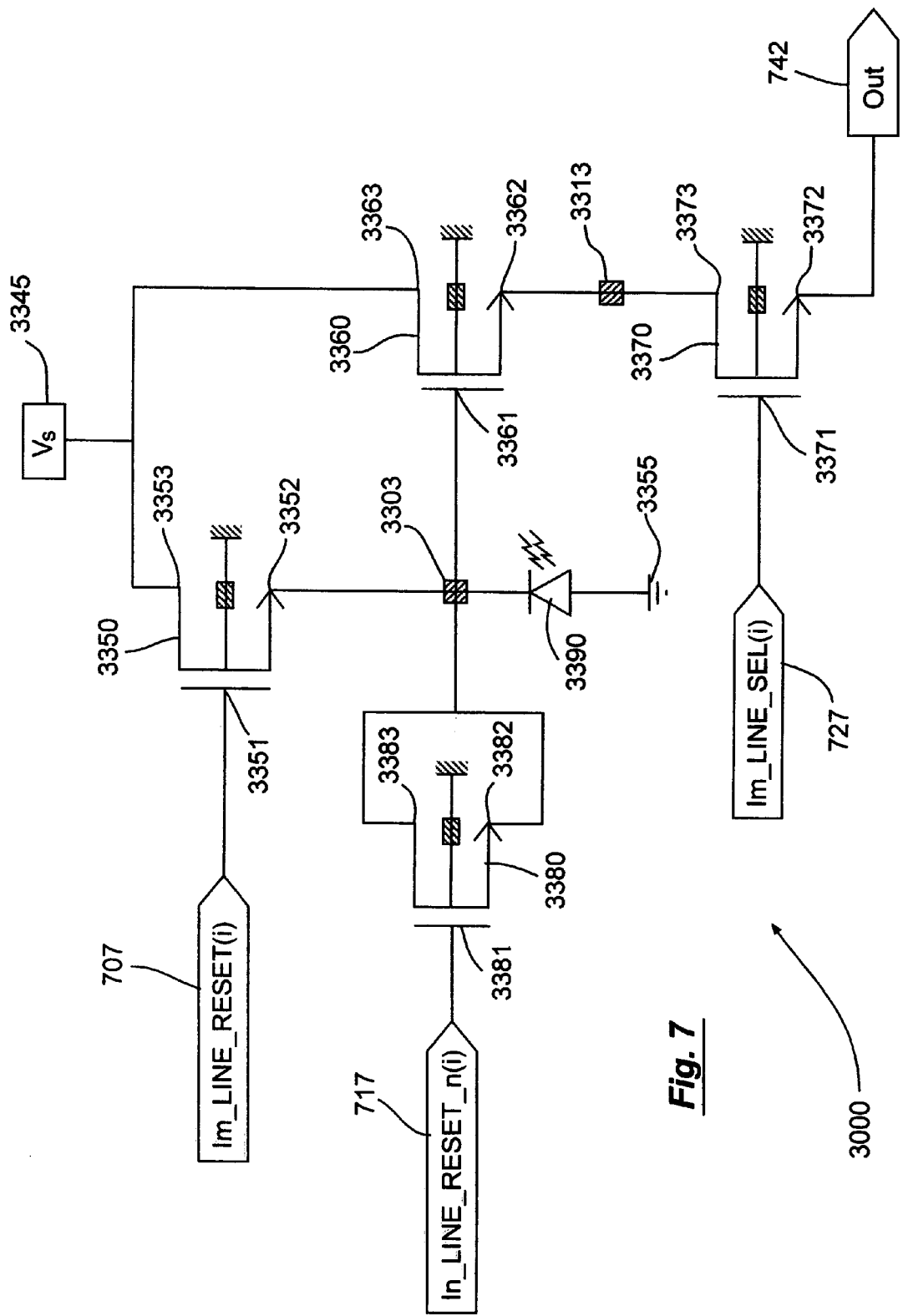
FIG. 7 illustrates a pixel circuit in accordance with various embodiments of the present invention.

In some embodiments of imaging device 100, each pixel within pixel array 700 includes a charge injection compensation circuit. Referring to FIG. 7, a pixel 3000 is illustrated in accordance with embodiments of the present invention that include such a charge injection compensation circuit. Pixel 3000 includes a reset element 3350, a source follower transistor 3360, a selection element 3370, a charge evacuation element 3380, and a light sensitive element 3390. The inputs to pixel 3000 include a reset control signal (im_line_rst 707), a selection control signal im_line_sel 727), and a charge evacuation control signal (im_line_rst_n 717). Further, pixel 3000 provides an output signal 742. In an embodiment, pixel 3000 is attached to a voltage source 3345 and a common ground 3355.

Source follower transistor 3360 can be any of a number of transistor types. In one particular embodiment, source follower transistor 3360 is a CMOS FET. Source follower transistor 3360 includes a source follower gate 3361, a source follower source 3362 and a source follower drain 3363. Each of evacuation element 3380, reset element 3350, and photodiode 3390 are electrically connected to source follower gate 3361. For purposes of this document, charge evacuation element 3380 can be any device capable of dissipating charge from pixel 3000. Thus, for example, charge evacuation element 3380 can be a switch, a FET, a bipolar junction transistor ("BJT"), a switched capacitor, or any other such device. In one particular embodiment of the present invention, charge evacuation element 3380 is CMOS transistor as illustrated in FIG. 7. In some cases, such CMOS transistors can be comprised of N-FET devices, P-FET devices, and/or combinations thereof as known in the art. In such an embodiment, charge evacuation element 3380 includes a charge evacuation gate 3381, a charge evacuation drain 3383, and a charge evacuation source 3382.

As used herein, a reset element 3350 can be any device capable of switching, such that voltage source 3345 is applied to light sensitive element 3390. In one particular embodiment, reset element 3350 is a CMOS transistor that includes a reset gate 3351, a reset drain 3353, and a reset source 3352. Yet further, for purposes of this document, light sensitive element 3390 is any device that is capable of detecting the presence of light and producing a signal indicative of the amount of light detected. Thus, in one embodiment of the present invention, light sensitive element 3390 is a photodiode. In other embodiments, light sensitive element 3390 is a photo-gate. Other such light sensitive elements can be used including, but not limited to, a bipolar photo-transistor and/or a stacked complex n-p-n-p device where each junction is sensitive to a part of the light spectrum to be detected.

Also for purposes of this document, selection element 3370 can be any device capable of presenting a signal representative of an amount of light impinging upon light sensitive element 3390. Thus, selection element 3370 can be a transistor, a pass gate, or the like. In one embodiment of the invention, selection element 3370 is a CMOS transistor with a selection gate 3371, a selection drain 3373, and a selection source 3372.

For discussion purposes, each of reset element 3350, source follower transistor 3360, selection element 3370, and charge evacuation element 3380 are CMOS transistors and light sensitive element 3390 is a photodiode. However, based on the disclosure provided herein, one of ordinary skill in the art will recognize that the present invention and the principles included herewith are applicable to a number of other device types.

As illustrated by pixel 3000, source follower drain 3363 and reset drain 3353 are both electrically coupled to voltage source 3345. Further, source follower gate 3361, a node of light sensitive element 3390, reset source 3352, charge evacuation source 3382, and charge evacuation drain 3383 are electrically coupled together at a node 3303. The other node of light sensitive element 3390 is electrically coupled to common ground 3355. Yet further, source follower source 3362 is electrically coupled to selection drain 3373 at a node 3313.

Reset gate 3351 is driven by im_line_rst(i) 707, charge evacuation gate 3381 is driven by im_line_rst_n(i) 717, and selection gate 3371 is driven by im_line_sel(i) 727. Output signal 742 is driven by selection source 3372. In some embodiments, im_line_rst_n(i) 717 is the inverse, or complement, of im_line_rst(i) 707. Thus, when reset element 3350 is switched, thereby providing a low impedance path from reset drain 3353 to reset source 3352, charge evacuation element 3380 is not switched, thereby providing an open circuit between charge evacuation drain 3383 and charge evacuation source 3382. The opposite is also true. When reset element 3350 is not switched, thereby providing an open circuit between reset drain 3353 and reset source 3352, charge evacuation element 3380 is switched thereby providing a low impedance path from charge evacuation drain 3383 to charge evacuation source 3382.

In some embodiments where im_line_rst_n(i) 717 is the complement of im_line_rst(i) 707, im_line_rst_n(i) 717 is delayed such that a falling edge of im_line_rst(i) 707 precedes a corresponding rising edge of im_line_rst_n(i) 717 by a period of time. In other embodiments, im_line_rst_n(i) 717 works in relation to im_line_rst(i) 707, but is not the complement of im_line_rst(i) 707, but rather a distinctly generated signal. The timing relationships of the various signals are discussed further in relation to FIGS. 9 below.

Figure 8:
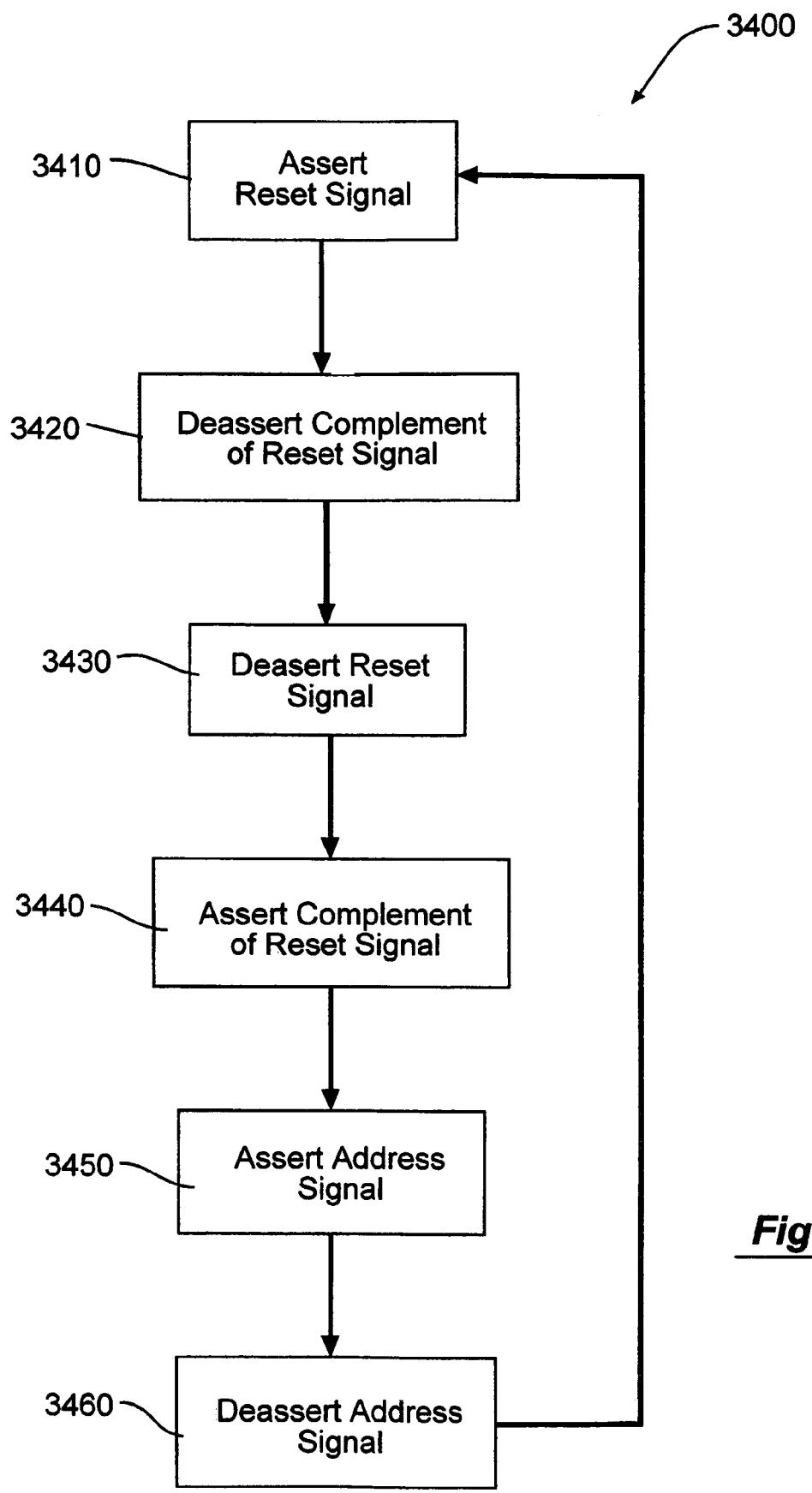
FIG. 8 is a flow diagram illustrating a method for using the pixel circuit of FIG. 7 in accordance with an embodiment of the present invention.

FIG. 8 illustrates a flow diagram 3400 of one method in accordance with the present invention for operating pixel 3000. In operation, im_line_rst(i) 707 is asserted such that a low impedance path exists between reset drain 3353 and reset source 3352 (block 3410). In particular embodiments, im_line_rst(i) 707 overdrives reset gate 3351 such that photodiode 3390 is charged as rapidly as possible. Further, im_line_rst_n(i) 717 is deasserted such that an open circuit exists between charge evacuation drain 3383 and charge evacuation source 3382 (block 3420). As such, a voltage corresponding to voltage source 3345, less the impedance drop across reset element 3350 is present at node 3303, thereby reverse biasing photodiode 3390. In this state, photodiode 3390 is charged to a level corresponding to the voltage at node 3303. Further, a negative charge is built in the channel of reset element 3350.

Some time later, im_line_rst(i) 707 is deasserted such that an open circuit exists between reset drain 3353 and reset source 3352 (block 3430). Thus, additional charge from voltage source 3345 is not available to photodiode 3390. However, on the falling edge of im_line_rst(i) 707, the negative charge accumulated in the channel of reset element 3350 is dissipated through both reset drain 3353 and reset source 3352. Thus, part of the charge is discharged via node 3303 causing a voltage drop (i.e., noise), which can be significant. In some cases, the voltage drop due to the negative charge from reset element 3350 can be between two-hundred and five-hundred millivolts for geometries of four to seven micrometers, and is exacerbated as pixel geometries and source voltages decrease.

With an open circuit between reset drain 3353 and reset source 3352, the charge built up in photodiode 3390 begins to dissipate at a rate corresponding to the amount of light impinging upon photodiode 3390. Thus, where a significant amount of light impinges upon photodiode 3390, the voltage at node 3303 will decrease at a more rapid rate than if a small amount of light impinges upon photodiode 3390.

Either some time after the deassertion of im_line_rst(i) 707 or coincident therewith, im_line_rst_n(i) 717 is asserted such that a low impedance path exists between charge evacuation drain 3383 and charge evacuation source 3352 (block 3440). This assertion provides a path whereby at least a portion of the negative charge that was stored in the channel of reset element 3350 can dissipate through charge evacuation device 3380. In some embodiments, the type of device used to implement charge evacuation element 3380 is chosen such that the operation of charge evacuation element 3380 reflects the non-linearities exhibited by reset element 3350. Thus, in some cases, charge evacuation element 3350 and reset element 3350 are chosen to be the same device types.

As approximately half of the charge built up in the channel of reset element 3350 dissipates through reset drain 3353 and the other half dissipates through reset source 3352, the size of charge evacuation device 3380 can be chosen such that it can evacuate roughly half of the charge built up in the channel of reset element 3350. Thus, in one embodiment, where the charge evacuation element 3380 and reset element 3350 are the same device type, the size of charge evacuation device 3380 is roughly half the size of reset element 3350. In other embodiments where reset element 3350 and charge evacuation element 3380 are different device types, such as, when charge evacuation element 3380 is a switched capacitor, the size of the capacitor is chosen based on the amount of charge to be dissipated from the channel of reset element 3350 via reset source 3352. As illustrated below in FIGS. 9, dissipation of the negative charge in the channel of reset element 3350 through charge evacuation element 3380 can, depending upon the geometry of pixel 3000, eliminate as much as five-hundred millivolts of noise at node 3303. Elimination of such noise at node 3303 assures that the signal sampled at output 742 more accurately reflects the amount of light detected at photodiode 3390.

At some point, im_line_sel(i) 727 is asserted to sample the remaining voltage at node 3303, and thereby gain an approximation of the light impinging upon photodiode 3390 (block 3450). With im_line_sel(i) 727 asserted, a low impedance path exists from selection drain 3373 to selection source 3372. Thus, a signal representative of the voltage present at node 3303 is presented on output 742 via source follower transistor 3360. Once the output is sampled, im_line_sel(i) 727 is deasserted (block 3460) and the process is repeated to detect the amount of light impinging upon photodiode 3390 at a future point in time. It should be recognized from FIGS. 9 that in some embodiments of the present invention, the assertion of im_line_sel(i) 727 overlaps the assertion of im_line_rst(i) 707. Yet, in other embodiments, the assertion of im_line_sel(i) 727 does not overlap the assertion of im_line_rst(i) 707.

FIGS. 9 illustrate timing diagrams of the various signals related to the operation of pixel 3000. More particularly, the figures illustrate the relationship between im_line_rst(i) 707, im_line_rst_n(i) 717, im_line_sel(i) 727, the voltage at node 3303, and the voltage at output 742.

Figure 9A:
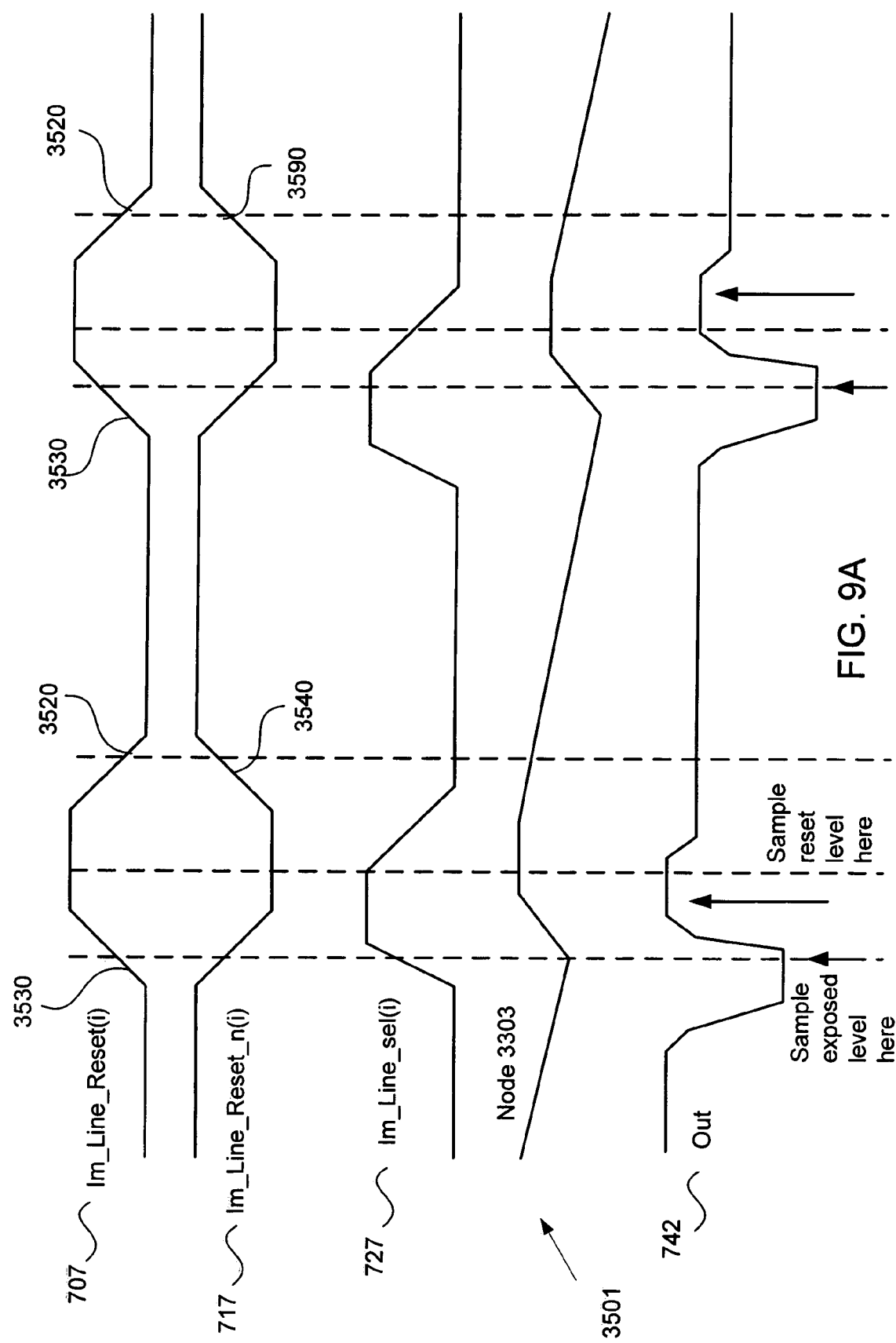
FIGS. 9 are timing diagrams illustrating the operation of the pixel of FIG. 7.
Figure 9B:
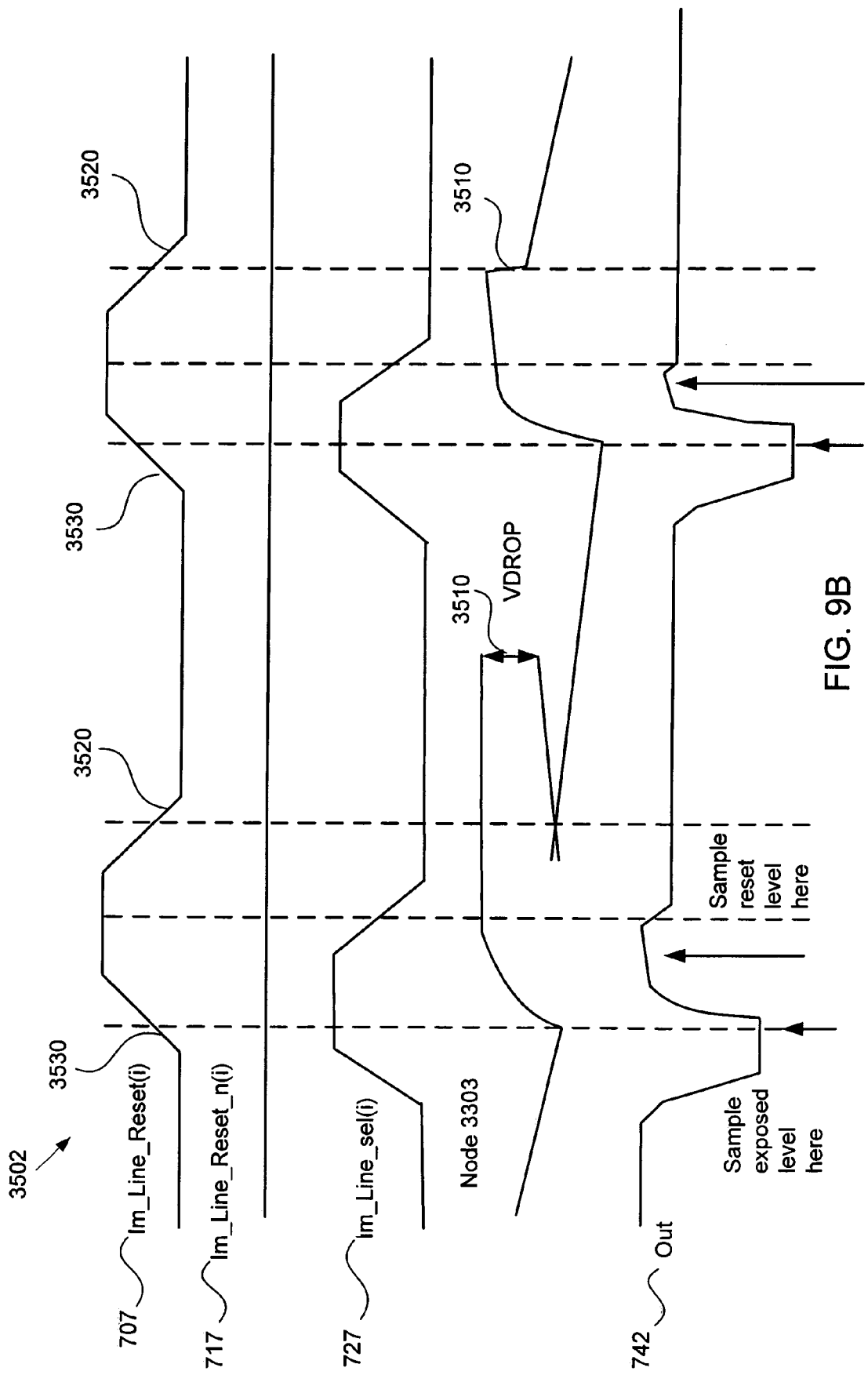

FIG. 9a is a timing diagram 3501 illustrating operation of pixel 3000 where im_line_rst(i) 707 and im_line_rst_n(i) 717 are complementary, and where charge evacuation element 3380 is operational. In contrast, FIG. 9b is a timing diagram 3502 illustrating similar operation of pixel 3000 where charge evacuation element 3380 is not present. As illustrated in FIG. 9b, at the falling edge of im_line_rst(i) 707 (noted as 3520), a voltage drop, VDROP 3510, is exhibited at node 3303. This voltage drop exists until photodiode 3390 is again charged by assertion of im_line_rst(i) 707 (noted as 3530). This voltage reduction at node 3303 (i.e., noise) causes a corresponding reduction in output signal 742. This is in comparison to timing diagram 3501 of FIG. 9a, where the voltage drop at node 3303 does not occur because the charge causing the voltage drop in timing diagram 3502 is evacuated through charge evacuation element 3380 as previously described. Thus, as illustrated in the contrast between FIG. 9a and FIG. 9b, a substantial amount of noise can be eliminated from node 3303 via the operation of charge evacuation element 3380.

Figure 9C:
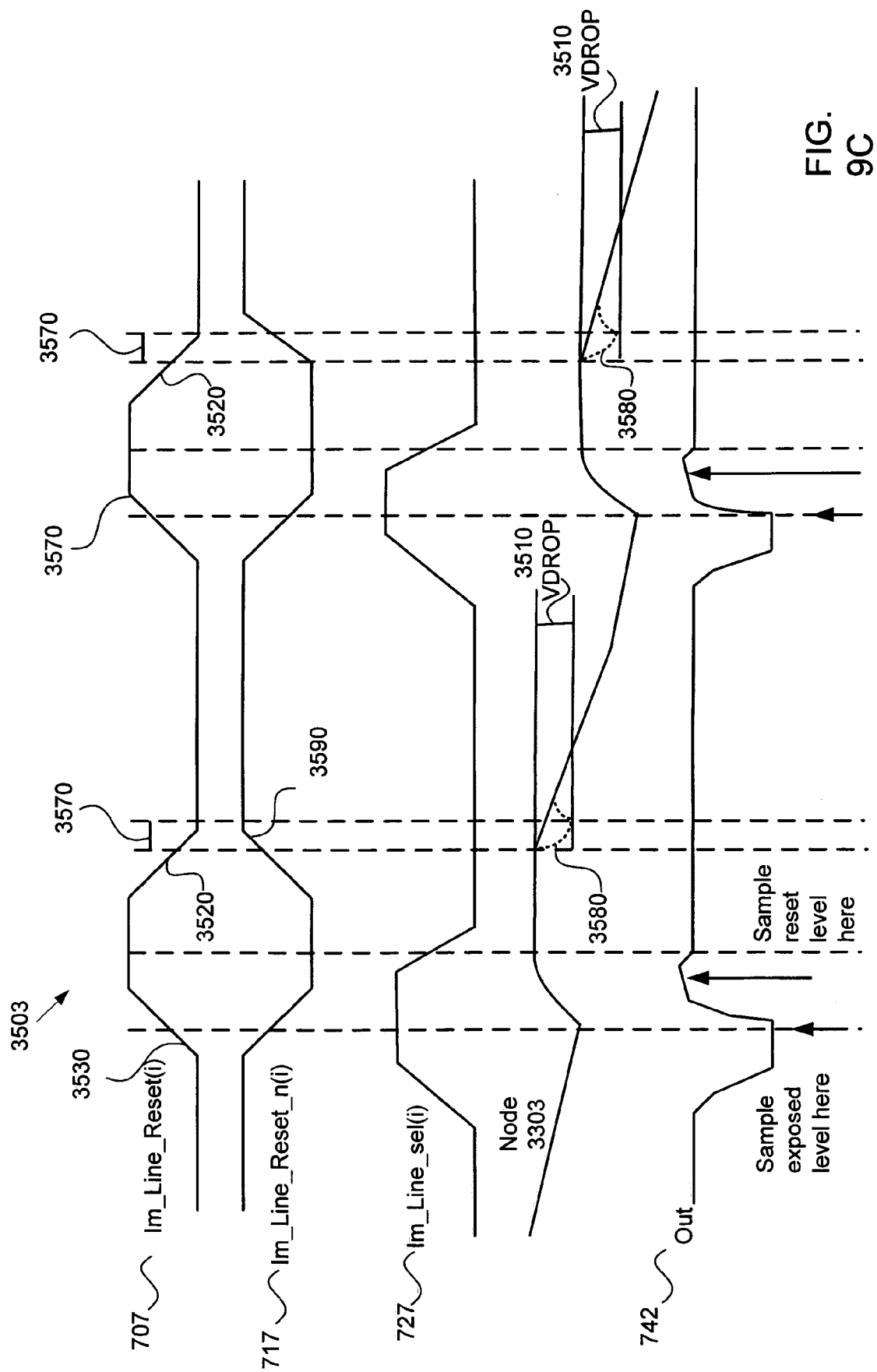

FIG. 9c is a timing diagram 3503 that illustrates another embodiment where, similar to timing diagram 3501, im_line_rst(i) 707 and im_line_rst_n(i) 717 are complementary. However, in contrast to timing diagram 3501, timing diagram 3530 illustrates im_line_rst_n(i) 717 delayed from im_line_rst(i) 707 by a period 3570. As illustrated, charge evacuation element 3380 still dissipates the charge from the channel of reset element 3350, albeit at a slightly later time corresponding to the assertion of im_line_rst_n(i) 717. Thus, a voltage droop 3580 corresponding to VDROP 3510 (illustrated as a dotted line) is noted on node 3303, until the assertion of im_line_rst_n(i) 717 (noted as 3590). However, because of the operation of charge evacuation element 3380, the voltage at node 3303 is corrected before the sample is taken upon assertion of im_line_sel(i) 727.

Based on the disclosure provided herein, one of ordinary skill in the art will recognize a number of other timing relationships between the various signals that each dissipate the charge within the channel of reset element 3350, thus reducing the noise manifest at output 742. Further, as previously mentioned, im_line_rst(i) 707 and im_line_rst_n (i) 717 can be separately generated to achieve a timing relationship that allows for charging of photodiode 3390, and for dissipating the charge within the channel of reset element 3350. In some cases, it can minimize the logic in TCAG 136 to have im_line_rst_n(i) 717 be the complement of im_line_rst(i) 707. Further, it should be recognized that im_line_sel(i) 727 can be generated at other times than those illustrated in FIGS. 9.

Figure 10:
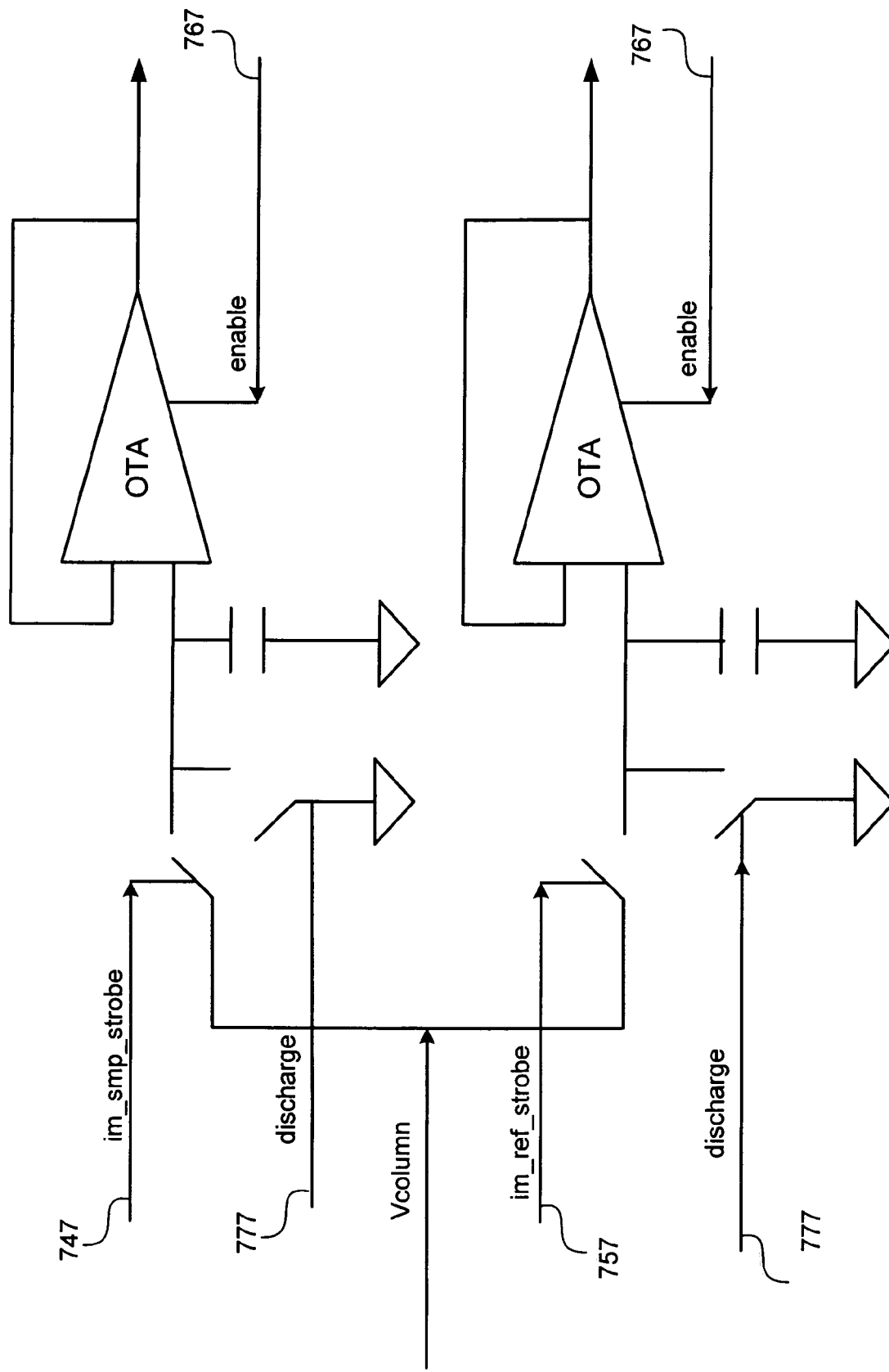
FIG. 10 is an exemplary column amplifier circuit.
Figure 11:
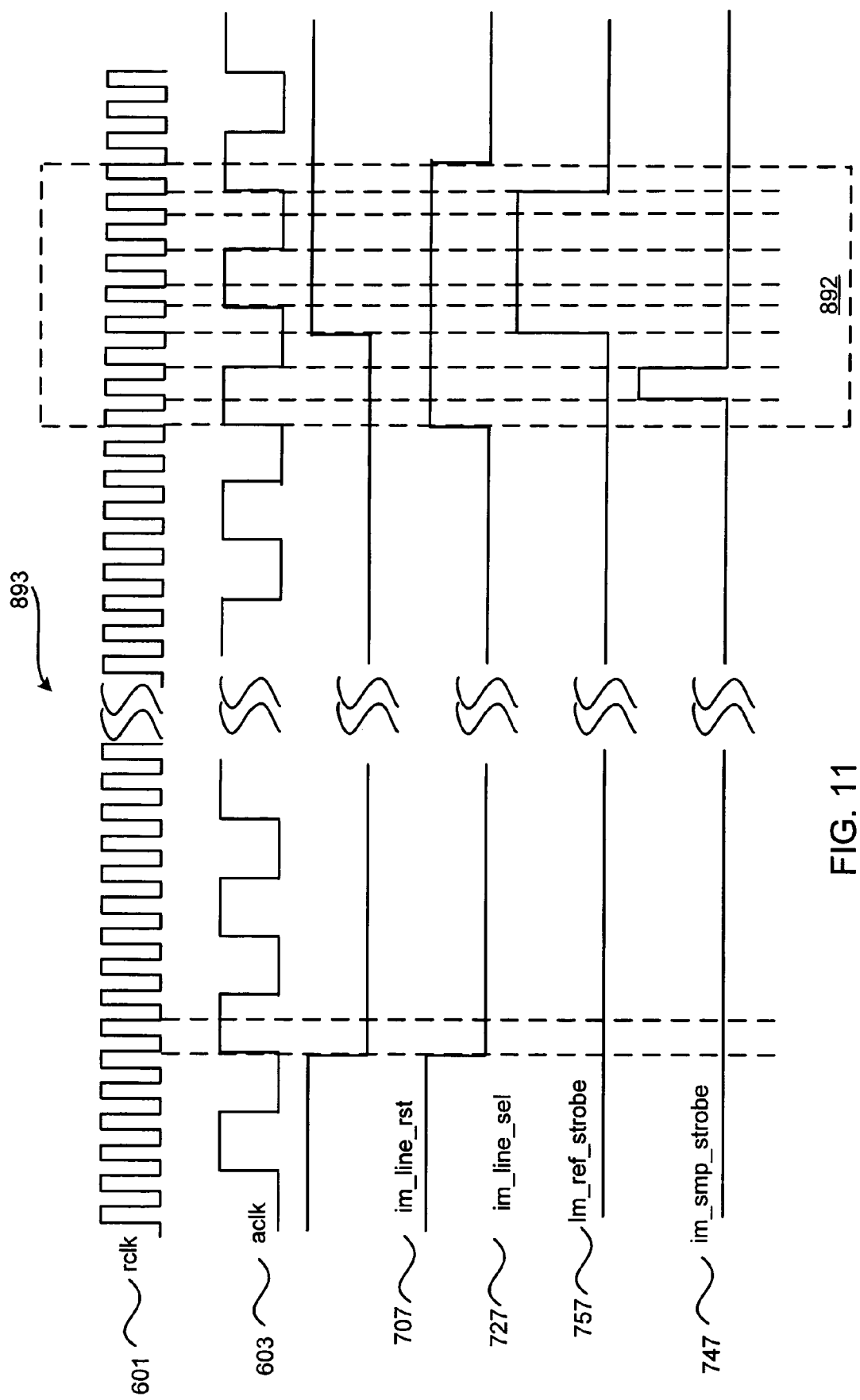
FIGS. 11-13 are timing diagrams illustrating the operation of the column amplifier circuit of FIG. 10.

FIG. 10 illustrates the architecture of column amplifier 703. Discharge (element 777) and enable (element 767)

signals are received from column logic block 739. Using column amplifier 703, the output of each column is double sampled by the track and hold circuits in the column amplifier that are controlled by im_smp_strobe (element 747) and im_ref_strobe (element 757) signals. A timing diagram 893 illustrating the inter-relationship of the various signals of pixel array 700 and column amplifier 703 is provided as FIG. 11. Of note, the exposure control described in more detail below should not have a line in pixel array 700 during a period 892 outlined by dotted lines on FIG. 11.

Figure 12:
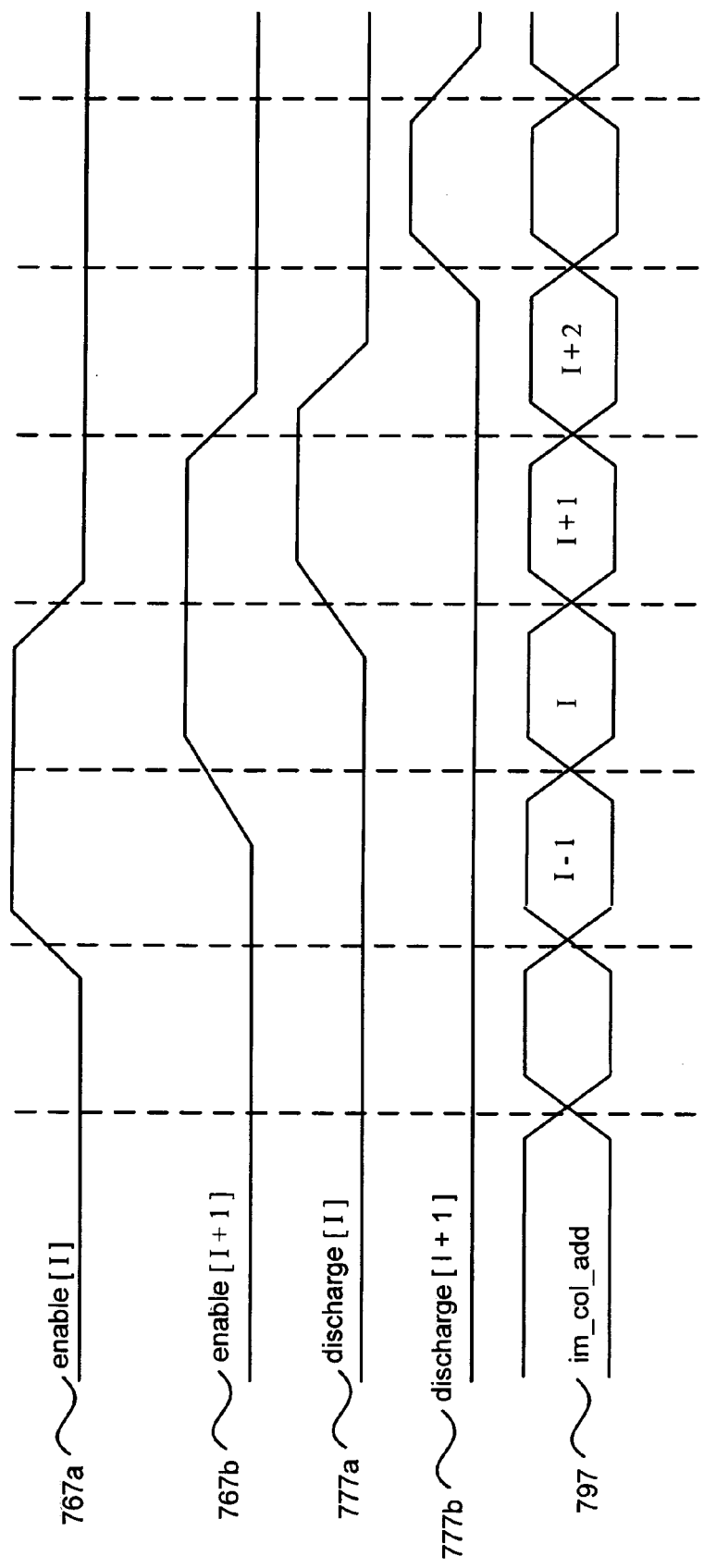
Figure 13:
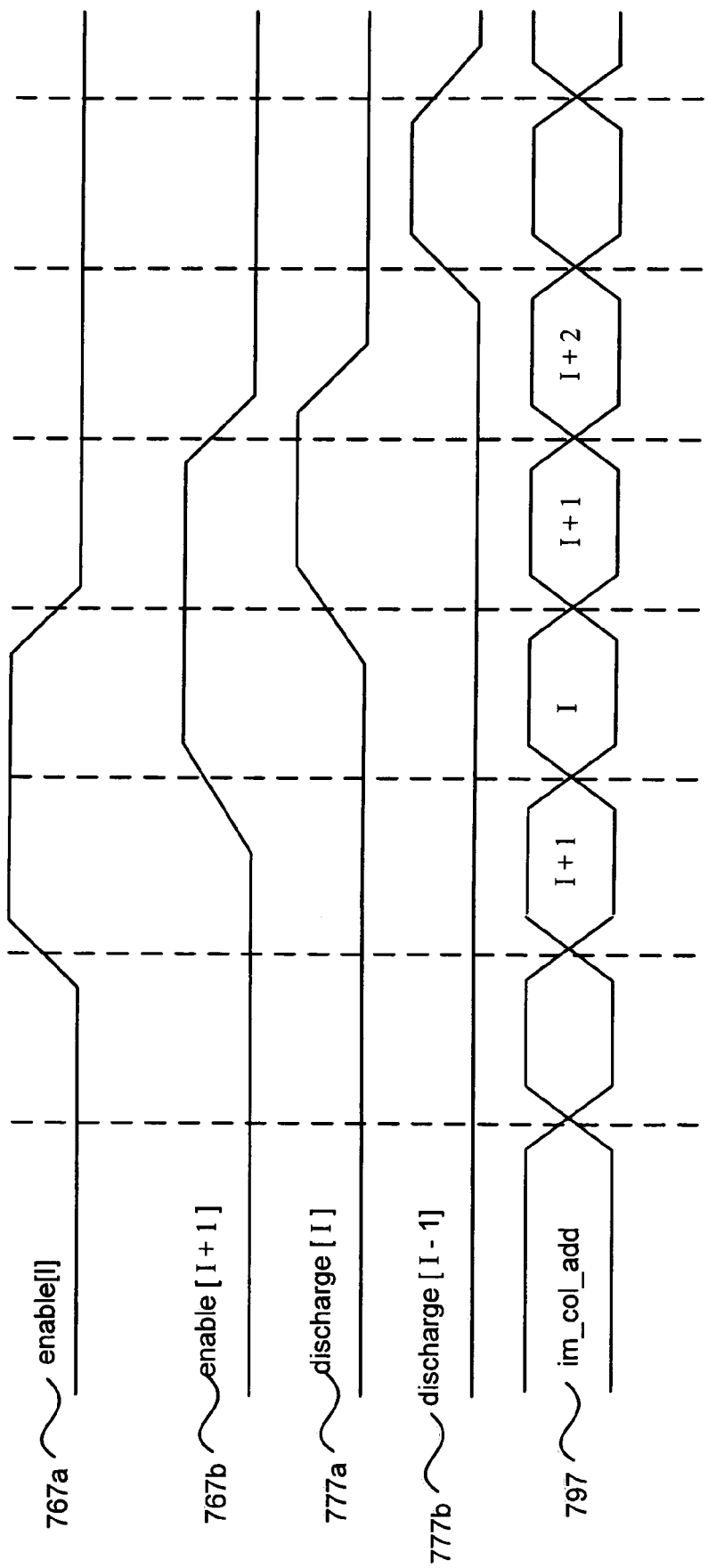

Imaging unit 130 can be programmed to provide a standard output from pixel array 700 or a mirrored image. FIG. 12 provides a timing diagram of the signals associated with outputting the image in standard mode, and FIG. 13 provides a timing diagram of the signals associated with outputting the image in mirrored mode. Selection between the standard and mirrored modes is accomplished by programming an im_mirror (element 787) signal via a register bit, which drives column logic block 739 (FIG. 4).

Referring again to FIG. 4, analog mux 709 selects the pixel from pixel array 700 that will be processed. Thus, a column of pixel array 700 is selected by column logic block 739, and then a single pixel within the column is selected via analog mux 709. Analog mux 709 is a three level mux where the first and second levels are eight to one muxes, and the third level is a six to one mux. This provides for a total of a 384 to one mux. Selection is accomplished via column address signals (element 797) im_col_add_L[7:0] for selecting the first level mux, im_col_add_M[7:0] for selecting the second level mux, im_col_add_H[5:0] for selecting the third level mux.

Sensor 132 can operate in a rolling mode, in which the exposure and readout processes are linked. The sampling of each row data is performed at the end of the integration time. After sampling a selected-row data, the row is reset. The row is sampled again after the reset. This second sampling helps reduce fixed pattern noise (FPN) by implementing a double-sampling procedure. The integration of that row starts again according to the exposure parameters.

A set of registers defines the total size of pixel array 700 and the size of the array that is read out and sent to translation unit 150 for further processing. Another set of registers defines the exposure time that is required for pixels within pixel array 700. The exposure and read timing sequences are derived from these registers.

The processing of a single pixel of sensor 132 is referred to as a pixel cycle. There are four Rclk 601 cycles in a pixel-cycle that is controlled by a timing circuit. An Im_Pix signal from clock unit 102 qualifies the first clock edge of the pixel-cycle. On activation of the timing circuit, line and pixel counters are set to zero, and subsequently begin counting pixel-cycles. An Im_Frame 910 signal is activated on the first pixel-cycle of the frame, and an Im_Line 920 signal is activated on the first pixel-cycle of a line, except for the first line, when Im_Frame 910 is active.

The pixel counter counts upon activation of the Im_Pix signal, and the line counter is activated when the pixel counter reaches a full-line count. On activation of Im_Line 920 after activation of Im_Frame 910, TCAG 136 reads and resets the first line in pixel array 700. On each activation of Im_Line 920, the lines are only reset.

Once the line whose index is equal to the Im_starty register value is reached, data is sent out starting at the pixel whose index matches the Im_startx register value. The pixels that are inside the window defined by the Im_starty and Im_startx, Im_endy, and Im_endx converted from the analog to digital domain using ADC 134, and passed to translation unit 150.

An additional window can be defined for differentiating between pixels in "area of interest", and pixels outside this defined area. An Iy_inwindow signal is active for those pixels inside the window, and inactive for the pixels outside the window.

Figure 14:
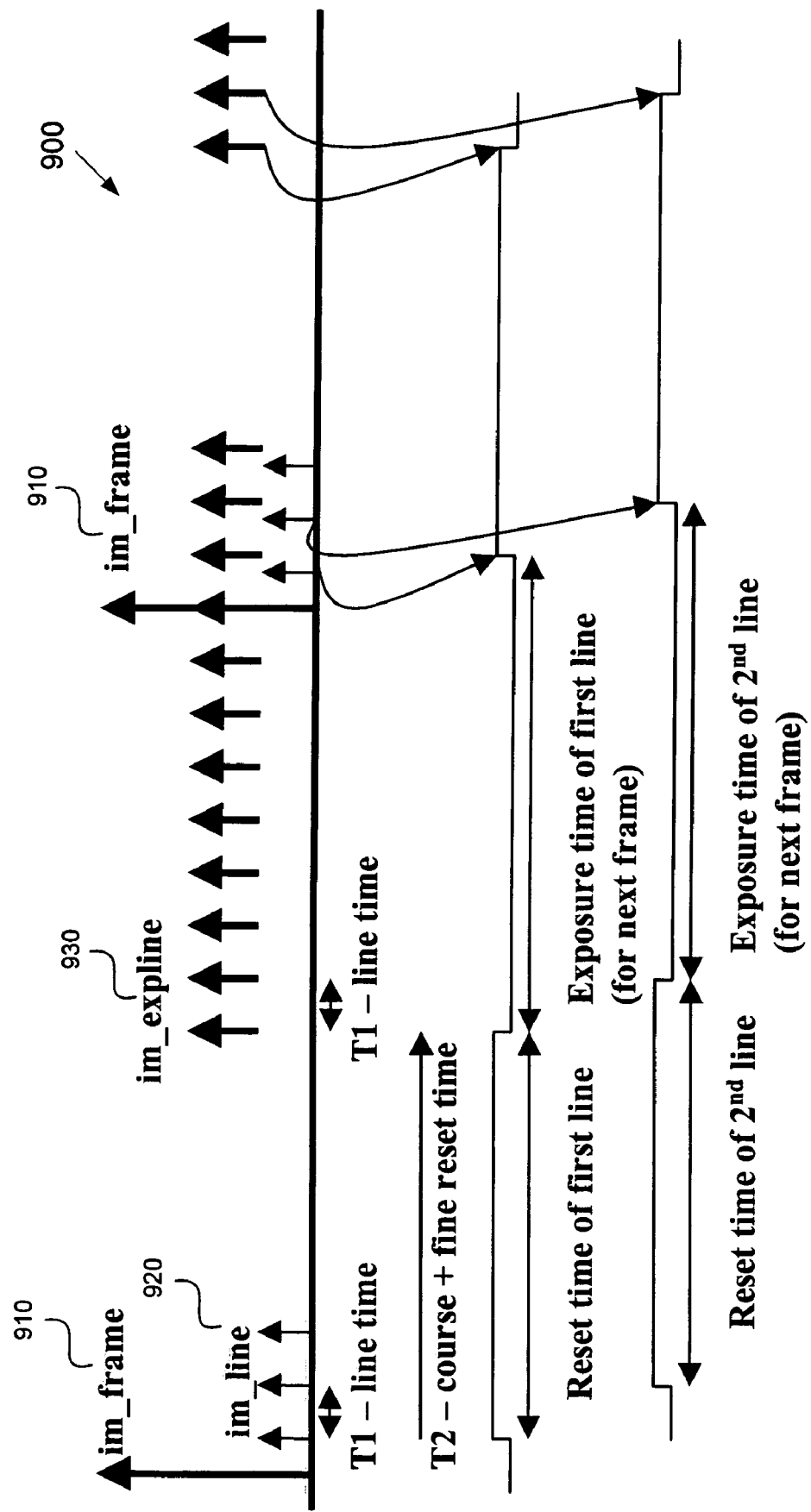
FIG. 14 is a timing diagram illustrating the exposure and sensing of a frame of video in accordance with an embodiment of the present invention.

Im_Line 920 starts the readout process of an image line, and also causes a reset to that line. One or more register values define the reset time for the first line. Further, a coarse exposure register value defines the number of lines between Im_Frame 910 signal activation and the end of the coarse reset time. Once the appropriate Im_Line 920 is reached, the number of pixel-cycles is counted according to a fine exposure register value. Once the reset time has elapsed, the integration time of the first line is initiated. The event is marked by the activation of Im_Expline 930 for one pixel-cycle. A second nine-bit counter is then loaded with the full-line length register and decremented on each pixel cycle. Once the nine-bit counter reaches a zero value, the integration time of the second line is initiated. Im_Expline 930 is activated for one pixel-cycle and the process repeats itself until the integration time of the last line is initiated. FIG. 14 illustrates the interaction of the previously described frame timing signals.

Figure 15:
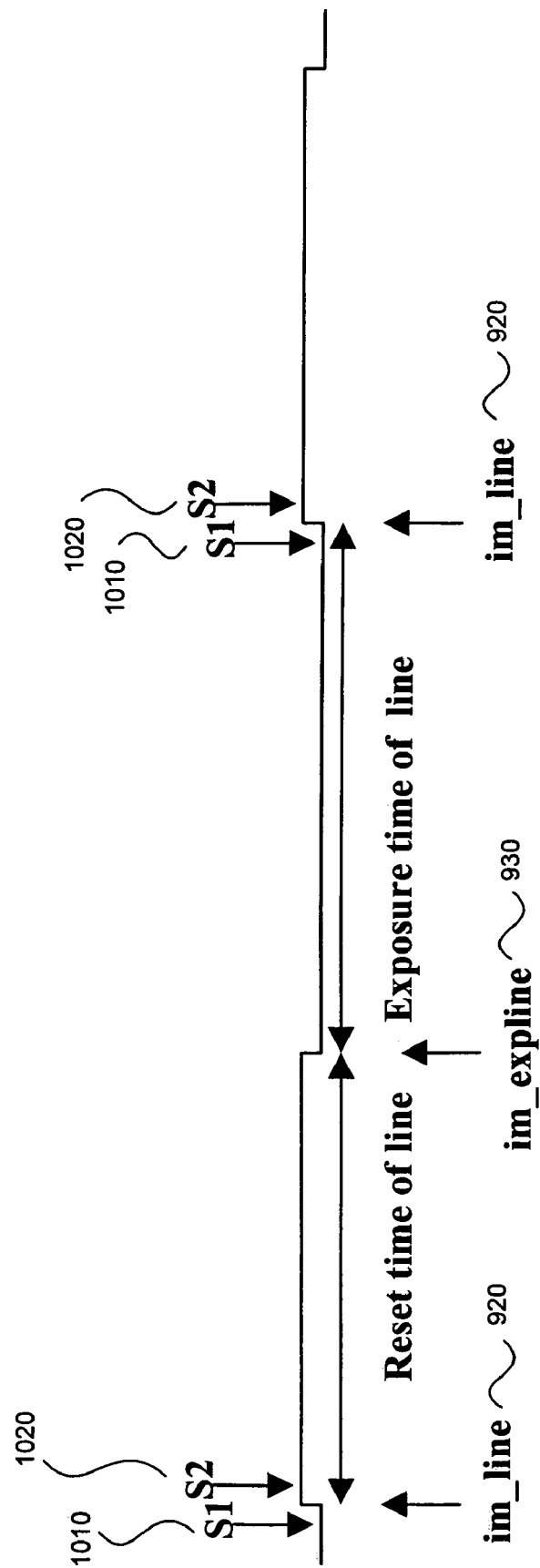
FIG. 15 is a timing diagram illustrating sampling of a pixel array incorporated in the sensor of FIG. 4.

Each activation of Im_Expline 930 starts the exposure of an image line, and Im_Line 920 signal starts the readout and reset processes. As illustrated in FIG. 15, the line is sampled twice, once at the end of the exposure time (element 1010), and for the second time right after the activation of the reset signal (element 1020).

Double buffering can be used for all frame parameters. This allows the Host or programmable processing core 112 to write the next frame parameters at any time. Implementation of the newly written parameters are, however, delayed until activation of the following Im_Frame 910 to avoid problems with the currently processing frame.

Referring again to FIG. 4, a signal created by a selected pixel within pixel array 700 is passed through analog mux 703 and source selection mux 709 prior to further processing by sensor 132. More particularly, the selected pixel signal is level shifted by level shift block 719, black level corrected by black offset block 723, and amplified by first stage programmable gain amplifier 729, and second stage programmable gain amplifier 733. The output of the amplified and corrected pixel signal is then passed from sensor 132 to ADC 134.

In one particular embodiment of imaging device 100, the level shift, and black offset are done in the digital domain. In other embodiments, the processes are performed in the analog domain, while in yet other embodiments, the level shift and amplification are performed in the analog domain, while the black offset is performed in the digital domain. Thus, it should be recognized that the point at which a selected pixel signal is presented to ADC 134 can be changed depending upon the particular embodiment. Further, the order in which amplification, black offset and level shifting are performed can be modified. For example, the selected pixel signal can be level shifted and amplified in the analog domain, passed to ADC 134, and subsequently black level corrected by black offset block 723 in the digital domain.

As further discussed below, analog signal processing portions of imaging device 100 are designed to ensure that as much as possible of an image detected by pixel array 700 is passed from the analog domain to the digital domain.

Further, power and bandwidth considerations are entertained in deciding whether the processing is performed in the analog or digital domain. Thus, the order of processing through ADC 134, level shift block 719, black offset block 723, amplifiers 729 and 733, as well as whether the blocks are implemented in the analog or digital domain can be adjusted to ensure that the entire resolution of ADC 134 is exploited, adjusted based upon power and bandwidth considerations, and/or a combination thereof.

As used herein, dark level is the level of the pixel signal due to leakage and other circuit related effects that occurs in unexposed pixel during a given exposure time. The dark level can be obtained by reading the pixels of the dark rows. Black level is the level of the pixel signal corresponding to the darkest pixel in a frame (e.g., shadowed areas of an image). White level is the level of the pixel signal corresponding to the brightest pixel in a frame (e.g., highlighted areas of an image).

As illustrated in FIG. 4, the selected pixel signal passed to ADC 134 is described by the equation:

$$V_{adc} = \left\{ (V_{mux} - \Delta V_{ref}) * (1 + im\_lsh\_gain) - (-1)^{im\_black[4]} \frac{\Delta V_{ref} im\_black[3:0]}{16} \right\} * \frac{2(1 + im\_gain\_m[2:0])}{1 + im\_gain\_d[1:0]}$$

The signals in the analog processing chain are differential voltages in the range negative one volt to positive one volt. The uncorrected and un-amplified output from source selector mux 713 is in the range of zero volts to one and one-half volts. Level shift block 719 converts the output from source selector mux 713 to a voltage range compatible with the other analog processing circuits. In some embodiments, level shift block 719 is operable in one of two different modes: a high gain mode and a high dynamic range mode. The high gain mode is selected by setting a register output im_lsh_gain 714 equal to a high level. The high gain mode operates by mapping a zero to one volt input range to a negative one volt to positive one volt range.

Figure 16:
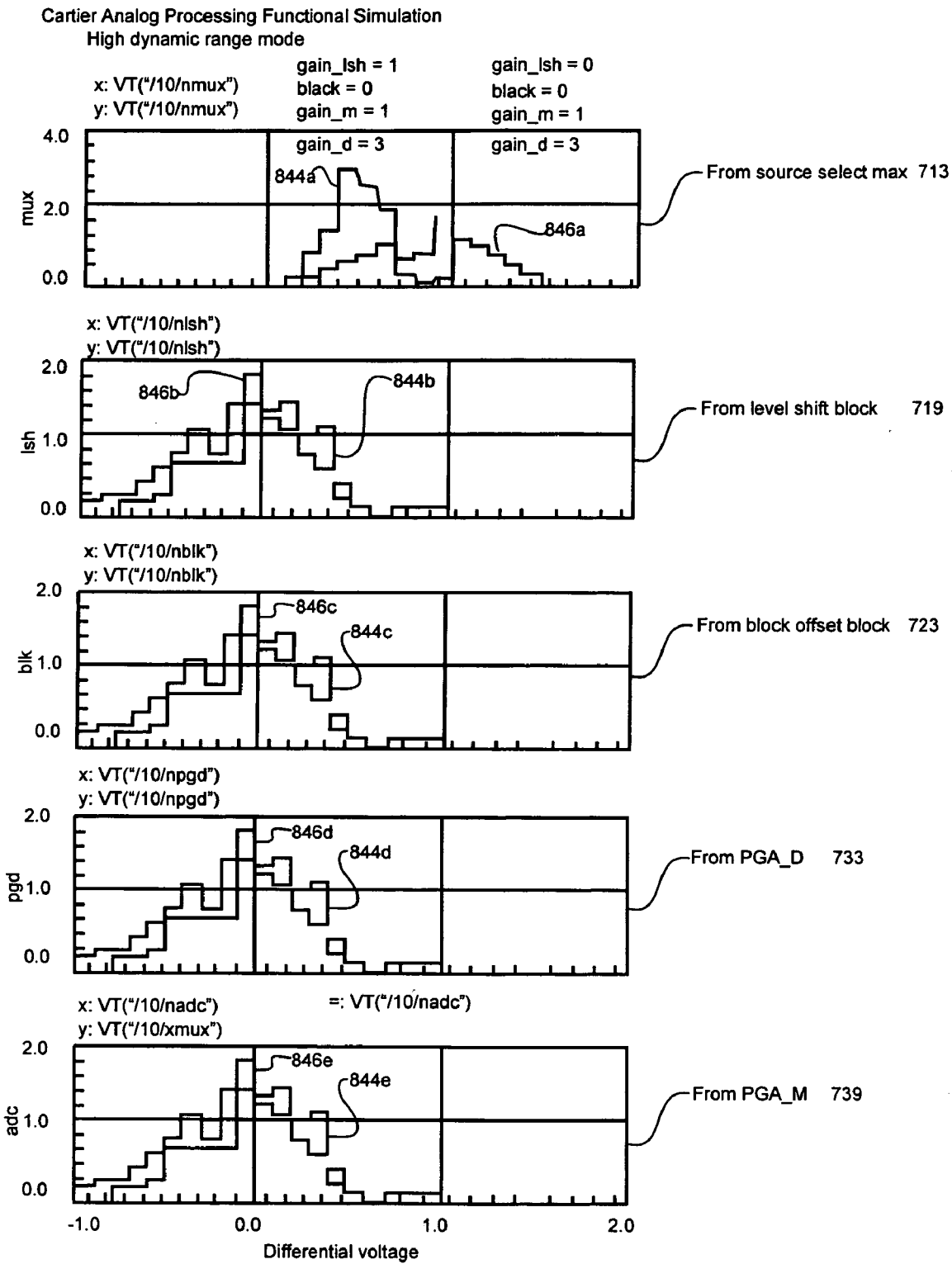
FIG. 16 illustrates high gain and high dynamic range modes of the level shift circuit of FIG. 4.

Alternatively, the high dynamic range mode is selected by setting a register output im_lsh_gain 714 equal to a low level. The high dynamic range mode operates by mapping a zero to two volt input range to the negative one volt to positive one volt range. FIG. 16 illustrates the correction and amplification of the selected pixel signal as it is received from source select mux 713 and passed through level shift block 719, black offset block 723, and amplifier stages 729, 733 for both high gain mode (signal 844) and high dynamic range mode (signal 846).

For a given exposure time, the voltages of most pixels in the frame will be in the range between the black level and the white level. In some embodiments, ADC 134 ideally converts only this voltage range, without losing resolution by eliminating signals outside of the range. In one particular embodiment, adjusting the voltages of the pixels to be in the range between black level and white level is achieved by black offset block 723. To this end, a control signal, im_black[4:0] (element 724), can be provided in sign-magnitude format and use to program the level adjustment to the proper level. In one embodiment, the resolution of black offset block 723 is equivalent to the thirty-two least significant bits of ADC 134.

Figure 17:
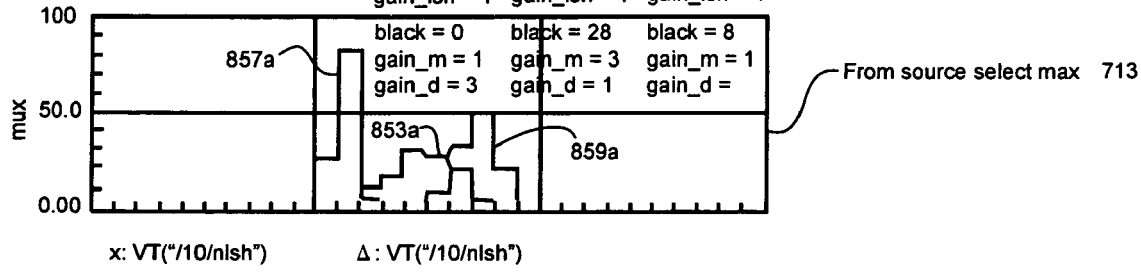
FIG. 17 illustrates the use of black level and gain controls in relation to the sensor of FIG. 4.
Figure 17:
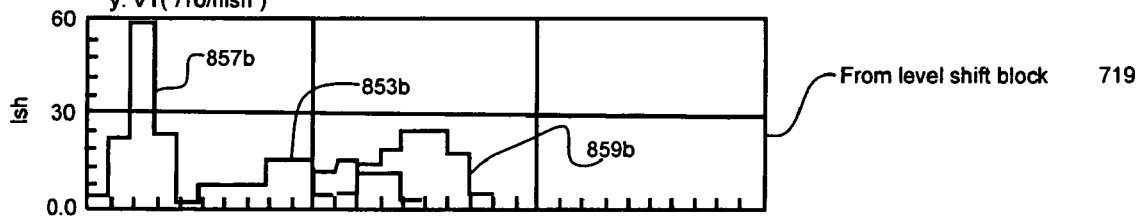
Figure 17:
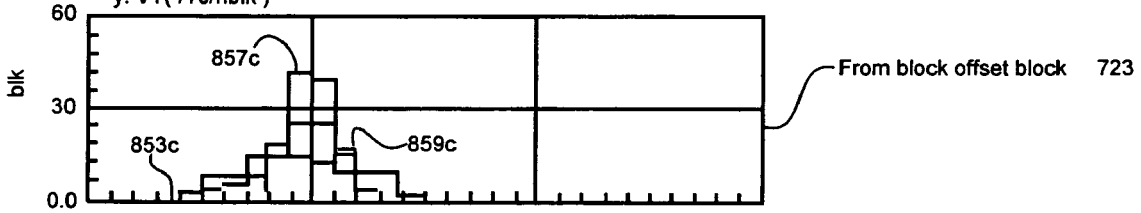
Figure 17:
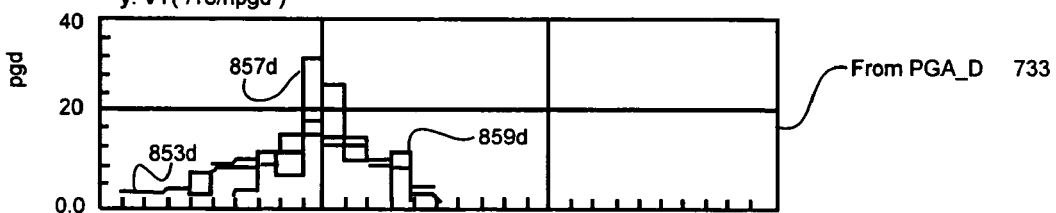
Figure 17:
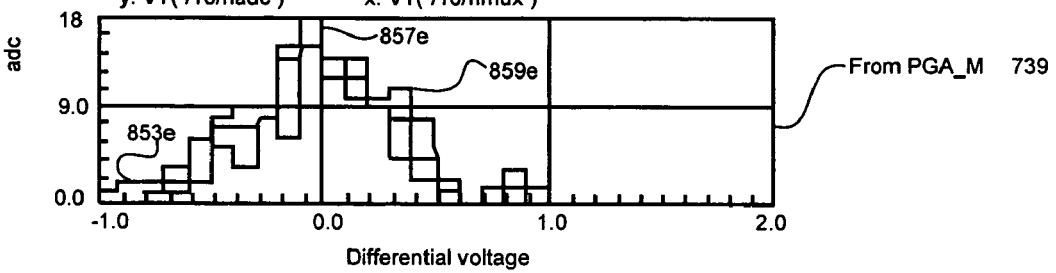

FIG. 17 illustrates examples of signal outputs for normally lighted (signal 853), dark (signal 857), and bright (signal 859) subjects from source select mux 713 that are passed through level shift block 719, black offset block 723, and amplifier stages 729, 733. The gain and black level values are all pixel color dependent. The red-green and blue-green ratios of the gain settings are determined in order to achieve gross white balance.

Figure 18:
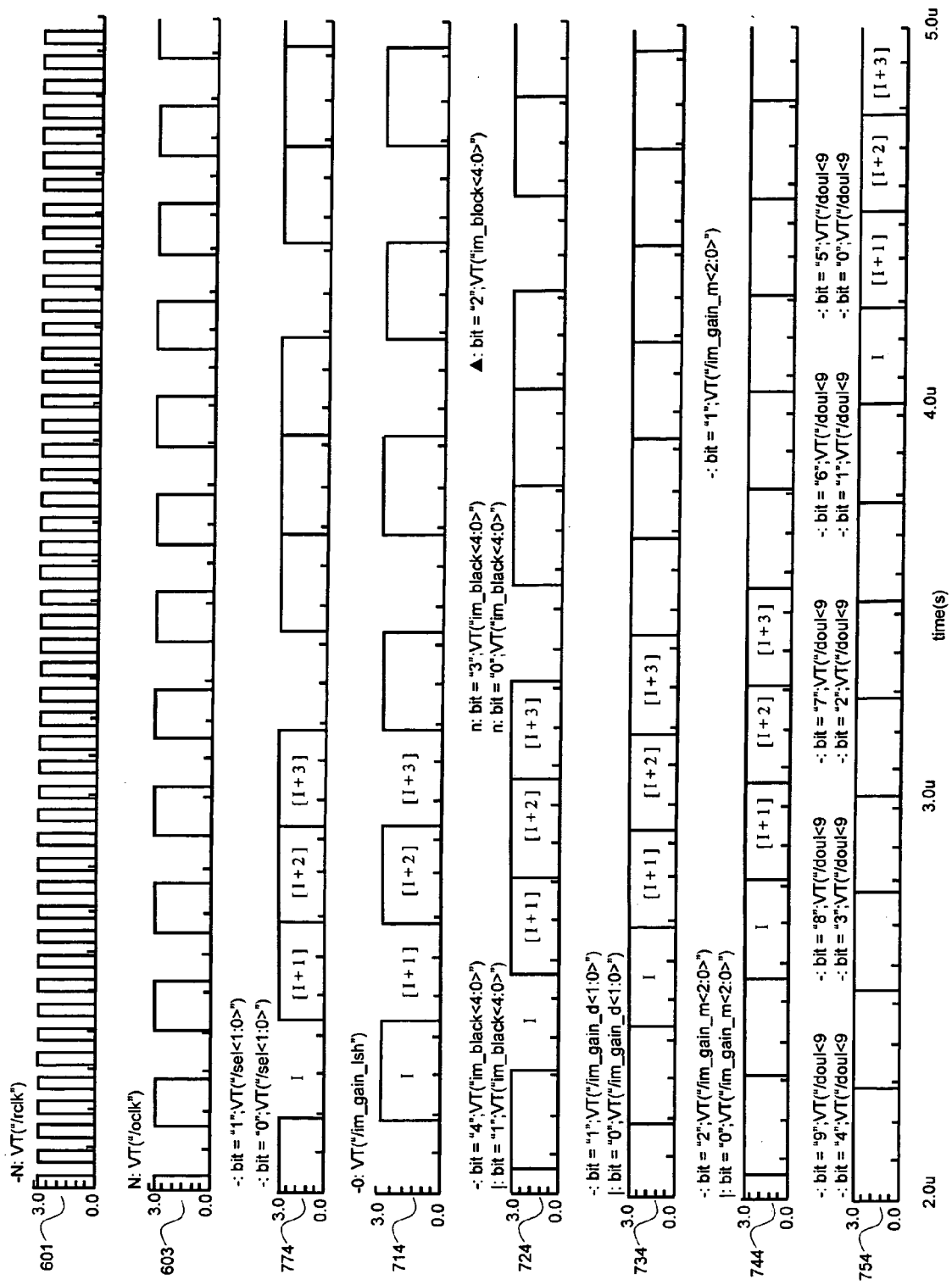
FIG. 18 is a timing diagram of various control signals associated with the sensor of FIG. 4.

An exemplary timing of the control signals for the analog processing circuits is presented in FIG. 18. A sel[1:0] (element 774) is representative of the timing of column address signals 797 and also and im_test[7:0] (element 704) signal. In one particular embodiment, a maximum exposure time is one frame at thirty frames per second, or 33.33 milliseconds, and a maximum gain of the analog chain is thirty-two (i.e, two from level shift block 719, and four from each of amplifiers 729 and 733). A pixel sensitivity of 0.226 [V/lux*sec] for a green pixel at 540 nm is provided by pixels within pixel array 700. Full scale of ADC 134 is two volts (e.g., negative one volt to positive one volt differential), where the least significant bit is 1.95 mV.

Using these parameters, the size of the analog processing section of imaging device 100 can be determined and optimized. For determining the resolution used to obtain the proper exposure, the lowest illumination level that can be translated to full scale response of ADC 134 corresponds to the maximal exposure time and maximal amplifier gain. The following equation describes the approach:

$$2[V]/(32*0.0333[sec]*0.226[V/lux*sec])=8.3[lux]$$

If the highest level of illumination is 100,000 [lux], the lowest exposure time needed assuming minimal amplifier gain of unity is:

$$2[V]/(1*100,000[lux]*0.226[V/lux*sec])=88.5[usec]$$

As in a CIF frame there are 101,376 pixels, the minimal exposure time corresponds to about three-hundred, fifty-four pixel cycles at thirty frames per second. Therefore, controlling exposure time at the resolution of one pixel cycle is adequate.

For sizing black offset block 723, it is assumed that the exposure is set so that at the output source select mux 713, the white level corresponds to a drop of one volt and the black level corresponds to a drop of 937.5 mV. If the amplifier 729, 733 gain is set to sixteen, and the black level DAC is five-bit (sign magnitude) with the least significant bit equaling 62.5 mV is set to fifteen, this will stretch the narrow histogram on the full resolution of ADC 134.

On the opposite end, for a dark picture where at the output of source select mux 713 the black level is zero and the white level corresponds to a drop of 62.5 mV, a setting of negative fifteen for the black level DAC and a gain of sixteen for the amplifier 729, 733 will stretch the narrow histogram on the full resolution of ADC 134.

The programmable gain amplifier 729, 733 has a maximum gain of sixteen and supports several functions including extending the exposure range for low illumination levels, providing gross white balance, and stretching the histogram as described in relation to black level correction. Programmable gain amplifier 729, 733 can be implemented as a two stage amplifier, where each stage exhibits a maximum gain of four. First stage programmable gain amplifier 729 is described by the following equation:

$$Gain_{PGA\_D} = \frac{4}{1 + im\_gain\_d[1:0]}$$

Second stage programmable gain amplifier 733 is described by the following equation:

$$Gain_{PGA\_M} = \frac{1 + im\_gain\_m[2:0]}{2}$$

There is separate gain control for each color filtered pixel. The parameters associated with the gain control are used for coarse white balance, and for enhanced exposure in dim light situations, where the maximum exposure time has been reached, but the output image is still too dark. The gain parameters are used for expanding the range of the sampled data to the full range of ADC 134.

The first sixteen lines of pixel array 700 are dark lines that are not exposed to light. Each of the lines are integrated similar to other lines and the dark level for each color is separately measured on the output of ADC 134. The average of the measured dark line values is passed back for Dark pixel correction of the lines that follow the dark lines in pixel array 700. The effect can be immediate, where the calculation result is activated during the readout of the same frame where the dark lines were evaluated.

Image device 100 includes two methods for calculating the dark offset. One or the other mode is selected by writing a predetermined mode selection in a register. The two modes are dark offset per column and average dark offset. Dark offset per column involves calculating and storing an offset value for each column. When reading the image area, the dark offset parameter selected based on the particular column that is currently being read from pixel array 700, where the combination of line number and column number indicates the color being read.

The offset for each column is averaged on the fifth to twelfth lines, giving a total of eight lines. The offset for each color component in each column is calculated as the average of four pixels of the same column and color, minus the fixed black offset that is applied during these lines. During the dark offset calculation, the black offset inputs are set to a positive known value and stored in a register, the color dependent gain is applied, and the output of ADC 134 is sampled.

Two RAMs of 384 by twelve-bits can be used. The output from ADC 134 for the first and second dark lines is written to the RAMs. For the following lines, the even-numbered line values are added to the first RAM entries, and the odd-numbered line values to the second RAM entries. After the seventh line (a "RED" line), values are added and the result is stored back in the RAM. The next line is processed in the same manner for the "BLUE" line offset. Throughout this process, the average offset per color is calculated as well.

During the period for lines twelve and thirteen, which are dark lines that are not read from the array, the RAM contents are read, and the "column noise" is calculated as follows:

Column_offset=(RAMsum)/4, rounded up

Noise=Column_offset−Average, 12 bits two's complement.

When reading the image pixels from pixel array 700, the "noise" dark offset is read from the RAM. The correction is performed in the digital domain on the output of ADC 134. The values that are stored in the RAM are subtracted from the output of ADC 134 according to the column number and the line type that is being read.

To simplify calculations, average dark offset mode is utilized. In the average dark offset mode, the first four lines are skipped, and only the next eight dark lines are evaluated. Evaluation is performed from pixel number sixty-four to pixel number three hundred nineteen, totaling 256 pixels per line. A total of 128×2 green, 128 blue and 128 red pixel values are collected. The result is averaged, limited, and stored in registers.

Further, in some embodiments, three four-bit black offset parameters are stored in a register for each of the three colors. The value in the registers are passed to imaging unit 130 and subtracted from or added to the analog image signal before the signal is passed to ADC 134. Thus, three four-bit digital to analog converters ("DAC") are used to convert the register values to the analog domain before the subtraction process is accomplished. The operation is performed in accordance with a sign bit that is passed along with each of the three register values. In some instances, the four-bit offset values are each multiplied by sixteen before the subtraction process is completed.

In addition, some embodiments of imaging device 100 include provisions for reducing random noise. Such provisions include, but are not limited to, applying the aforementioned charge injection technique to pixel reset signals, stopping operation of the various digital circuitry in imaging device 100 while each row of pixel array 700 is sampled, and providing a clock driving the analog circuitry that precedes the clock driving the digital circuitry to keep various substrate noise effects orthogonal in time domain. In one embodiment, such a phase difference between the analog clock and the digital clock is provided by deriving the analog clock from the falling edge of the digital clock, and subsequently adding some delay to the analog clock before applying it to ADC 134.

Some embodiments include additional measures to eliminate random noise that include, but are not limited to, providing analog processing switched capacitor circuits that use clock phases generated by ADC 134 and synchronizing control signals driving the analog circuitry using the clock generated by ADC 134. In addition, the sizes of the capacitors used in the switched capacitor circuits can be increased in order to meet the precision requirements and to reduced kT/Cnoise.

Some embodiments of the present invention provide for reducing power consumption of imaging device 100. Such processes can include reducing power consumption of the analog processing circuitry of imaging device 100, while in other embodiments, power consumption is reduced by reducing power consumption of the digital processing circuitry of imaging device 100. In one particular embodiment, power consumption is reduced by limiting power consumption by both the analog processing circuitry and the digital processing circuitry of imaging device 100.

Figure 19:
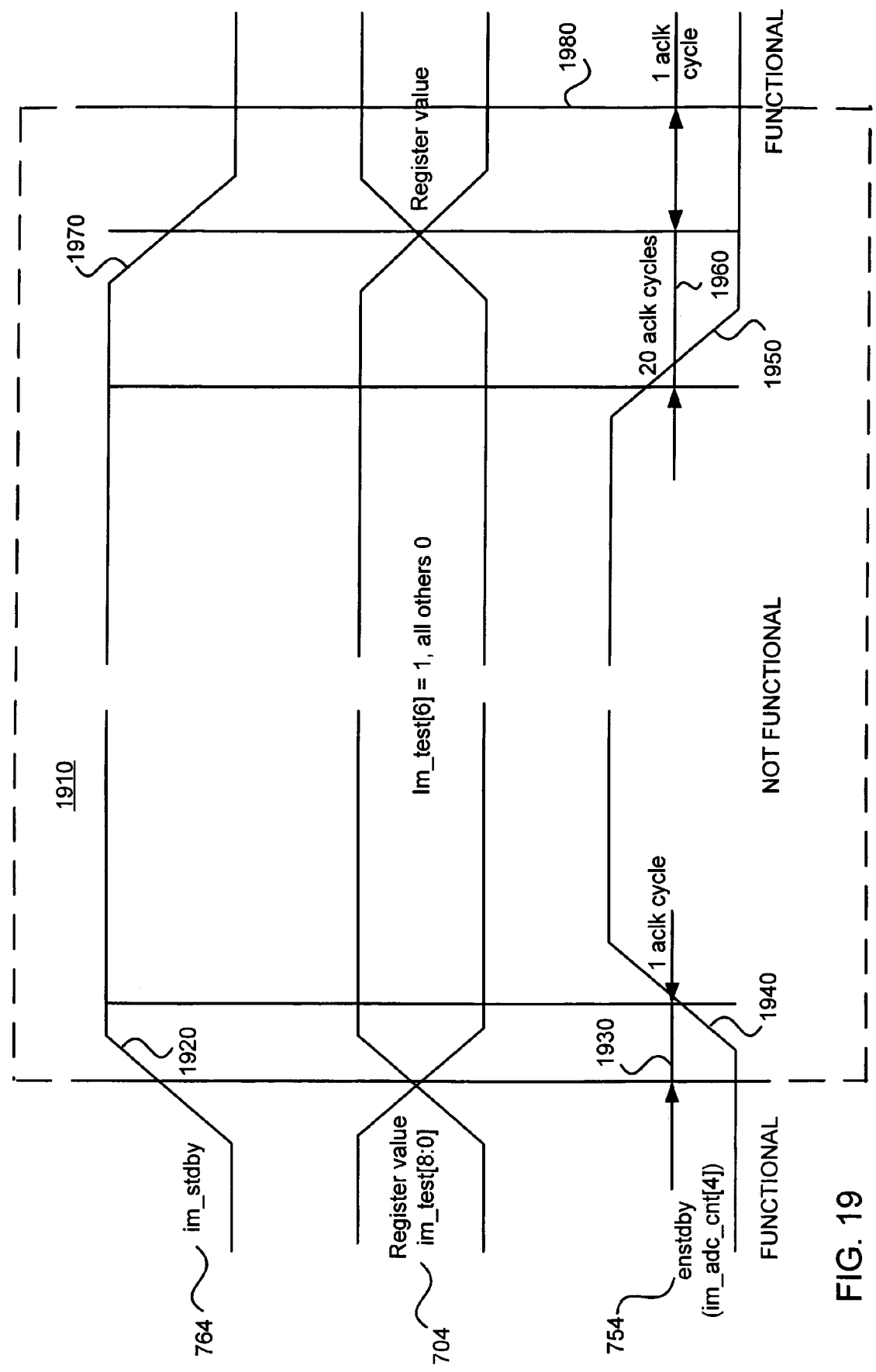
FIG. 19 is a timing diagram illustrating the interaction of various standby mode control signals.

FIG. 19 is a timing diagram illustrating the relationship between power consumption control signals, Im_stdby 764 and im_adc_cnt[4] 754. As previously illustrated in FIG. 4, Im_stdby 764 is provided to the various analog processing circuits of sensor 132 including analog mux 709, source selection mux 713, level shift block 719, black offset block 723, and programmable gain amplifier 729, 733. Im_adc_cnt [4] 754 is provided to ADC 134. Following FIG. 19, when Im_stdby 764 is asserted high (noted 1920), the analog processing circuitry stops functioning during a non-functional period 1910 surrounded by dashed lines. One cycle of aclk 603 after assertion of Im_stdby 764, Im_adc_cnt[4] 754 is asserted high (noted 1940), thus placing ADC 134 in the standby mode. To awake from the standby mode, Im_adc_cnt[4] 754 is deasserted (noted 1950) and twenty cycles of aclk 603 later (noted 1960), Im_stdby 764 is deasserted (noted 1970). Once Im_stdby 764 is deasserted, the analog processing circuitry becomes operational again one cycle of aclk 603 later (noted 1980).

During non-functional period 1910, the analog processing circuits will enter a low power consumption standby mode. In one embodiment of the standby mode, the common mode feedback of the operational amplifiers remains operational, but the circuits associated with the various analog processing calculations are disabled. This maintains the inertial state of the amplifiers, while reducing the power consumption of the analog circuitry associated with imaging device 100.

Figure 20:
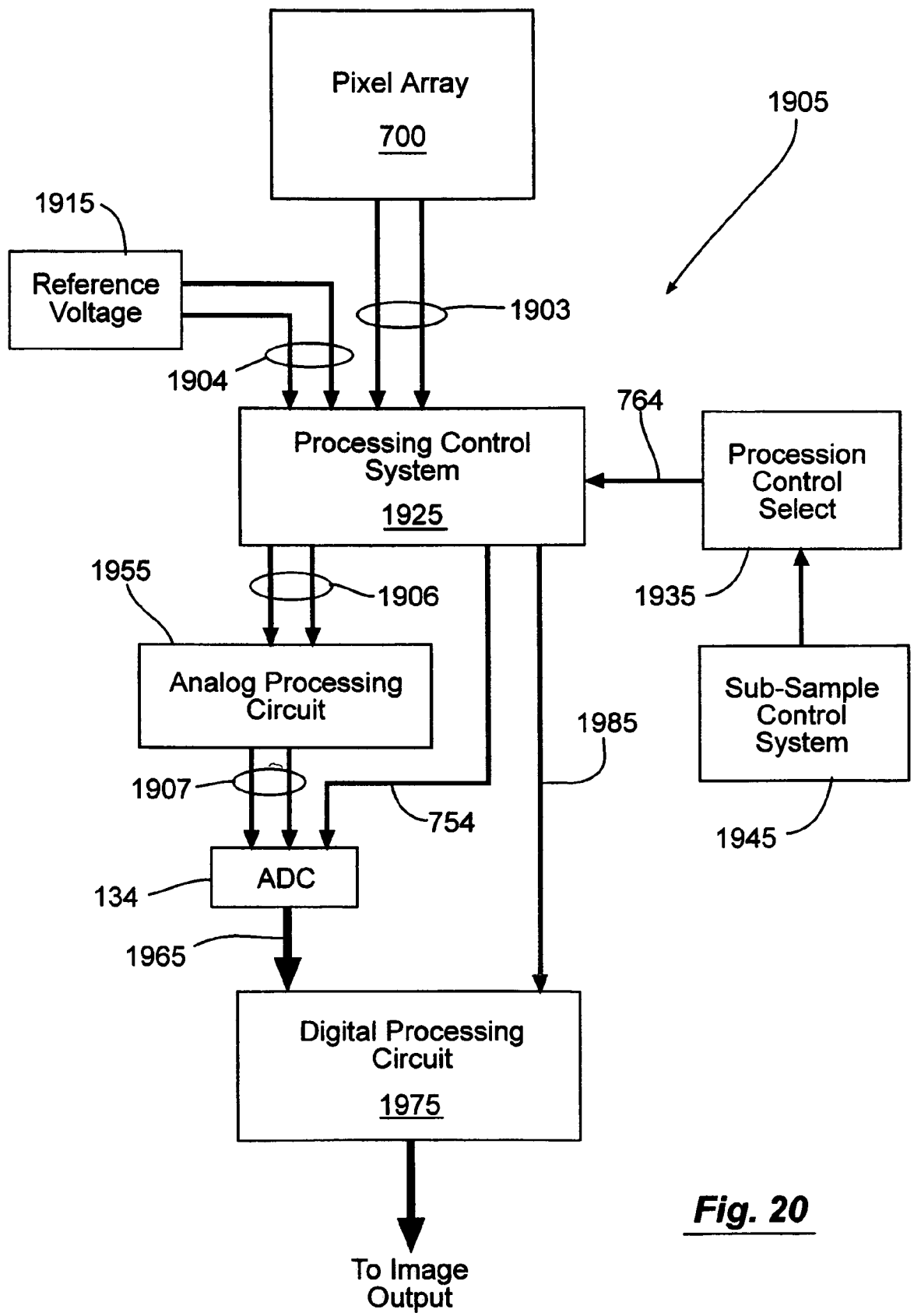
FIG. 20 is a block diagram of a standby mode circuit in accordance with embodiments of the present invention.

FIG. 20 illustrates a block diagram 1905 of circuitry related to controlling the standby mode. Block diagram 1905 includes pixel array 700 providing differential inputs 1903 to a processing control system 1925. Processing control system 1925 provides to an analog processing circuit 1955 via differential inputs 1906, either differential inputs 1903 or a differential reference voltage 1915 (received via inputs 1904). Differential inputs 1906 are processed by analog processing circuitry 1955 as previously discussed, and the results presented via differential inputs 1907 to ADC 134 are converted to the digital domain and passed to a digital processing circuit 1975 via a bus 1965. Digital processing circuit 1975 performs the various digital processing functions as previously discussed, and the processed data is provided as an image output.

In some embodiments, analog processing circuit 1955 includes column amplifier 703, analog mux 709, source selection mux 713, level shift block 719, black offset block 723, and programmable gain amplifier 729, 733. In other embodiments, analog processing circuit 1955 includes a subset of the aforementioned element. For example, in one particular embodiment, analog processing circuit 1955 includes level shift block 719, black offset block 723, and programmable gain amplifier 729, 733. Thus, depending upon the design, one or more of the aforementioned blocks can be placed in standby mode either individually, or as a group. Further, in some embodiments, digital processing circuit 1955 includes translation unit 150 and parallel interface unit 190. In other embodiments, digital processing circuit 1955 includes only one or the other of translation unit 150 and parallel interface unit 190.

In some cases, only a subset of the pixels within pixel array 700 are processed and provided as an image output. For example, bandwidth available for the image output may be less than that required to output each pixel of pixel array 700. As a more specific example, every other pixel line and/or pixel column of pixel array 700 may be dropped. In such cases, embodiments of the present invention provide for limiting power consumption of imaging device 100 by placing analog processing circuit and/or digital processing circuit 1975 in the standby mode. To do this, a sub-sample control system 1945 provides an indication about whether a particular line, column and/or pixel is to be processed. This indication from sub-sample control system 1945 is used to generate Im_stdby signal 764 which, as previously discussed, controls whether analog processing circuit 1925 and/or digital processing circuit 1975 are to enter the standby mode, or remain operational.

In some embodiments, sub-sample control system 1945 is a hardware system utilizing information from frame rate block 114 of control unit 110 and/or TCAG 136 of imaging unit 130 to determine where in a frame a received pixel is from, and whether the pixel is to be processed. Alternatively, in other embodiments, sub-sample control system 1945 is implemented in software and executed by programmable processing core 112. In yet another embodiment, sub-sample control system 1945 is a hybrid hardware and software implementation utilizing relevant portions of TCAG 136, frame rate block 114, and/or programmable processing core 112.

In one particular example where only two of every four pixel lines are processed, sub-sample control system 1945 monitors the addressing of pixel array 700 and causes Im_stdby 764 to assert each time a non-processed pixel line is addressed. This causes processing control system 1925 to present reference voltage 1915 to analog processing circuit 1955 in place of differential input 1903 from pixel array 700. Reference voltage 1915 is electrically coupled to switching inputs of analog processing circuit 1955, thus reducing power dissipation due to switching circuits in analog processing circuit 1955. However, the common mode feedback of the operational amplifiers within analog processing circuit 1955 continue operating. This maintains the inertial state of the amplifiers, while reducing the power consumption of the analog circuitry associated with imaging device 100.

In addition, Im_adc_cnt[4] 754 is asserted to place ADC 134 in a similar standby mode. Yet further, a digital disable signal 1985 is provided from processing control system 1925 to digital processing circuit 1975. This signal is used to gate the various clocks distributed to the various operating units of imaging device 100. In some embodiments, processing control system 1925 comprises portions of Rclk unit 102. In such embodiments, the various clock signals are gated by Rclk unit 102 and there is no reason to provide digital disable signal 1985 to digital processing circuit 1975.

Figure 21A:
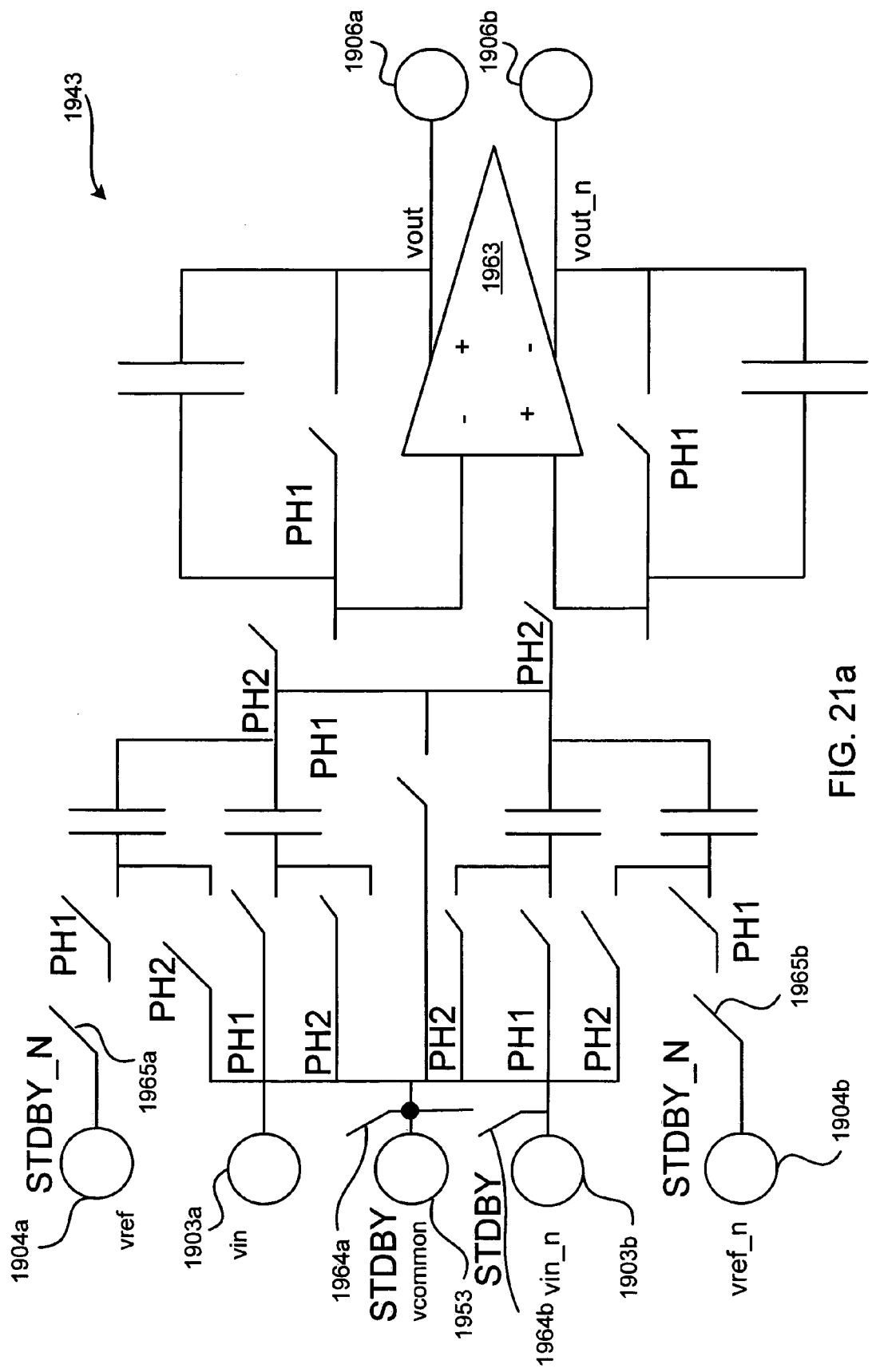
FIGS. 21 illustrates an implementation of a standby mode in a switched capacitor circuit in accordance with embodiments of the present invention.

FIG. 21*a* illustrates an exemplary circuit 1943 used to electrically couple analog circuits within analog processing circuit 1955 to reference voltage 1904. In circuit 1943, PH1 and PH2 are non-overlapping clock phases. In standby mode, there is no switching to vref 1904*a* and vref_n 1904*b*, rather inputs 1903 are shorted to vcommon 1953 to limit switching. With such a circuit, both the bias currents of the Op-Amps, as well as the switching related to analog calculations is reduced. However, switching sufficient to keep the common mode feedback loops of an amplifier 1963 active is maintained. When Im_stdby 764 is asserted high, standby switches 1964 are shut and operational switches 1965 are open. Thus, switching in circuit 1943 is limited.

Figure 21B:
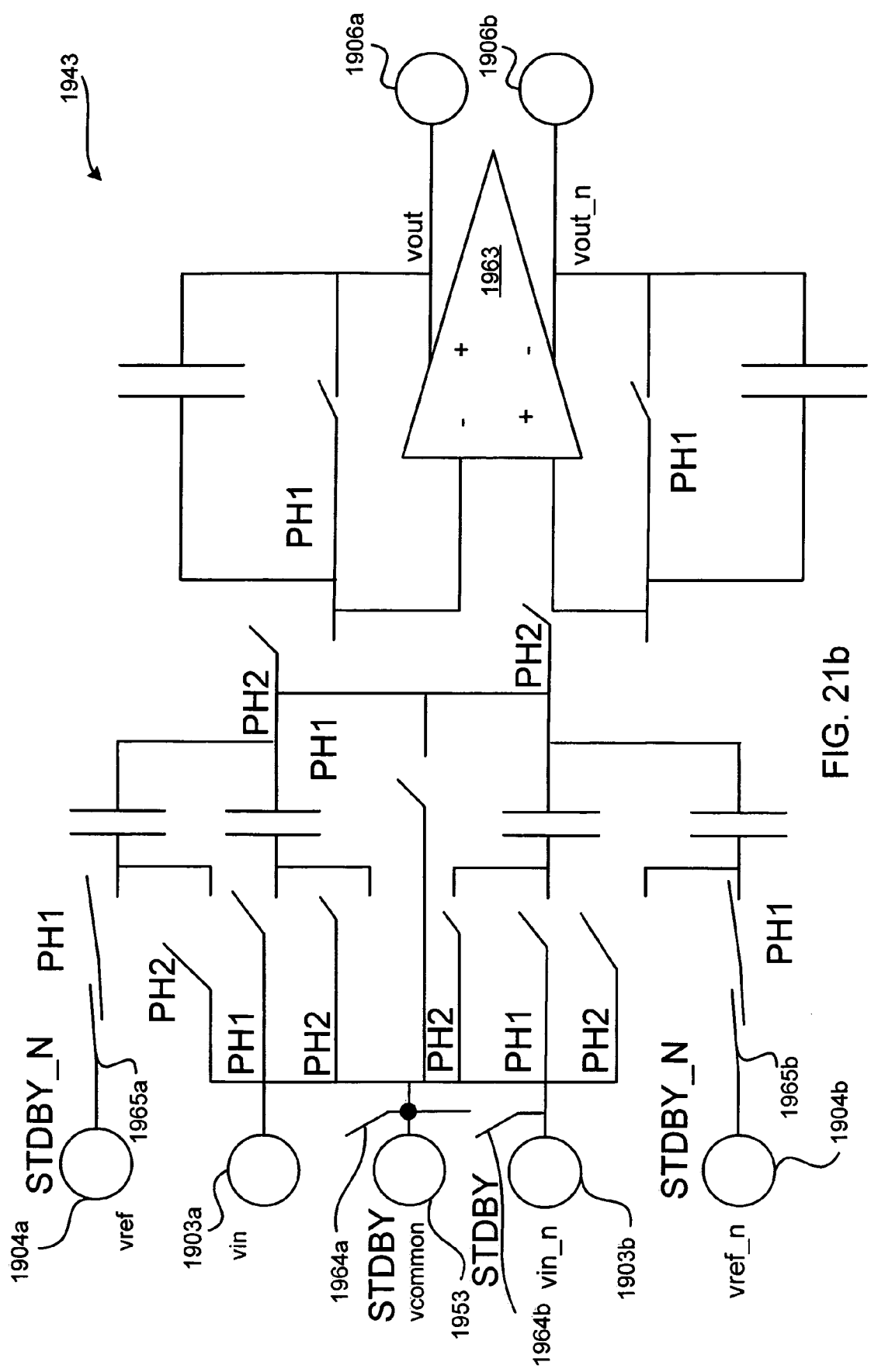
Figure 21C:
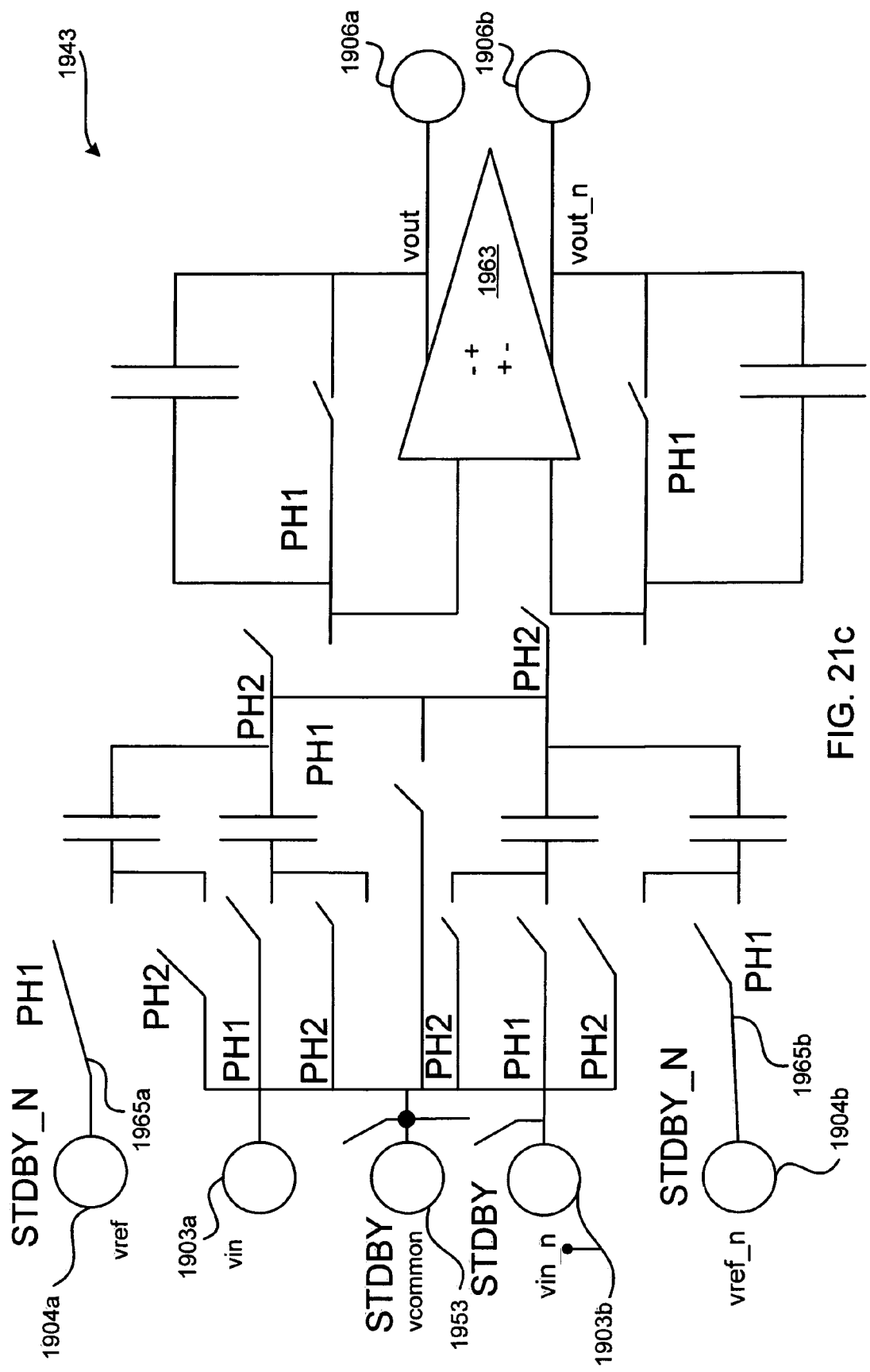

FIG. 21*b* illustrates exemplary circuit 1943 when Im_stdby 764 is deasserted, and circuit 1943 is operating in phase one, PH1. FIG. 21*c* illustrates exemplary circuit 1943 when Im_stdby 764 is similarly deasserted, but circuit 1943 is operating in phase 2, PH2.

Figure 22:
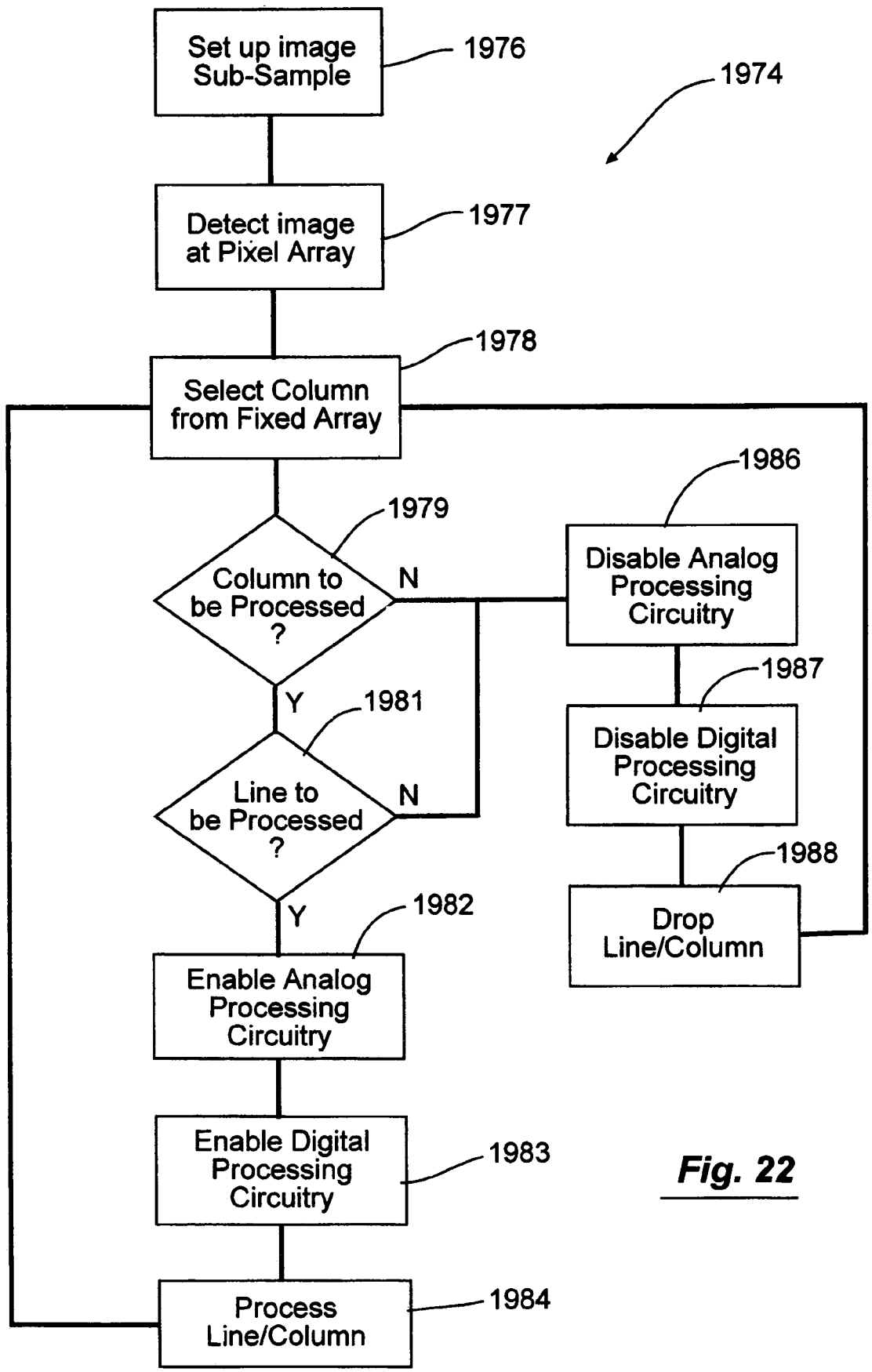
FIG. 22 is a flow diagram illustrating a method of entering and exiting a standby mode in accordance with embodiments of the present invention.

FIG. 22 is a flow diagram 1974 illustrating a method according to the present invention for entering and exiting the standby mode. Following flow diagram 1974, parameters associated with sub-sample control system 1945 are set-up (block 1976). This can include writing various registers controlling the portions of pixel array 700 that are processed. Such a register write can be performed by programmable processor control 112 and/or the Host. An image is detected from pixel array 700 (block 1977). Pixel array 700 is addressed by TCAG 136 to cause a desired column of pixel signals to be presented by pixel array 700 (block 1978). If sub-sample control system 1945 indicates that the column is to be processed (block 1979) and that the line is to be processed (block 1981), then the analog processing circuitry 1955 is enabled, or awakened from the standby mode (block 1982). Further, digital processing circuitry 1975 is enabled by removing the clock gate (block 1983). With the circuitry thus enabled, the pixel signals received from pixel array 700 are processed.

Alternatively, where either the pixel column (block 1979) or the pixel line (block 1981) is not to be processed, analog processing circuit 1955 (block 1986) and digital processing circuit (block 1987) are placed in the standby mode to conserve power. In such a state, the pixel signals received from pixel array 700 are dropped and not processed (block 1988).

Figure 23:
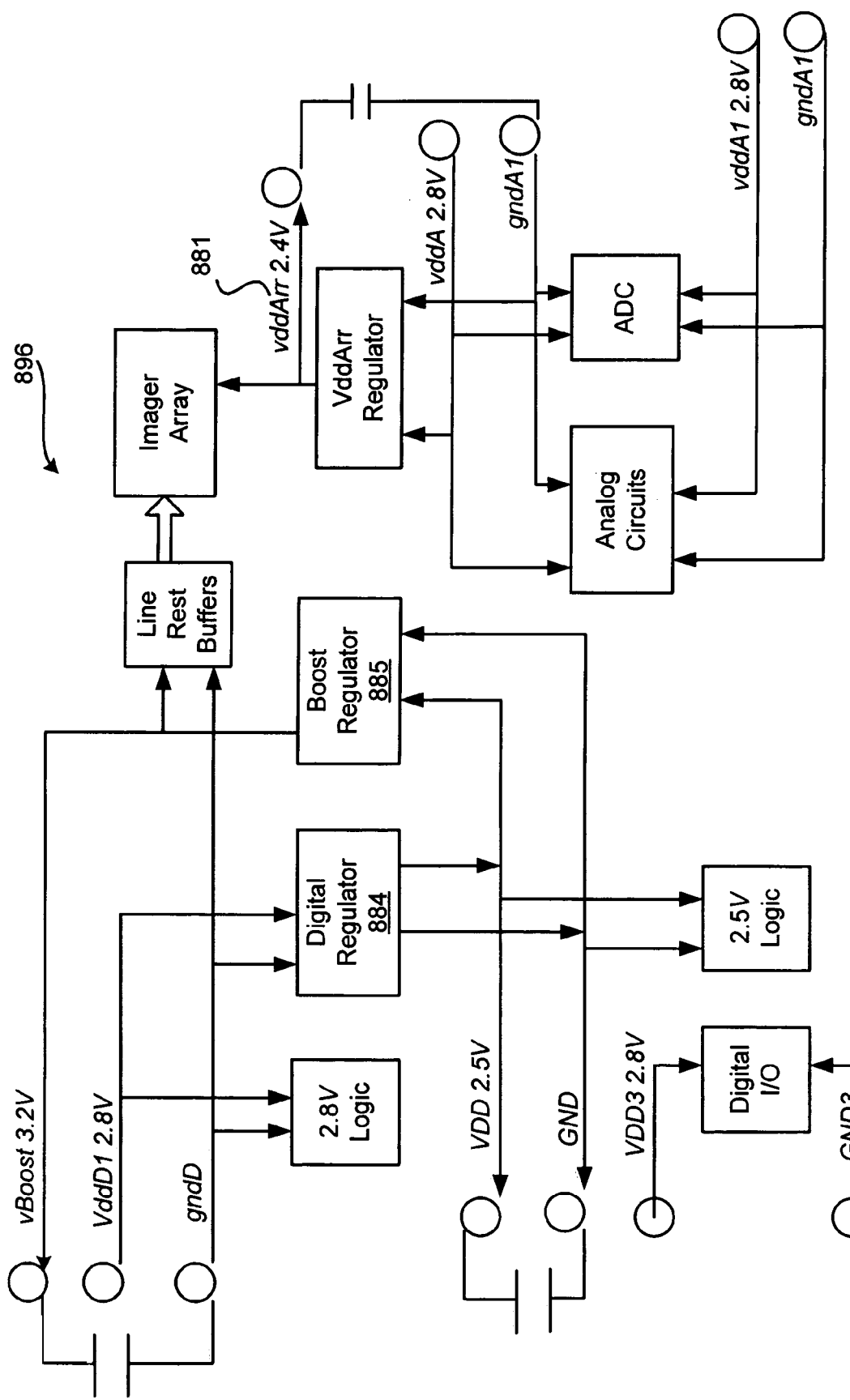
FIG. 23 is a block diagram of a power distribution circuit for use in relation to the CMOS imager of FIG. 1.

The power distribution and management scheme for the analog circuitry provides a supply of 2.8 volts+/−10%. On-chip regulators are used to provide the following supply voltages: _2.5 volts+/−10% for the 0.25 u digital circuits, 2.4 volts+10/−5% for the imager array on a vddArr 881 supply, and 3.2 volts+10/−5% for the imager array line reset drivers. A block diagram 896 of the power management for imaging device 100 is illustrated in FIG. 23. As illustrated, the regulators are controlled by the following signals: a reg_d_enable 882 signal the when asserted low causes the digital regulator to enter standby mode with the 2.5 V voltage is supplied from an external source. In order to enable power up, reg_d_enable 882 is gated with an atest 883 signal as shown in FIG. 23. At power up atest 883 is kept low forcing reg_d_enable 882 high. When reg_d_enable is 882 is high, the digital regulator output voltage is reduced to 2.0 V. The order of power-up of the regulators has to be digital regulator 884 first and only then a boost regulator 885. The clock of boost regulator 885 has to be provided by the digital circuits. It is a clock in the range of 500 KHz to 1 MHz, obtained by dividing Rclk 601 by sixteen. The edges of the divided clock should be aligned with the digital signals (i.e., aligned with the rising edge of Rclk 601).

To facilitate testing and/or characterization, imaging device 100 includes one or more built in self test ("BIST") routines. In particular embodiments, the BIST routines provide the ability to test one or more of blocks 700, 703, 709, 713, 719, 723, 729, 733, and/or 134 using a digital tester. In some cases, such testing can further be accomplished with or without illumination of imaging device 100. Such approaches can reduce the costs and increase the rate at which the functionality of imaging device 100 is verified.

In some embodiments, one or more additional lines of "pseudo"-pixels are included within pixel array 700. The output from the pseudo-pixels can be a pre-defined voltage that remains constant regardless of any light impinging upon pixel array 700. For example, in one instance, the pseudo-pixels have an output of one volt that is passed to the column amplifiers. These pixels are activated by asserting im_line_test (element 737). The outputs of the pseudo-pixels are passed through column amplifier 703, and analog mux 709. In turn, the outputs are passed though source selector mux 713 by proper setting of im_test[8:0] (element 704). Im_test[8:0] (element 704) is derived from decoding a programmable digital register (im_test_en[3:0]). The outputs are then passed through one or more of blocks 719, 723, 729, 733, and 134. The output of ADC 134 can then be compared against a range of values to determine if imaging device 100 is within acceptable design limits. The comparison can be performed either by a programmable hardware comparator, a hardwired hardware comparator, or via programmable processor core 112. Such a test provides an ability to test the operation of column amplifier 703, and/or one or more of blocks 719, 723, 729, 733, and 134. As the inputs and outputs associated with the test are available in the digital domain, a purely digital test of the analog circuit can be performed. This provides an efficient and cost effective means for verifying the functionality of imaging device 100 as testing of the analog circuitry can be performed on a digital tester.

As previously stated, an output to be tested using one or more of the BIST routines can be passed through one or more of blocks 719, 723, 729, 733, and 134. Which blocks the outputs pass through is programmable. Using such a programmable approach, each block can be individually bypassed. Such bypassing allows for the output of each block individually, or a combination of the blocks to be tested to be isolated for testing purposes. Bypassing of the individual blocks is controlled by signals im_by_lsh 702 to bypass level shift block 719, im_by_blk 712 to bypass black offset block 723, im_by_pgd 722 to bypass first stage programmable gain amplifier 729, and im_by_pgm 732 to bypass second stage programmable gain amplifier 733.

Further, in some embodiments, source selector mux 713 permits application of various test voltages to the input of the analog processing circuitry. This provides for applying known analog voltages to one or more portions of analog processing blocks 719, 723, 729, 733, 134. In one embodiment, the digital output generated by applying the known analog voltage to the blocks is compared against a predetermined value, or range of values. In this way, testing of analog blocks 719, 723, 729, 733, 134 can be performed as a purely digital test, where im_test (8:0) (element 704) is generated from a programmable digital register (im_test_en [3:0]), and the outputs are each tested in the digital domain. Again, this provides an efficient and cost effective means for verifying the functionality of imaging device 100 as analog testing can be performed on a digital tester. Further, as each of blocks 719, 723, 729, 733 can be individually bypassed, any combination of blocks 719, 723, 729, 733 can be verified using the digital test.

In one particular embodiment of the present invention, source selector mux 713 selects between five input voltages based on im_test(8:0) (element 704). More particularly, source selector mux 713 permits connecting reference voltages (v_ref 706, common 716, and vref_n 726) that are generated internal to imaging device 100 to the input of the analog processing blocks. In some embodiments vref 706 and vref_n 726 are derived from ADC 134, and common 716 is a provided via a resistive divider coupled to the source voltage. In addition, source selector mux 713 also provides for selecting externally generated reference voltages, atest 736 and atest_n 746 that can be bonded to input pads of imaging device 100. By selecting one of the five reference voltages 706, 716, 726, 736, 746, a known voltage can be applied to one or more of blocks 719, 723, 729, 733, and output via ADC 134. The output of ADC 134 can then be compared against a range of values to determine if imaging device 100 is within acceptable design limits.

In some embodiments, an additional test mechanism provides for digital testing of each column within pixel array 700. In such a test, pixel outputs from pixel array 700 are paired with an output from reset level 743. Reset level 743 consists of a group of pixels kept under a reset state and a column amplifier identical to column amplifier 703. BIST pixels within pixel array 700 are selected and the outputs from the pixels are passed through a selected portion of column amplifier 703 and analog mux 709. One side of the output is then paired with a known reset level 743 signal and selected via source selector mux 713. This pairing between the known reset level 743 and the output from the various BIST pixels is then passed through one or more of blocks 719, 723, 729, 733, and 134. The output of ADC 134 can then be compared against a range of values to determine if imaging device 100 is within acceptable design limits. Such a test provides an ability to test the operability of each column amplifier within column amplifier 703, using a digital tester and without requiring illumination of imaging device 100. The various BIST modes for one particular embodiment are described in Table 4 below.

TABLE 4

Test Modes For Analog Blocks

| im_test_en[3:0] | im_test active | Positive output of source selector mux 713 connected to | Negative output of source selector mux 713 connected to | Comments |
| --- | --- | --- | --- | --- |
| 0000 | 0 | Positive output of analog mux 709 | Negative output of analog mux 709 | Normal operation with CDS |
| 0001 | 1 | Reset level 743 | Negative output of analog mux 709 | Normal operation without CDS |
| 0010 | 2 | Reset level 743 | Positive output of analog mux 709 | Testing reset sampling branch of column amplifier |
| 0011 | 3 | atest 736 | atest_n 746 | Testing with external signal |
| 0100 | 4 | vref_n 726 | vref 706 | −1 V |
| 0101 | 5 | common 716 | vref 706 | −0.5 V |
| 0110 | 6 | common 716 | common 716 | 0 V |
| 0111 | 7 | common 716 | vref_n 726 | 0.5 V |
| 1000 | 8 | vref 706 | vref_n 726 | 1 V |

In one particular embodiment, ADC 134 is a ten-bit ADC with pipeline architecture. The ten-bit output from ADC 134 is passed to translation unit 150. For the various dark-current calculations, four ten-bit outputs are averaged, and the most significant ten-bits of the average value are used.

Translation Unit

Translation unit 150 provides color processing for imaging device 100. Parameter and mode registers associated with translation unit 150 are loaded via control bus 101. A Bayer image is received from imaging unit 130, processed by translation unit 150, and transferred to parallel interface 190 for output via parallel interface I/O 192. While processing the image, statistics are calculated by translation unit 150. After completing the processing of an image, translation unit 150 produces an interrupt to control unit 110 indicating that processing is complete and that the statistics are ready to be read by control unit 110 via control bus 101.

Translation unit 150 receives the Bayer grid as input from imaging unit 130. For each received pixel, two color values are missing and need to be reconstructed. Translation unit 150 reconstructs the RGB set for each pixel, performs various correction algorithms, and generates a YUV representation of the image.

Figure 24:
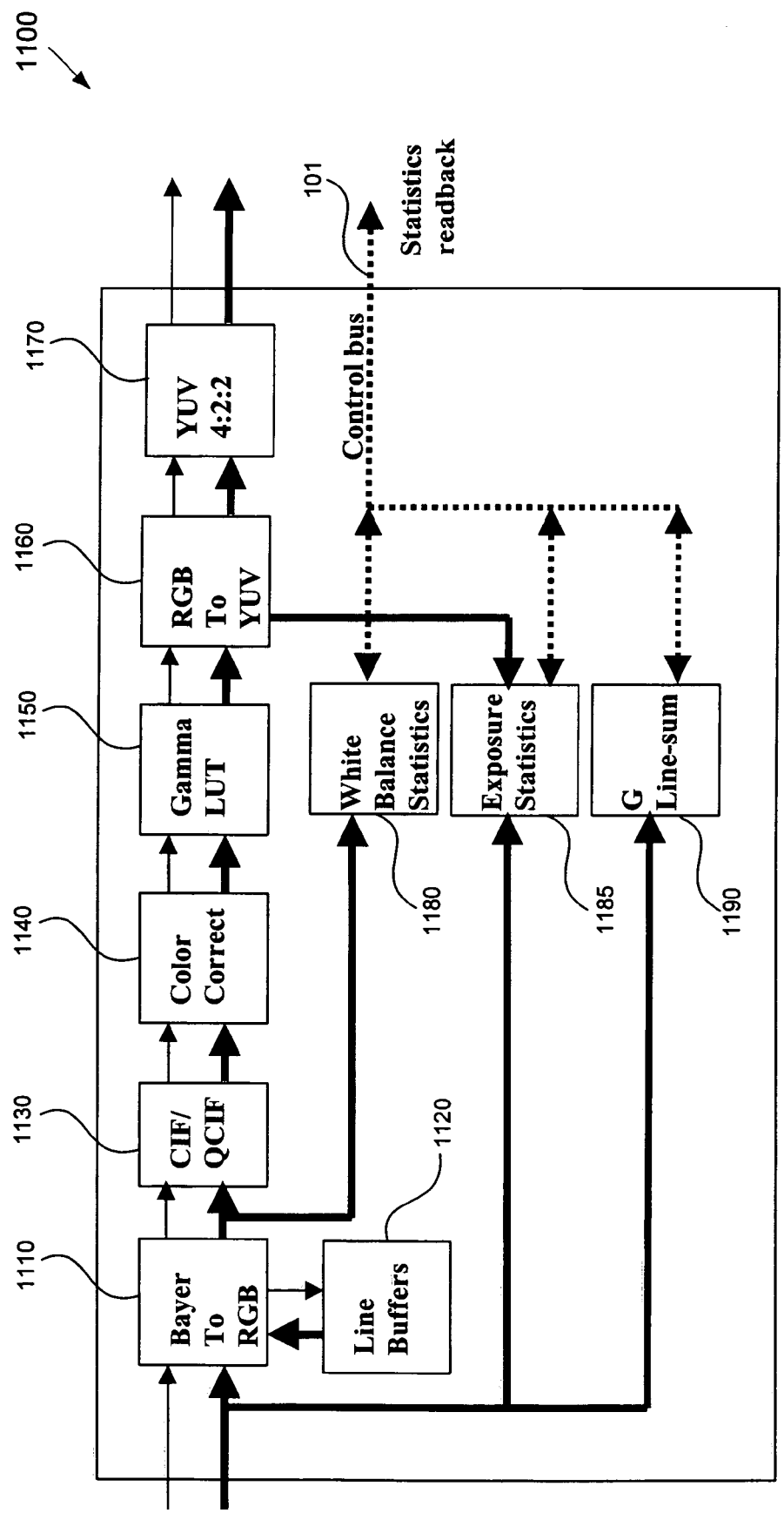
FIG. 24 is a block diagram of a translation unit for use in relation to the CMOS imager of FIG. 1.

FIG. 24 provides a block diagram 1100 illustrating translation unit 150 in greater detail. As illustrated, translation unit 150 includes an RGB reconstruction block 1110 (for demosaicing), a CIF-to-QCIF reduction block 1130, a color and white-balance correction block 1140, a gamma look-up table ("LUT") 1150, an RGB to YUV generation block 1160, a twenty-four bit YUV to 4:2:2 conversion block 1170, and a statistics block 1195. Statistics block 1195 includes a white balance statistics block 1180, an exposure statistics block 1185, and a G line-sum block 1190 for providing a sum of G Bayer components per line used to detect flicker.

RGB reconstruction block 1110 receives the Bayer input from imaging unit 130 and calculates all three color components for each pixel. Median Interpolation method is selected for the Bayer-to-RGB conversion. For green reconstruction from a pixel whose Bayer component is either red or blue, the green color component is given by the median value of the four surrounding Green Bayer components. The median function is defined as the average between the two values that remain when a series of four values is evaluated, and the minimum and maximum values are removed.

For Blue reconstruction from a pixel whose Bayer component is either Red or Green, the Blue color component is given by the median value of the four surrounding Blue Bayer components. For a pixel whose Bayer component is green located at a blue line, the blue value is the average of the two adjacent blue Bayer components in the same line. Further, for a pixel whose Bayer component is green located at a red line, the blue value is the average of the two adjacent blue Bayer components in the same column.

For red reconstruction at a pixel whose Bayer component is blue, the red color component is given by the median value of the four surrounding red Bayer components. At a pixel whose Bayer component is green located at a red line, the red value is the average of the two adjacent red Bayer components in the same line. At a pixel whose Bayer component is green located at a blue line, the red value is the average of the two adjacent red Bayer components in the same column. After reconstruction, the resulting RGB image is smaller than the Bayer input image by two columns horizontally, and two lines vertically.

In some embodiments, imaging device 100 provides three methods for producing a QCIF size image. In the first method, a QCIF sized window is read from a CIF sized array. For the method, no special processing is needed and the RGB per pixel is calculated in the same manner as for a CIF sized image. The method provides a limited Field of View ("FOV"), but provides a good resolution.

In the second method, the array read out of pixel array 700 is down-sampled. This method is implemented in the imaging unit 130. The third method is a Median Billinear method. In the method, the CIF sized Bayer image is first converted to an RGB image using the Median method. Then, if down-sampling is selected, the CIF image is reduced to a QCIF size image using a (¼, ½, ¼) filter—horizontally and then vertically.

In some embodiments of imaging device 100, color correction block 1140 can be used to compensate for any disparity between the RGB filters on imaging device 100 and a display connected via parallel interface I/O 192. In some instances, sensor 132 is not equally sensitive to each of the color components. To compensate for the different sensitivity, and to emulate the human eye adjustment to different lighting conditions, the captured image undergoes a white-balance correction.

The coefficients of the color correction are combined into a single matrix, and the corrected R'G'B' values per pixel are calculated according to the following equations:

R'=CR1*R+CR2*G+CR3*B+Roffset

G'=CG1*R+CG2*G+CG3*B+Goffset

B'=CB1*R+CB2*G+CB3*B+Boffset

In addition, Gamma Correction LUT 1150 is used to gamma correct the various pixels. In one embodiment, Gamma correction LUT 1150 includes 512 entries, where each entry is a nine-bit value. The data for Gamma correction LUT 1150 is loaded to RAM within imaging device 100.

Gamma correction LUT 1150 receives a color component value from color correction block 1140, and uses the value as an address to access the LUT stored in RAM. The value obtained from the LUT at the addressed location is stored until all three color components are received. Then, the three color components are passed together to RGB-to-YUV block 1160.

In YUV to 4:2:2 conversion block 1170, an input of an array of pixels, each with its own R, G and B values is reconstructed into an image of YUV 4:2:2 values. The result is then passed to parallel interface 190. The process involves an interim conversion to a Y-Cr-Cb (4:4:4) format. The Y-Cr-Cb (4:4:4) is calculated as follows: R'G'B' are given at an 8-bit accuracy, in the range of 0-255, Y is limited to the range of 16-235, and Cr and Cb are limited to the range of 16-240. Then, the following equations are used to complete the conversion:

Y=0.257R'+0.504G'+0.098B'+16

Cb=−0.148R'−0.291G'+0.439B'+128

Cr=0.439R'−0.368G'−0.071B'+128

The coefficients are loaded in {s,0.8} format, eight-bits of a fraction value, without integer bits, but with a single sign bit. In the same manner, YUV can be calculated, without the clamping. The multiply coefficients are programmable. The offset for the luminance can be enabled or disabled. When offset is enabled, the value of sixteen is used as offset for the luminance. The chrominance offset is fixed at one-hundred, twenty eight.

Figure 25:
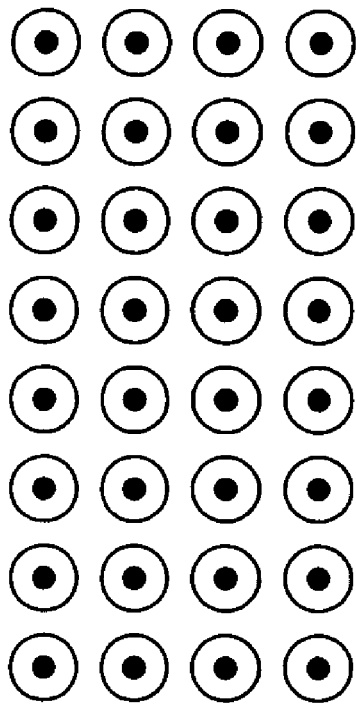
FIG. 25 illustrates the placement of color components by the translation unit of FIG. 24.
Figure 25:
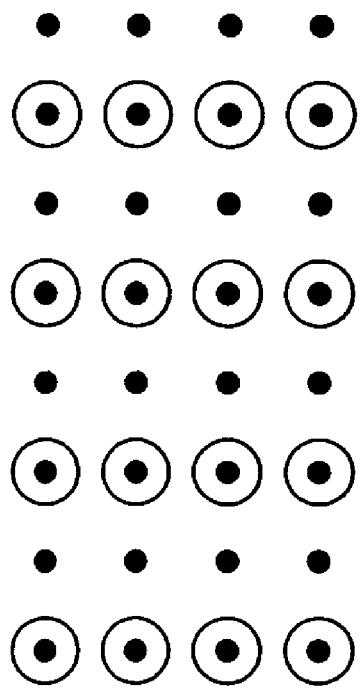

The twenty-four bit YUV value per each pixel (Y-Cr-Cb 4:4:4), is down-sampled to a YUV 4:2:2 format. To do this, the Y value for each pixel is retained, but each pair of consecutive luminance values ($Y_{2n}$ and $y_{2n+1}$, n=0,1,2 ...) share a pair of Cb and Cr values. The placement of the Chrominance pair is on the even numbered pixel. FIG. 25 illustrates this down-sampling process.

The color components of the odd number pixels are zeroed out, while the color components of the even numbered pixels are calculated as follows:

For first pixel in line:

Cx'[0]=Cx[0](x is either r or b)

For subsequent pixels in the line:

For n=1 to n, n is equal to (N/2−1), N is the line length tmp[2n]=(Cx[2n−1])+2*(Cx[2n])+(Cx[2n+1])(x is either r or b)

The result is rounded up and divided by 4:

Cx'[2n]=¼(tmp[2n]+2) (x is either r or b)

Table 14 provides a summary of calculations performed by translation unit 150 as previously discussed.

TABLE 13

Calculation Summary

|  | Var | Formula | Accur. | Remarks |
|---|---|---|---|---|
| Input from imaging unit 130 | C | C are the Bayer grid outputs | 10 bits | unsigned |
| Faulty correction | C1 | C1 = C if not faulty, replacement value if faulty | 10 bits | unsigned |
| RGB per pel | C2 | C2 = (C1 + C1 + 1)/2 | 10 bits | Average and round up |
|  | C10 | C10 = C2 or C1 | 10 bits | unsigned |
| Color correction | C20 | Color correction coefficient | 8 bits + sign | 8 bits value, 1 bit sign |
|  | C21 | C21 = C20 * C10 | 19 bits | 18 bits magnitude, 1 bit sign [1, 18], |
|  | C22 | C22 = C21r + C21b + C21g | 21 bits | 21 bits 2's comp [1, 20] |
|  | Toff | Truncation parameter | 4 bits | Values 0 to 10 |
|  | C23 | C23 = truncated C22 C23 = {sign-ext, C22[20:t]} | 21 bits | Programmable truncation [t − 1:0] lsbits truncated, |
|  | Coff | Offset for Color correction | 8 bits + sign | 8 bits value, 1 bit sign |
|  | C24 | C24 = (C23 + Coff * 2 + 1)/2 | 21 bits | offset, round up (add 1) ignore lsbit, limit. Lower limit 0 or 16 |

TABLE 13-continued

Calculation Summary

| | Var | Formula | Accur. | Remarks |
|---|---|---|---|---|
| | C25 | C25 = limited C24 | 9 bits | Loadable Upper limit (0, 511 for color correction) select bits [10:1] |
| Gamma correction | C30 | C30 = LUT[C25] | 9 bits | |
| RGB to YUV | Y20 | Format conversion coefficient | 8 bits + sign | 8 bits value, 1 bit sign |
| | Y21 | Y21 = Y20 * C30 | 19 bits | 18 bits magnitude, 1 bit sign [1, 18], |
| | Y22 | Y22 = Y21r + Y21b + Y21g | 21 bits | 21 bits 2's comp [1, 20] |
| | Toff | Truncation parameter | 4 bits | Values 0 to 10 (fixed to 8) |
| | Y23 | Y23 = truncated Y22 Y23 = {sign-ext, Y22[20:8]} | 21 bits | Programmable truncation 8 lsbits truncated |
| | Yoff | Offset for conversion | 8 bits + sign | 8 bits value, 1 bit sign |
| | Y24 | Y24 = (Y23 + Yoff * 2 + 1)/2 | 21 bits | offset, round up (add 1) ignore lsbit, limit. Lower limit 0 or 16 Loadable Upper limit 235/255 for Y 240/255 for U/V |
| | Y25 | Y25 = limited Y24 | 8 bits | select bits [9:1] |
| 4:4:4 to 4:2:2 | Yout | Yout = Y25 | 8 bits | |
| | Ctmp | Ctmp = (Yn − 1 + Yn * 2 + Yn + 1) | 10 bits | |
| | Cout | Cout = (Ctmp[9:1] + 1)/2 | 8 bits | |

In addition, translation unit 150 collects a number of statistics during the previously discussed translations and calculations. At the end of processing of a frame data, the resulting statistics are checked, and the different registers that control the correction algorithms are updated according to the results. The different statistics checked by the various statistics blocks including white balance block 1180, exposure statistics block 1185, and G-line-sum block 1190. The various statistics checked can include, but are not limited to, white balance, exposure, minimum and maximum per color, and flicker.

Exposure statistics are determined by evaluating green Bayer pixels or Y output data from translation unit 150. The evaluation results in an eight-bit histogram. There are eight seventeen-bit registers, each holding the number of pixels whose Y or Bayer value falls within the range that is defined for that bin (ten-bit Bayer components are divided by 4 before sorting). At the end of a frame processing, programmable processing core 112 reads the histogram results and calculates the exposure, offset and gain parameters for the following frames. Table 5 lists the eight bins into which the values are assigned to create the eight bit histogram.

TABLE 5

Exposure Histogram Bins

| Bin Number | Range |
|---|---|
| Bin #0 | 0–31 |
| Bin #1 | 32–63 |
| Bin #2 | 64–95 |
| Bin #3 | 96–127 |
| Bin #4 | 128–159 |
| Bin #5 | 160–191 |
| Bin #6 | 192–223 |
| Bin #7 | 224–239 |

In addition, the statistics blocks of translation unit 150 detect the minimum and maximum value per each color, on the output of the Bayer-to-RGB conversion block 1110. The results can be read from registers by programmable processing core 112 at the end of the frame processing.

Further, flicker detection can be performed using the statistics blocks of translation unit 150. Flickering can be caused by a mismatch between the frequency of light impinging upon a detected image, and the frequency at which the detected image is sampled. The effect of flickering is a modulation of the image information along the rows of pixel array 700 (or down the columns, in some embodiments). One way to eliminate flickering, the frequency at which the detected image is sample can be adjusted to coincide with the frequency of the light impinging upon the image. In one embodiment of the present invention, an estimate of the impinging light is calculated, and the sample frequency is adjusted automatically. In some embodiments, to obtain an estimation of the impinging frequency with high confidence, a uniform image is captured, thus avoiding detection of modulation in the image itself. However, in other embodiments, any image is captured and flickering is automatically detected and corrected.

Figure 26:
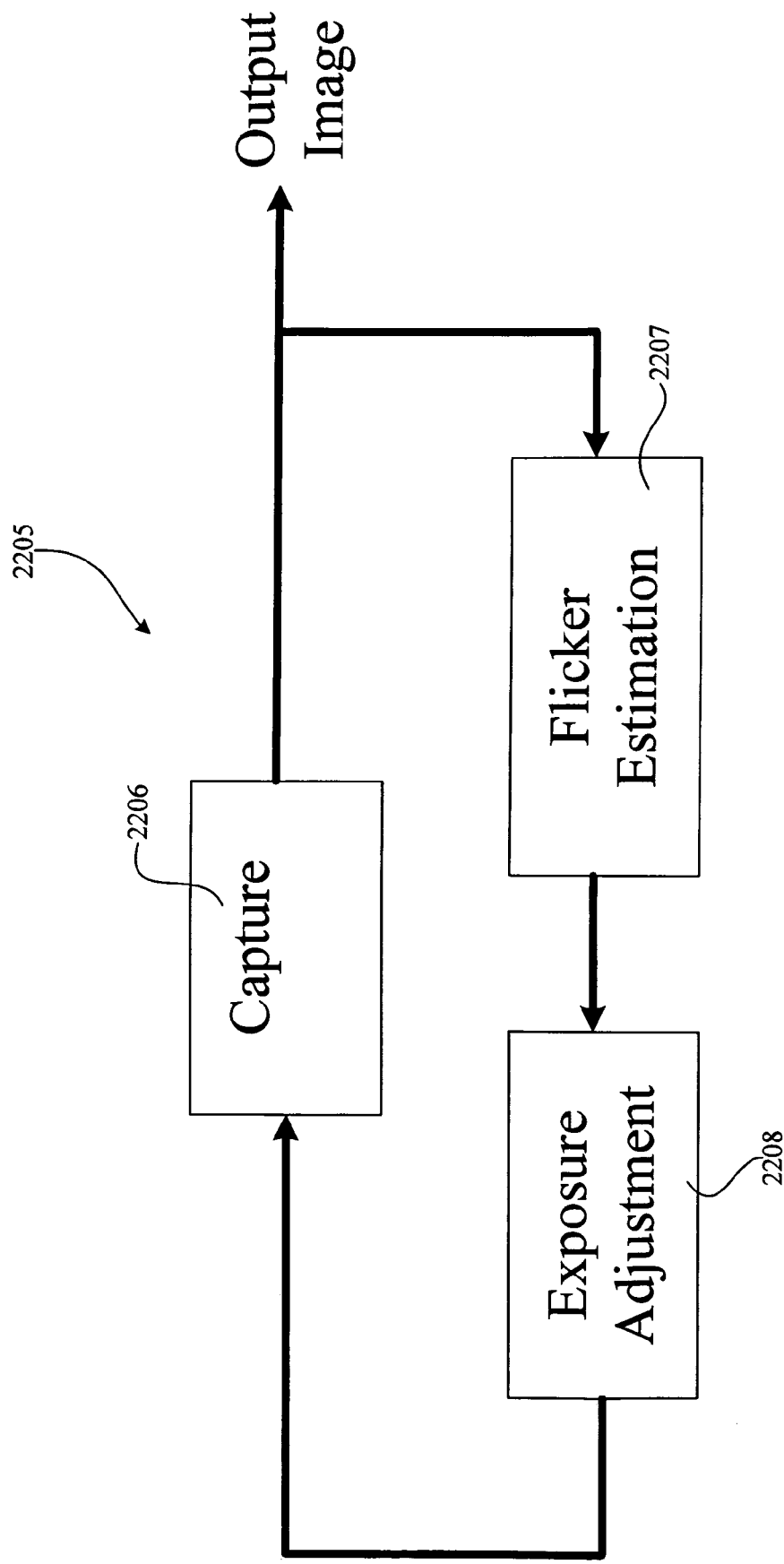
FIG. 26 is a block diagram of a flicker detection and/or correction block in accordance with embodiments of the present invention.

FIG. 26 is a flow diagram of such a flicker correction system 2205 in accordance with embodiments of the present invention. Flicker correction system 2205 includes a feedback loop for automatically adjusting exposure to reduce flicker. Flicker correction system 2205 includes capturing an image (block 2206) and outputting the captured image. As is evident from the preceding discussion, the image is captured by sensor 132 and provided to translation unit 150 via ADC 134. The captured image received from ADC 134 is processed to determine if flickering is evident (block 2207). Then, the exposure is adjusted to account for any detected flickering (block 2208). Using the adjusted exposure parameters, the image is again captured and the adjustment process performed again. In some embodiments, this process can be completed for one or more frames of the image. This use of additional image information provides for more accurate detection and correction. Further, such an iterative approach allows for continuous monitoring of flicker conditions. In other embodiments, however, flicker detection and correction is only infrequently performed, rather than continuously. In addition, in some embodiments, the process may adjust exposure duration in order to emphasize flicker artifacts and thereby increase the probability of correct detection and/or reduce estimation time. Such an approach can include a manual adjustment whereby a user adjusts the capture frequency until the user detects a noticeable flicker. After that, the flicker is automatically detected and corrected. Alternatively, the adjustment creating the noticeable flicker can be automatically performed, and subsequently corrected.

Alternatively, a fully passive mode of operation is also possible. In such a fully passive mode, exposure time is not altered by flicker detection mechanism until the estimation is completed. Further, such adjustments to the exposure time can be limited to multiples of a detected flicker period. In passive mode of operation the exposure adjustments can be introduced by other parts of the system including, for example, exposure selection sections that provide enough information for successful estimation of flicker frequency A light source, I(t), illuminating an image can have a flickering component at a frequency f that can be modeled the following way:

$$I(t) = a \cdot \cos(2\pi f t + \phi) + b,$$

where a, b and $\phi$ are constants. R(n,m) is defined to be a image reflectance function that corresponds to a pixel at location (n,m) of pixel array 700. Using these definitions, the light impinging upon pixel (n,m) is given by:

$$S(n, m, t) = R(n, m) \cdot I(t)$$
$$= b \cdot R(n, m) + a \cdot R(n, m) \cdot \cos(2\pi f t + \varphi).$$

Thus, when an image is captured with exposure duration T, the value of the pixel (n,m) will be proportional to the following value:

$$S(n, m) = \int_{n\Delta}^{n\Delta+T} S(n, m, t) dt$$
$$= R(n, m) \cdot \int_{n\Delta}^{n\Delta+T} I(t) dt,$$

where $\Delta$ is the time period between sampling of two adjacent rows in pixel array 700. The integration of the incident light produces:

$$\int_{n\Delta}^{n\Delta+T} I(t) dt = b \cdot T + \frac{a}{2\pi f}[\sin(2\pi f(n\Delta + T) + \varphi) - \sin(2\pi f n\Delta + \varphi)]$$
$$= b \cdot T + \left[\frac{a}{\pi f}\sin(\pi f T)\right] \cdot \cos\left(2\pi f \Delta n + \pi f T + \frac{\varphi}{2}\right)$$
$$= b \cdot T + a' \cdot \cos(2\pi f' n + \varphi'),,$$

where $$f' = f \cdot \Delta$$
$$a' \equiv \frac{a}{\pi f}\sin(\pi f T)$$
$$\varphi' \equiv \pi f T + \frac{\varphi}{2}.$$

Substituting this result provides:

$$S(n,m) = R(n,m) \cdot b \cdot T + R(n,m) \cdot a' \cdot \cos(2\pi f' n + \varphi').$$

Thus, the resultant signal from pixel (n,m) consists of two components. The first component, $R(n,m) \cdot b \cdot T$, does not cause flickering artifacts; whereas, the second component can change intensity across rows of pixel array 700. However, as illustrated by the preceding equation, when a' equals zero, no flickering exists. Therefore, since a' is a function of exposure duration, it is possible to select such exposure duration that a' will vanish. Said another way, in some embodiments of the present invention, the flicker frequency is detected, and based on the detected frequency, the exposure time of pixel array 700 is adjusted to reduce flicker. To do this, T is selected to satisfy the following constraint:

$$f \cdot T = k, k = \ldots, -2, -1, 0, 1, 2.$$

To detect the frequency components of the S(n,m), columns of each row are summed up to produce row averaged image S(n), where S(n) is described by the following equation:

$$S(n) = \sum_{m=0}^{M-1} S(n, m)$$
$$= (b \cdot T + a' \cdot \cos(2\pi f' n + \varphi'))\sum_{m=0}^{M-1} R(n, m)$$
$$= R(n) \cdot b \cdot T + R(n) \cdot a' \cdot \cos(2\pi f' n + \varphi').$$

In some embodiments, such a summation is performed by a hardware summing circuit within translation unit 150 where the green and/or any other Bayer components for each row of pixel array 700 are summed. At the end of each row, an eighteen-bit value is sent to memory 118 of control unit 110 using a direct memory access via control bus 101. This same process is repeated for each row of pixel array 700, with each sum being stored to memory 118. Alternatively, in other embodiments, such summing can be accomplished using programmable processor core 112.

In some embodiments of the present invention, all rows and pixel values therein are summed. In other embodiments, only a subset of rows including all pixel values therein are summed, while in yet other embodiments, all rows, but only a subset of pixel therein are summed. In yet another embodiment, a subset of the rows and a subset of the pixels therein are summed.

Figure 27:
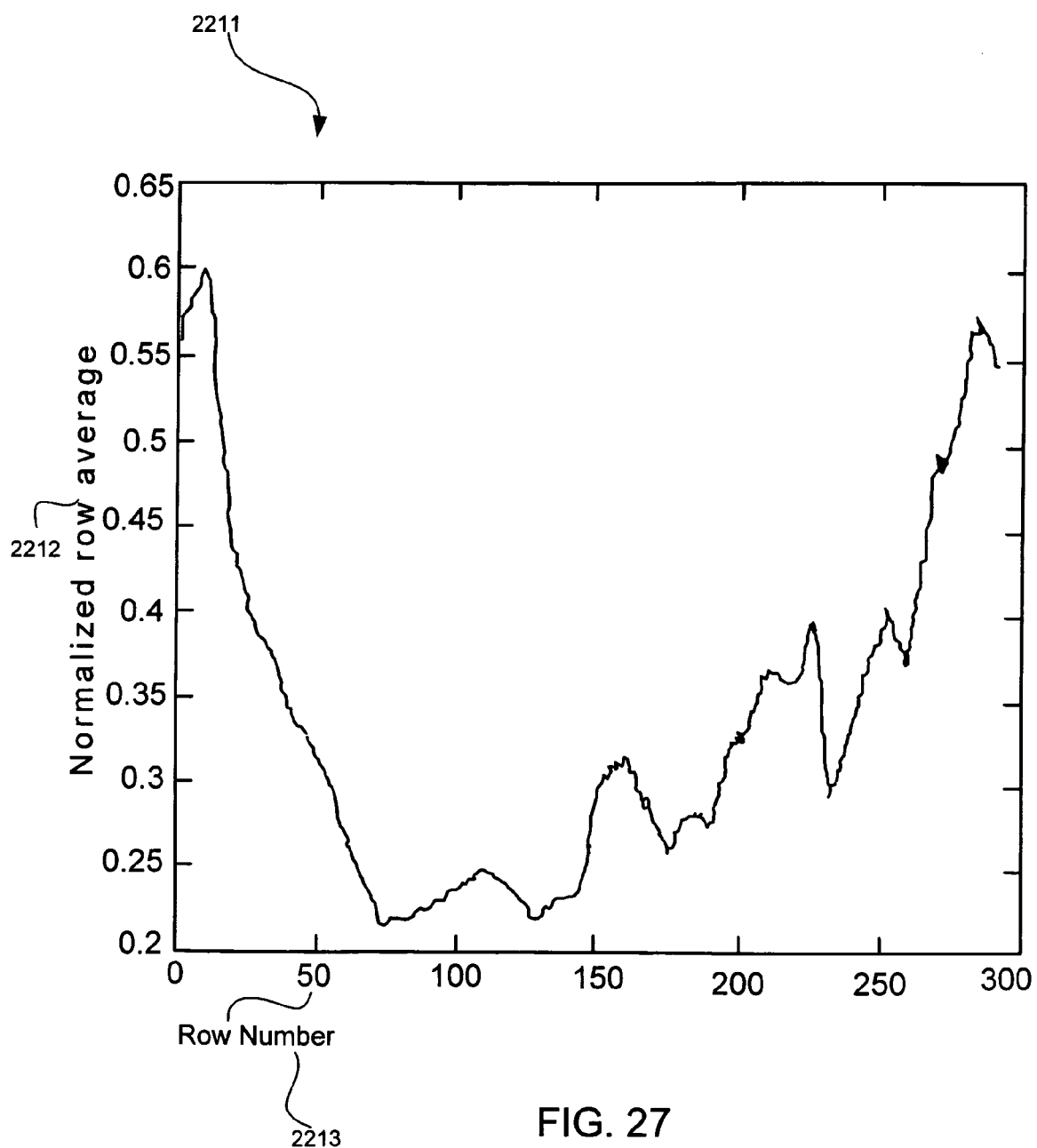
FIG. 27 is a graph illustrating an exemplary row average across a frame of data.

From these sum values, S(n) is spectrally analyzed using software executed by programmable processing core 112 to detect the presence of energy corresponding to potential flickering frequency. FIG. 27 illustrates a graph 2211 of a typical row average. More particularly, graph 2211 is a plot of the normalized row average 2212 verses the row number 2213 for an image detected by pixel array 700. Various spectral analysis techniques can be used on the sum information to determine a flicker frequency, if any flicker is apparent. For purposes of illustration, operation of flicker detection system 2205 is discussed in relation to a Fourier analysis.

More particularly, two energy values, $E_1$ and $E_2$, are determined using the sum data. The two values are calculated as follows:

$$E_i = \frac{\|F\{S(n)\}\|_{f=f_i\Delta}}{\|F\{S(n)\}\|_{f=0}}$$

$$= \frac{\left|\sum_{n=0}^{N-1} S(n) \cdot e^{-2\pi f_i \Delta n}\right|}{\sum_{n=0}^{N-1} S(n)}$$

$$= \frac{\left|\sum_{n=0}^{N-1} S(n) \cdot \cos(2\pi f_i \Delta n)\right| + \left|\sum_{n=0}^{N-1} S(n) \cdot \sin(2\pi f_i \Delta n)\right|}{\sum_{n=0}^{N-1} S(n)}.$$

In some embodiments, a simple comparison between the energy values $E_1$ and $E_2$ is used to provide an estimation of the flicker frequency. Such estimations, however, can prove unreliable when any ordinary image is the source of the sum information rather than a controlled, constant image. Thus, in various embodiments, a more reliable estimation of the flicker frequency is obtained by calculating a set of $E_1$ and $E_2$ pairs across various frames detected by pixel array 700, and comparing the variance of $E_1$ and $E_2$.

This approach provides a number of sampling points across various images and, thus, a more robust estimation of the flicker frequency. Improvement results because there is likely a different phase of the illumination for each frame, which provides various modulations of R(n). After calculation of $E_1$ and $E_2$, corresponding to two possible flickering frequencies, the energy of the present flickering will vary depending on the phase; whereas the energy of the other frequency which depends on the R(n) only, will remain almost the same for all frames. Therefore, the comparison between the standard deviation of $E_1$ and $E_2$ produces reliable results. This procedure is presented in more detail below based on the following definition of variance:

$$V_i = \frac{1}{K}\sum_{k=0}^{K-1}(E_i^k)^2 - \left(\frac{1}{K}\sum_{k=0}^{K-1} E_i^k\right)^2,$$

where K is the number of frames that were captured and $E_i^k$ is the energy value corresponding to frequency $f_i$ of the k-th image. To improve the performance, frames can be captured at two or more different exposures that each exhibit flickering. As an example, the following equation describes exposure times creating such a dual flicker:

$$T = \left(l + \frac{1}{2}\right) \cdot \frac{1}{f_i}, i = 1, 2; l = 0, 1, 2, \ldots$$

When both $V_1$ and $V_2$ are below some predefined threshold, no flickering has been detected. Otherwise, the estimated flickering frequency is the frequency that produced larger $V_i$.

Figure 28:
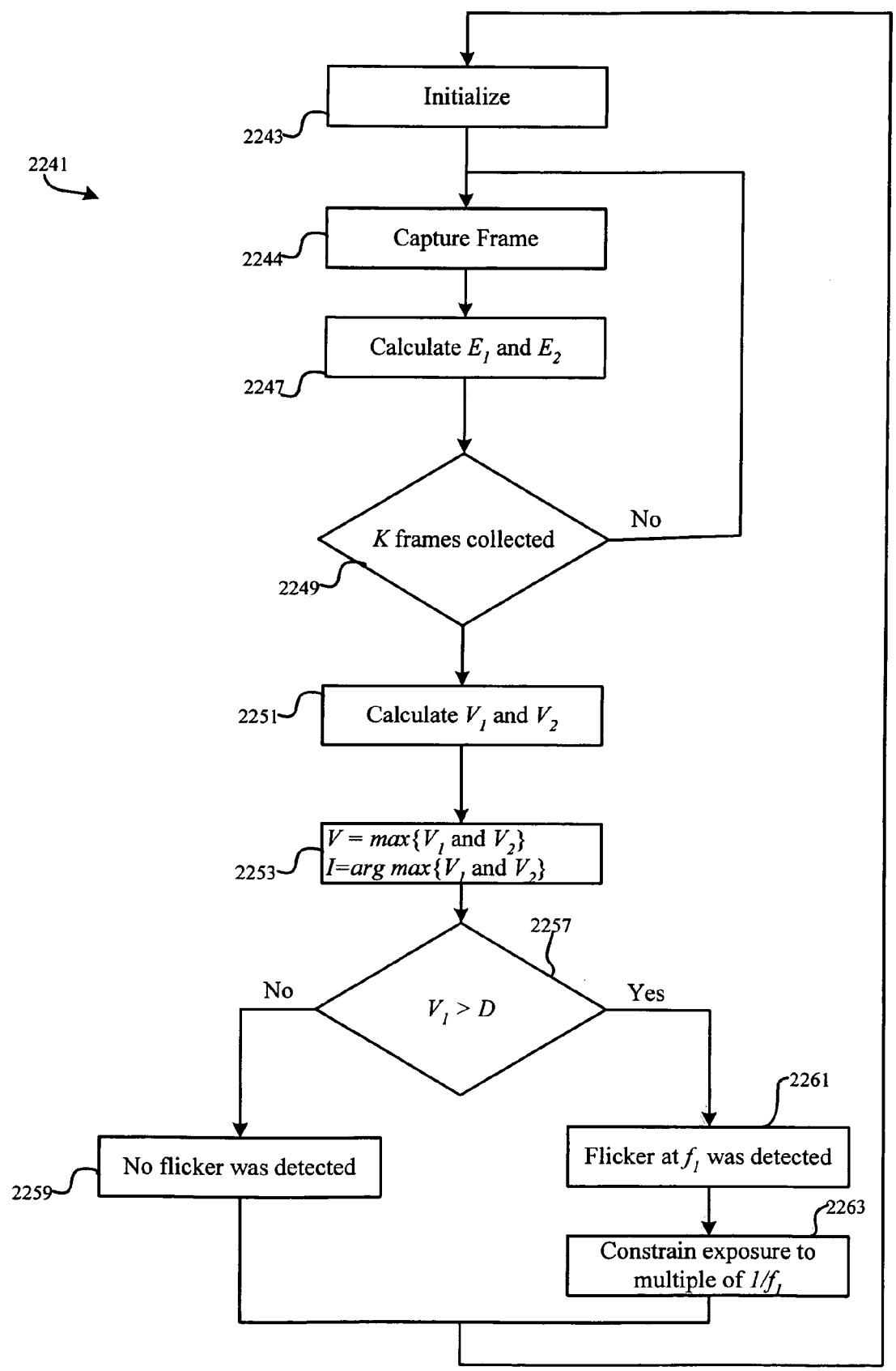
FIG. 28 is a flow diagram of a first method for detecting and/or correcting flicker in accordance with embodiments of the present invention.

FIG. 28 illustrates a flow diagram 2241 of a method for detecting and correcting flicker in accordance with the present invention. Following flow diagram 2241, a frame is captured from pixel array 700 (block 2243). The lines of the frame are summed, and $E_1$ and $E_2$ are calculated as previously described (block 2247). Next, it is determined if a sufficient amount of information has been gathered to make a reliable determination of flicker frequency (block 2249). In one embodiment, satisfactory results were obtained when seventeen frames of data are obtained before determining the flicker frequency. If not, more information is gathered by processing additional frames. Alternatively, where sufficient information has been gathered, $V_1$ and $V_2$ are calculated using the gathered information (block 2251). The determined variance value is set equal to the maximum of $V_1$ and $V_2$, and the frequency is set to the frequency $f_i$ at which the maximum variance was detected (block 2253).

Where the determined variance is less than a predefined threshold level D (block 2257), it is determined that no flicker is detected (block 2259), and the process is repeated to detect a change in conditions that results in flicker. Alternatively, where the determined variance is greater than the a predefined threshold level D (block 2257), a flicker frequency of $f_i$ is detected (block 2261) and the exposure duration is constrained to a multiple of $1/f_i$ (block 2263) to correct the detected flicker.

In some embodiments, the previously described approach is simplified to reduce computational complexity. More particularly, instead of calculating the exact Fourier component, it is replaced by an approximation of the energy value according to the following equation:

$$\hat{E}_i = \frac{\left|\sum_{n=0}^{N-1} S(n) \cdot SC(2\pi f_i \Delta n)\right| + \left|\sum_{n=0}^{N-1} S(n) \cdot SS(2\pi f_i \Delta n)\right|}{\sum_{n=0}^{N-1} S(n)},$$

where $$SC(x) = \text{sign}(\cos(x)) = \begin{cases} 1, & -\frac{\pi}{2} \leq x \leq \frac{\pi}{2} \\ -1, & \frac{\pi}{2} \leq x \leq \frac{3\pi}{2} \end{cases}$$

and $$SS(x) = \text{sign}(\sin(x)) = \begin{cases} 1, & 0 \leq x \leq \pi \\ -1, & \pi \leq x \leq 2\pi. \end{cases}$$

However, such a computational reduction can cause degradation in frequency estimation performance. Nevertheless, even after such degradation, satisfactory results of flicker detection and correction can be obtained. Moreover, in some embodiments, only one of the components is used during the estimation process. Such an approach results in insignificant performance degradation which may be overcome by increasing number of considered frames K.

In yet other embodiments where greater confidence in the estimated flickering frequency is desired, a more complex approach is utilized. In such approaches, various measures of confidence can be implemented to prevent frequency switches (block 2263) when an incorrect estimate of flicker frequency is detected. Further, in some embodiments, residual flickering (i.e. flickering due to slight variance around the flickering frequency) can be eliminated.

More particularly, one such improvement increases the probability of a correct estimation by utilizing more pixel values in the various calculations. Instead of using just a standard deviation of the energy that corresponds to possible flickering frequency to make decision, one may base the estimation on a number, L, of consequent standard deviations. The following equations illustrate such an approach:

$$W_1 = \sum_{l=0}^{L-1} \frac{V_1^l}{V_2^l}$$

$$W_2 = \sum_{l=0}^{L-1} \frac{V_2^l}{V_1^l}$$

$$C_1 = \sum_{l=0}^{L-1} I(V_1^l > V_2^l)$$

$$C_2 = \sum_{l=0}^{L-1} I(V_2^l > V_1^l)$$

$$M = \max_l \left\{ \sum_{k=0}^{K-1} E_1^{k,l} + E_2^{k,l} \right\}$$

where $I(\cdot)$ is an indicator function defined below:

$$I(\text{Condition}) = \begin{cases} 1, & \text{if Condition is true} \\ 0, & \text{otherwise,} \end{cases}$$

and $V_x^l$, $E_x^{k,l}$ denotes the l-th standard deviation and the energy of k-th frame in l-th run, respectively. Note that the total number of frames that should be acquired prior the decision is K·L. The decision is made based on the following set of rules:

1. If M is below a predefined flickerless threshold $D_0$ no flicker artifact was detected.
2. If $W_1 > D_1 \cap C_1 > D_2$, flicker at $f_1$ was detected.
3. If $W_2 > D_1 \cap C_2 > D_2$, flicker at $f_2$ was detected.
4. Otherwise, the information is ambiguous and no decision is taken.

This method reduces drastically the probability of both misdetection and incorrect detection. However, the delay and probability of false alarm are increased, which can be less critical in some applications.

Further, to prevent the situation when occasional wrong frequency estimation changes the exposure to a value that leads to flicker artifact, some embodiments include additional mechanisms to reduce this possibility. One such approach for avoiding this situation includes an additional counter, referred to as a confidence counter. The confidence counter is initialized to zero. Whenever flicker at a first frequency, f1, is estimated the confidence counter is increased by one for each estimation until a limit, B, is reached. If estimated flicker frequency is a second frequency, f2, the confidence counter is decreased by one for each estimation until a limit, negative B, is reached. In a case of ambiguity, no change is made to the confidence counter. When the confidence counter is positive, the global estimation is f1 and exposure is limited to multiple of 1/f1. When the confidence counter is negative, the global estimation is f2 and exposure is limited to multiple of 1/f2. If the confidence counter is zero previous estimation is used. This reduces the possibility of spurious data creating an unstable exposure time.

In some embodiments, flicker artifacts may be removed electronically by varying the gain of certain pixels to accommodate light intensity variations, thereby creating an effective intensity that remains constant. Such embodiments are enabled by estimating flicker frequency and phase and using these estimates to determine which pixel gains to adjust. The frequency may be estimated in previously-described ways. Both frequency and phase may be estimated in ways to be described hereinafter.

The previously-derived formula:

$$S(n,m) = R(n,m) \cdot b \cdot T + R(n,m) \cdot a' \cdot \cos(2\pi f'n + \phi'),$$

may be rearranged as follows:

$$S(n,m) = R(n,m) \cdot [b \cdot T + a' \cdot \cos(2\pi f'n + \phi')].$$

In order to eliminate flicker, the illumination component may be made constant for every pixel in the image as follows:

$$g(n) \cdot [b \cdot T + a' \cdot \cos(2\pi f'n + \phi')] = c,$$

where c is a constant and g(n) is a compensating gain. The value of the constant may be selected in any number of ways. In some embodiments, it is selected to be:

$$c = b \cdot T + a'.$$

This selection preserves picture quality by making the compensating gain always equal to or greater than unity, which prevents incorrectly saturated pixels. Hence, $$g(n) = \frac{b \cdot T + a'}{b \cdot T + a' \cdot \cos(2\pi f'n + \varphi')}, \text{ and}$$

$$S(n, m) = g(n) \cdot R(n, m) \cdot [b \cdot T + a' \cdot \cos(2\pi f'n + \varphi')],$$
$$= R(n, m) \cdot [b \cdot T + a'],$$

where $I' = b \cdot T + a'$ is the effective illumination intensity. In some embodiments, different compensating gains are used to preserve correct color appearance due to possible variations of illumination spectrum with intensity.

Hence, as is apparent from the above formulas, eliminating flicker without constraining the exposure duration becomes a matter of estimating the frequency and phase of the light source. This can be accomplished in any of a number of ways, some of which were described above.

Figure 29:
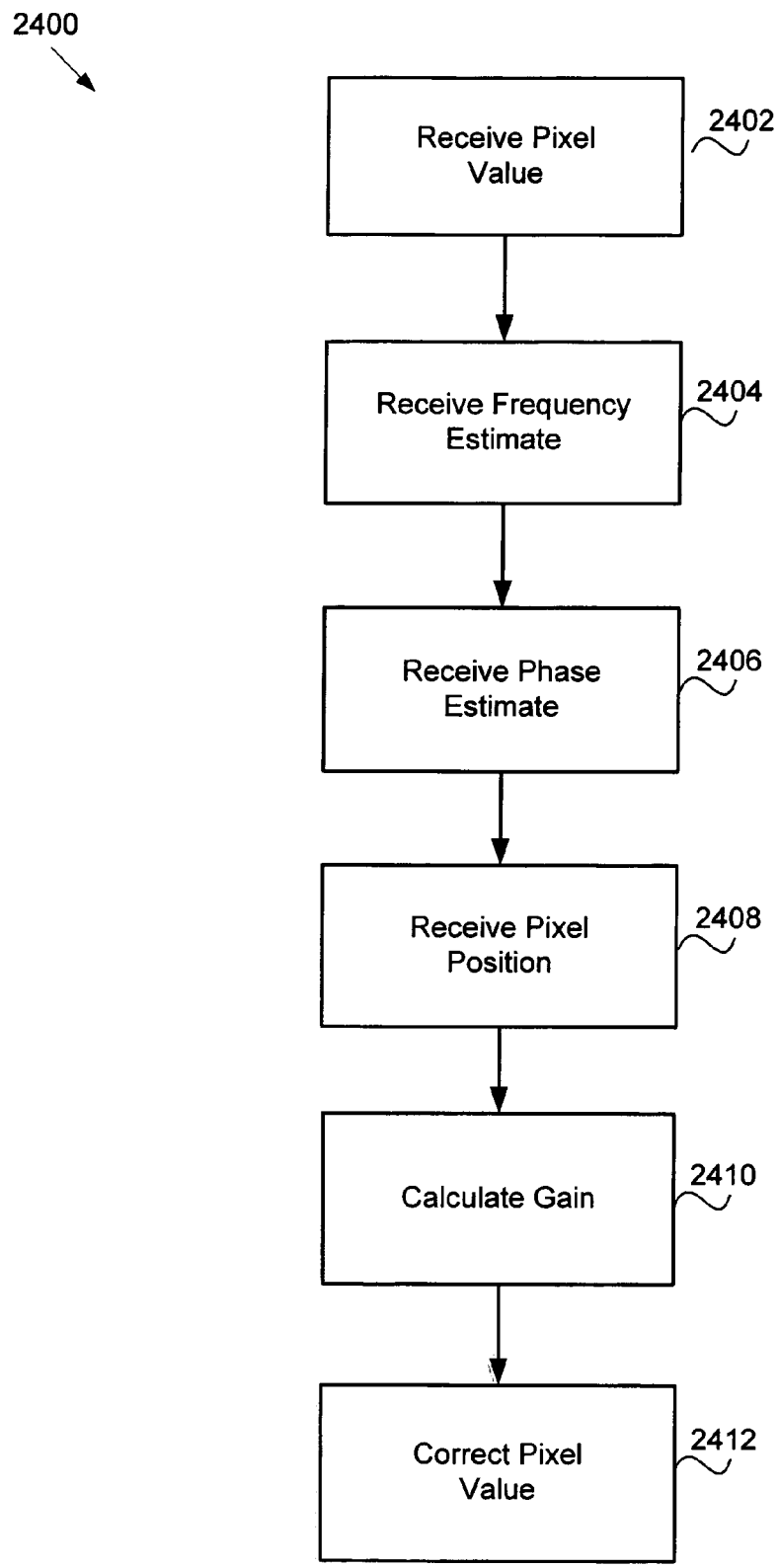
FIG. 29 is a flow diagram of a second method for detecting and/or correcting flicker in accordance with embodiments of the present invention.

Having described electronic flicker elimination embodiments generally, attention is directed to FIG. 29, which illustrates an exemplary method 2400 of electronically eliminating flicker. In this embodiment, flicker is eliminated or reduced "on the fly" by gain-adjusting the pixel value as a function of estimated frequency and phase and the pixel's location.

The method 2400 begins at block 2402 at which location a gain compensating circuit receives the pixel's value. At blocks 2404 and 2406, the frequency and phase estimates are received by the gain compensating circuit. At block 2408, a pixel's position information is received. Although shown as serial operations, this in not necessarily the case. In some embodiments, the gain compensating circuitry receives the frequency estimate, the phase estimate, a pixel's value, and the pixel's position in parallel.

At block 2410, a gain, specific to the pixel, is calculated. The gain is then applied to the pixel's value at block 2412 to determine the pixel's corrected value.

The foregoing method 2400 may be implemented in hardware or software. Further, any of the previously-described methods for estimating frequency and/or phase may be used.

In some embodiments, the light source's frequency and phase offset are determined after an image is captured. Hence, the gain correction technique described above may be accomplished as a post-processing step that may be performed off line. In such embodiment, an initial pixel value may be stored for each pixel of the image, and the pixel values are thereafter analyzed to determine the phase offset. The frequency may be determined before the image is captured, as described previously, or may be determined in post processing as well. Once the phase and frequency are known, a compensating gain for each pixel may be determined and each pixel's value adjusted accordingly as described above.

The foregoing is merely exemplary of the many ways flicker may be reduced and/or eliminated. Those skilled in the art will appreciate other methods in light of the disclosure herein.

Parallel Interface

Parallel interface 190 produces the video output of imaging device 100. parallel interface 190 includes a ten-bit parallel data bus, a vertical frame signal, a clock, and a qualifying signal. Parallel interface 190 can also produce a serial output selectable by programming a register.

When operating in a parallel mode, imaging device 100 outputs a video image in a parallel format. The parallel format includes a clock signal along with data signals and qualifying signals each synchronized to the clock signal. In some embodiments of imaging device 100, the effective edge of the clock signal (i.e., rising or falling edge) is programmable.

The data signals include a ten-bit wide data bus carrying either the Bayer grid data, or the YUV 4:2:2 output data, where the type of data is determined by monitoring a programmed register. The eight-bit YUV data is presented on the most significant data signals (i.e., bits three through ten of the ten-bit bus). On each effective edge of the clock, a single data byte is transferred on the data bus where a horizontal qualifying signal may be asserted. The horizontal qualifying signal is asserted only during valid image data, or to qualify optional start-of-line and end-of-line markers.

Figure 30:
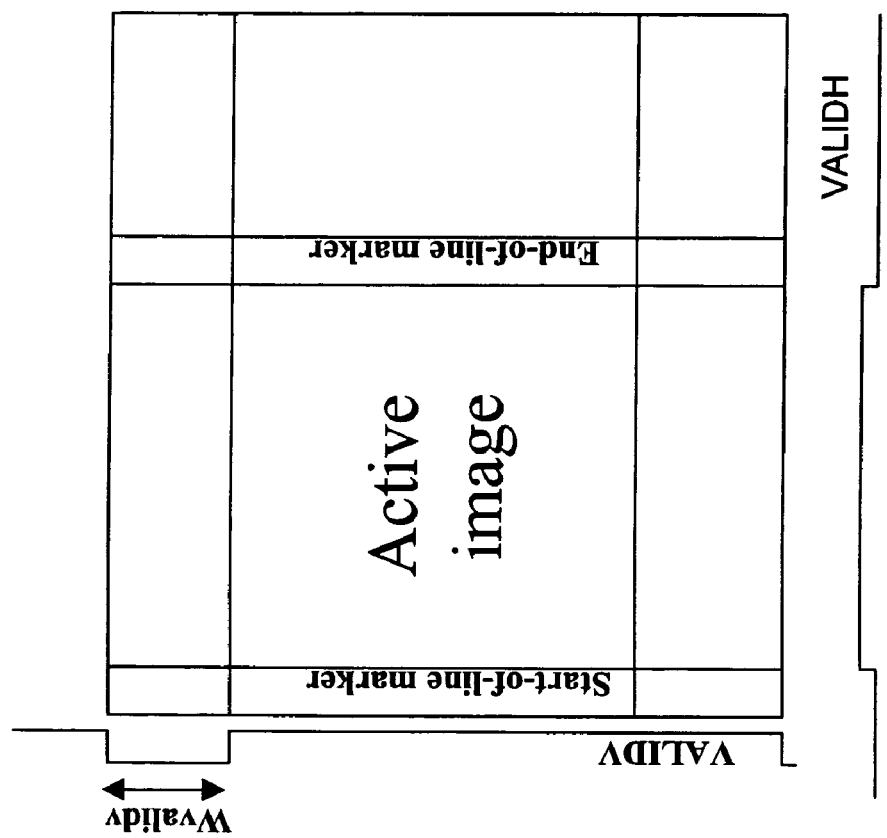
FIG. 30 is a timing/block diagram illustrating the operation of qualification signals used in relation to providing parallel output data from the CMOS imager of FIG. 1.
Figure 31:
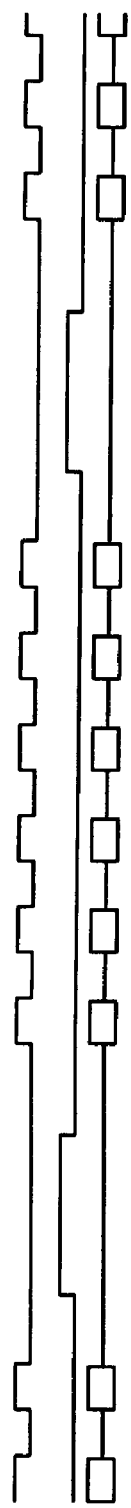
FIG. 31 is a timing diagram illustrating vertical and horizontal qualification signals used in relation to providing parallel output data from the CMOS imager of FIG. 1.
Figure 32:
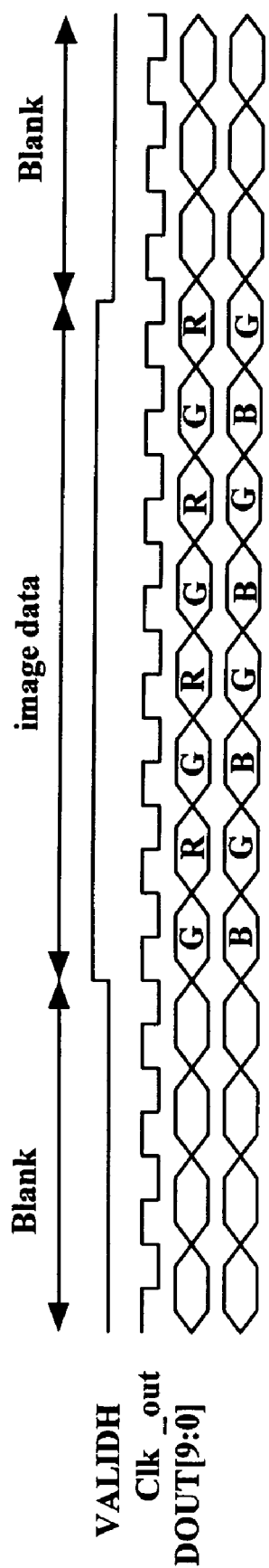
FIG. 32 is a timing diagram illustrating the output of Bayer data via a parallel output interface.
Figure 33:
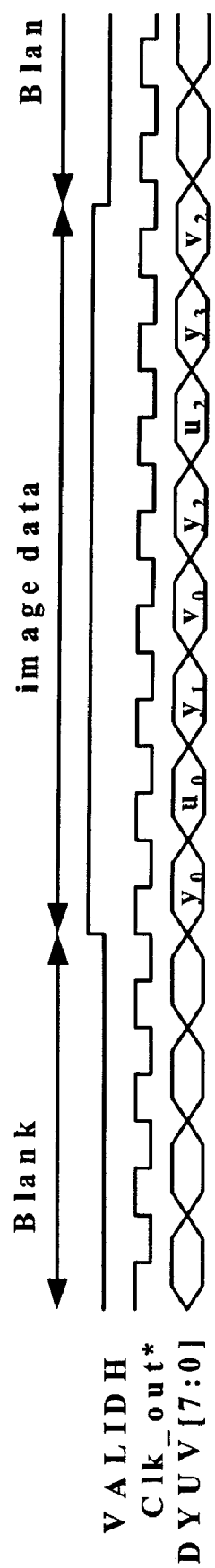
FIG. 33 is a timing diagram illustrating the output of YUV data via a parallel output interface.

A vertical qualifying signal may be asserted on the effective edge of the clock to mark the beginning of the first line in a new image frame. The duration of the vertical qualifying signal is programmable via a register implemented as part of imaging unit 130. FIG. 30 illustrates the vertical qualifying signal, VALIDV, and the horizontal qualifying signal, VALIDH, in relation to a pixel array where the active image portion of the array is designated. As illustrated, VALIDV is a vertical synchronization signal whose effective edge (programmable by setting a register value) marks the beginning of the first line in a new image frame.

Figure 35:
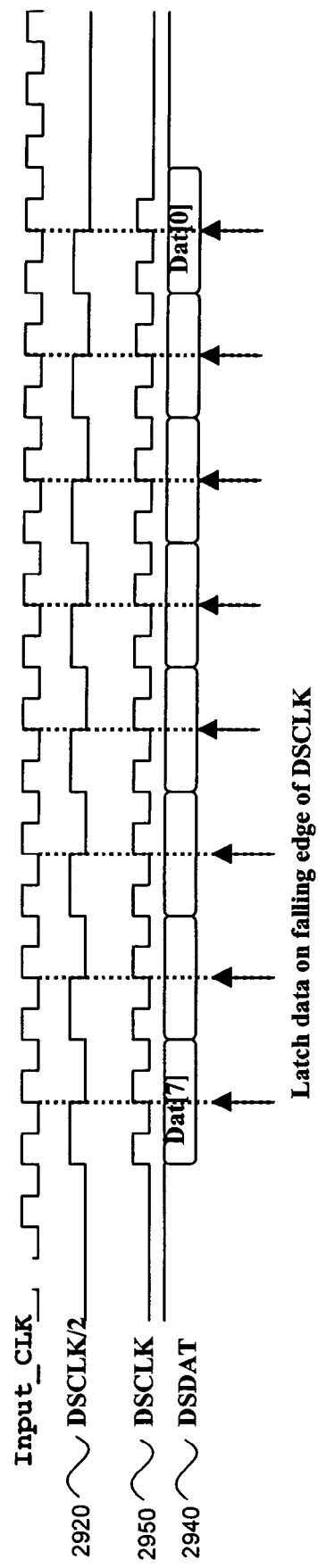
FIG. 35 is a timing diagram illustrating unqualified serial output in accordance with embodiments of the present invention.
Figure 36:
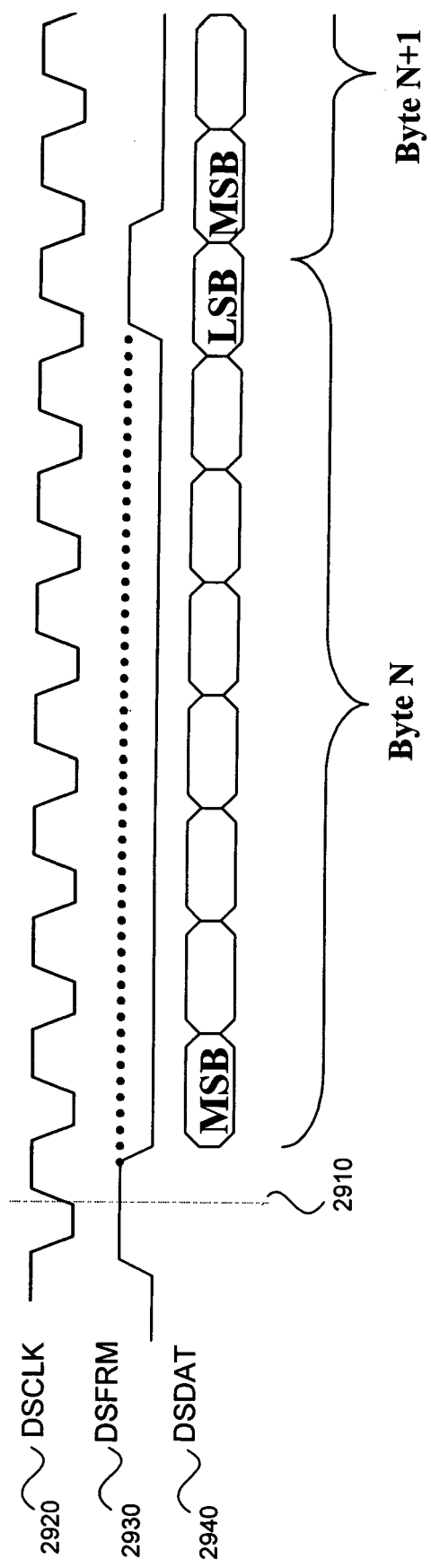
FIG. 36 is a timing diagram illustrating qualified serial output in accordance with embodiments of the present invention.

FIG. 30 illustrates the signals in relation to data signals referred to a valid data, and FIGS. 35 and 36 illustrate a bitwise view of the signals in relation to Bayer and YUV data, respectively. As illustrated, when sending out the data in Bayer-grid format, a "RED" line will always be the first line in the frame. When sending out the data in YUV output format, the order of the color components is programmable via a register value.

Figure 34:
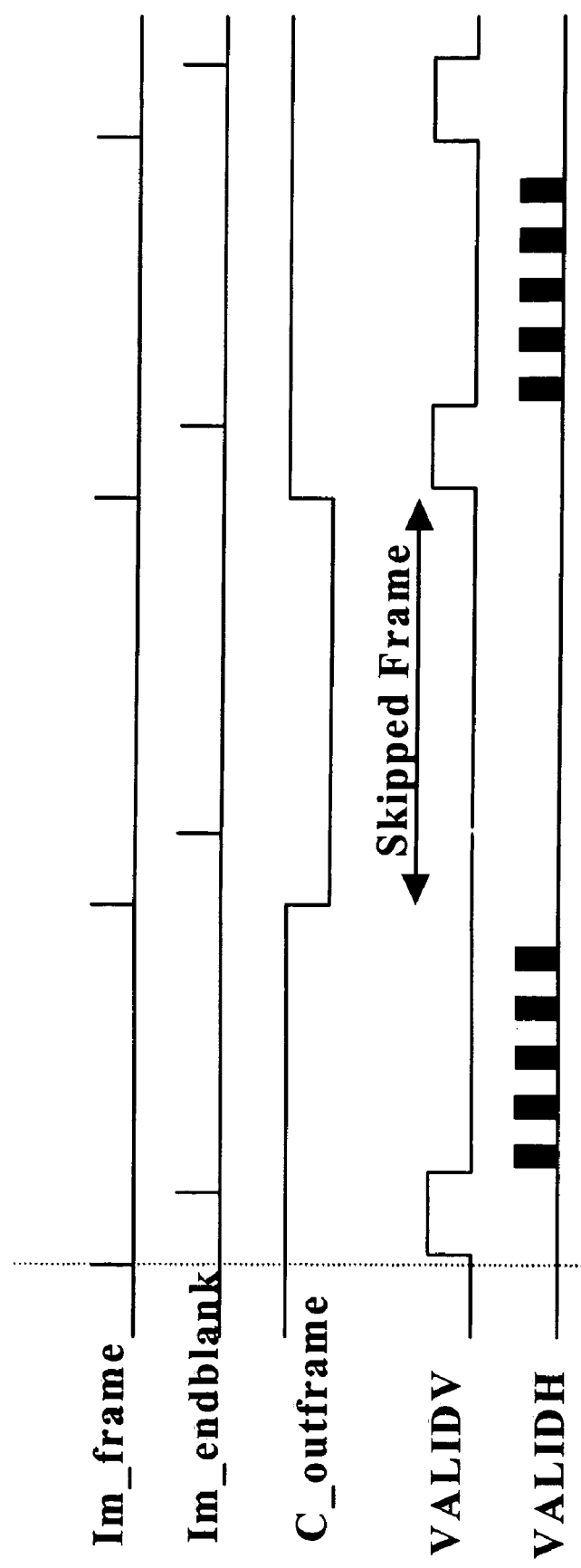
FIG. 34 is a timing diagram illustrating frame dropping.

Control unit 110 controls the frame rate output via parallel interface 190 via a C_outframe signal. Via the signal, control unit 110 enables or disables the output of a full frame. When the signal is deasserted, VALIDH and VALIDV signals are stuck at an inactive state and the data signals hold the background value throughout the disabled frame time. By deasserting C_outframe, a frame of data can be skipped as illustrated in FIG. 34. The type of data output via parallel interface 190 is programmable. When Bayer data is output, the data volume is an 8/9/10 bit word.

If data markers are added, eight more bytes per line must be taken into consideration in the image buffer that is allocated for the application. There are two types of BAYER data lines: red lines and blue lines. Red lines carry green and red Bayer components. The green and red data bytes are interleaved where the even numbered bytes (0, 2 to 2n) are green, and the odd numbered bytes (1,3 to 2n+1) are red. On the other hand, blue lines carry blue and green Bayer components, where the components are interleaved with the even numbered bytes (0, 2 to 2n) being blue, and the odd numbered bytes (1,3 to 2n+1) being green. When sending Bayer data out on parallel interface 190, a red line is the first line in the frame.

When YCrCb 4:2:2 data is output, the data volume is two bytes per pixel and no extra pixels are transmitted beyond the CIF/QCIF size. If data markers are added, eight more bytes per line must be taken into consideration in the image buffer that is allocated for the application. The data in the YCrCb 4:2:2 output format is ordered in several configurations, according to the setting in a programmable color register. The following illustrates four possible color orders:

00—SOL, $Y_0$, $U_0$, $Y_1$, $V_0$, $Y_2$, $U_2$, $Y_3$, $V_3$, to $Y_{n-2}$, $U_{n-2}$, $Y_{n-1}$, $V_{n-2}$, EOL

01—SOL, $Y_0$, $V_0$, $Y_1$, $U_0$, $Y_2$, $V_2$, $Y_3$, $U_3$, to $Y_{n-2}$, $V_{n-2}$, $Y_{n-1}$, $U_{n-2}$, EOL

10—SOL, $U_0$, $Y_0$, $V_0$, $Y_1$, $U_2$, $Y_2$, $V_3$, $Y_3$, to $U_{n-2}$, $Y_{n-2}$, $V_{n-2}$, $Y_{n-1}$, EOL

11—SOL, $V_0$, $Y_0$, $U_0$, $Y_1$, $V_2$, $Y_2$, $U_3$, $Y_3$, to $V_{n-2}$, $Y_{n-2}$, $U_{n-2}$, $Y_{n-1}$, EOL

In some embodiments, extra data markers are inserted at the beginning and end of each image line. This insertion is optional and can be selected via a programmable register. The following are four examples of data marker types:

Start of First Line marker—This marker precedes the data of the first line in a frame.

Start of Line Marker—This marker precedes the data of each line in a frame, except for the first line. When Bayer output mode is selected, bit #5 of the marker content differentiates between a "red" line and a "blue" line (0 and 1 respectively).

End of Last Line Marker—This marker immediately follows the data of the last line in a frame.

End of Line Marker—This marker immediately follows the data of each line in a frame, except for the last line.

In addition to outputting data in a parallel mode, parallel interface 190 can format the data for serial output. The Transmitted data size for serial output mode is eight bits per transmitted "word". Bayer output provides eight bits per pixel, and YUV output is sixteen bits per pixel. The bytes are transmitted with the most significant bits first. During a continuous transfer, the most significant bit of byte N immediately follows the least significant bit of byte N−1.

In some embodiments, imaging device 100 is integrated into systems where the Host is pin limited. For example, in one particular embodiment, the host is a Digital Signal Processor capable of receiving video via a two or three pin interface. In such systems, imaging device 100 can be configured to provide video output via a serial interface. In some embodiments, the serial mode provided by imaging device 100 relies on elements consistent with ITU-RBT.656-4 standard. ITU-RBT.656-4 standard recommendation is available from the International Telecommunication Union, the entirety of which is incorporated herein by reference for all purposes. In one particular embodiment, imaging device 100 can be configured to operate in different serial output modes: a clock-qualify mode and a synchronous serial interface ("SSI") mode. Such functionality provides an ability to function in low cost, reduced pin-count environments.

In contrast to ITU-RBT.656-4 standard, in embodiments of the present invention where data markers are used, the EAV and SAV markers are different. In particular, the second most significant bit (i.e. bit six) of the markers is a special frame marker used to indicate the start of the first line of a frame and the end of the last line of a frame. Further, bit five indicates the Bayer color, where a logical one indicates blue and a logical 0 indicates red.

In the serial output modes, either two or three pins of the thirteen-bit parallel video interface 192 are utilized to output the serial video data. Further, in each of the serial output modes, the frequency of the clock, DSCLK 2920 (FIG. 35), used to output the serial data is eight times ("8x") that of a clock, CLK, used to output parallel video data via parallel video interface 192. In some embodiments, DSCLK 2920 is provided via an external pin to imaging device 100. In such cases, the input clock source is internally divided to provide clocking useful for operating parallel video interface 192 when both parallel and serial video data are being provided from imaging device 100. In other embodiments, an internal phase lock loop is used to generate the various output clocks for use in relation to both the serial and parallel output modes of imaging device 100.

In operation, parallel video data is received from translation unit 150. Where a serial output mode is selected via a programmable register, the parallel data is shifted out via the designated serial pins of parallel video interface 192 using the 8x clock. This shifting occurs by transmitting the most significant bit of any parallel data first and following in succession with bits of decreasing significance.

Clock-qualify mode is a two wire interface with clock and output data signals, DSCLK 2920 and DSDATA 2940. Imaging device 100 acts as a master of the interface. As such, imaging device 100 activates DSCLK 2920 when there is valid data to be sent out via DSDATA 2940. FIG. 35 illustrates the clock-qualify mode where data can be output at two rates represented by DSCLK/2 2950 and DSCLK 2920, both being synchronized to CLK of imaging device 100. As illustrated, DSDATA 2940 is provided by imaging device 100 on the rising edge of DSCLK/2 2950 and latched by the host on the falling edge of DSCLK/2 2950. It should be recognized that twice the transfer rate is possible where the same approach is used in relation to DSCLK 2920. Using the approach, eight bits are transferred from the most significant bit to the least significant bit. In some embodiments, one deasserted cycle of DSCLK 2920 or DSCLK/2 2950 indicates a word boundary, while in other embodiments, word boundaries are contiguous allowing for a continuous transfer of data based on a continuing period of DSCLK 2920 or DSCLK/2 2950.

SSI mode is a three wire interface, with clock (DSCLK 2920), output data (DSDATA 2940) and frame signals (DSFRAME 2930). Imaging device 100 acts as a master of the interface, producing all three signals. FIG. 36 illustrates the operation of SSI mode with DSCLK 2920, DSFRAME 2930, and DSDATA 2940. As illustrated, DSFRAME 2930 is asserted by imaging device 100 prior to a rising edge of DSCLK 2920. The host accepts the asserted DSFRAME 2930 on a rising edge 2910 of DSCLK 2920. On the eight following rising edges of DSCLK 2920, one of the eight bits of a byte transfer are provided by imaging device 100 as DSDATA 2940 to a receiving host. The bits are provided with the most significant bit of the by first followed sequentially by bits of decreasing significance.

Testability Unit

Imaging device 100 can additionally include various mechanisms for performing tests of the device. Using one such mechanism, a built-in-self-test (BIST) is implemented to facilitate production testing of ADC 134 and the various DAC circuitry. The BIST circuit creates a sequence of values that are passed to ADC 134 after application of the gain and two offset parameters as previously discussed. The output from sensor 132. With this value presented to ADC 134, the outputs of ADC 134 is checked against a known output. If the output falls within a programmable tolerance level, imaging device 100 is acceptable. If not, imaging device 100 is rejected.

In addition, a BIST mechanism for sensor 132 is implemented. A minimum and maximum value is defined for each color within sensor 132. Sensor 132 is illuminated by a monochrome color, and the resulting image is tested. The value of each pixel is checked. At the end of the frame, three values can be read per each color. The number of pixels below the minimum value, the number of pixels above the maximum value, and the number of pixels falling within the minimum and maximum values is determined. Additionally, BIST mechanisms are implemented to test various RAMs and registers within imaging device 100 and to return pass or fail results.

The invention has now been described in detail for purposes of clarity and understanding. However, it will be appreciated that certain changes and modifications may be practiced within the scope of the appended claims. Accordingly, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method of capturing an image of a scene, the method comprising:

providing an imaging device having an array of pixels, wherein each pixel is configured to provide a pixel output;

determining a frequency of light produced by a light source illuminating the scene;

capturing an image of the scene using the pixel array, wherein a first capture time for one or more pixels in the array is different from a second capture time of one or more other pixels in the array; and for each pixel in the array:
determining a relative phase of the light with respect to the capture time of the pixel;
determining a compensating gain based on the relative phase of the light and the frequency of the light; and
adjusting the pixel output of the pixel in relation to the compensating gain;

wherein determining a frequency of light produced by a light source illuminating the scene comprises:
capturing an image of a generally uniform scene; and
comparing pixel outputs relating to the captured image to determine a variation between pixel outputs for one or more pixels in the array of pixels.

2. The method of claim 1, wherein the imaging device comprises a CMOS imaging device.

3. The method of claim 1, wherein determining a compensating gain based on the relative phase of the light and the frequency of the light further includes determining a compensating gain based on a color associated with the pixel.

4. A method of capturing an image of a scene, the method comprising:
providing an imaging device having an array of pixels, wherein each pixel is configured to provide a pixel output;
determining a frequency of light produced by a light source illuminating the scene;
capturing an image of the scene using the pixel array, wherein a first capture time for one or more pixels in the array is different from a second capture time of one or more other pixels in the array; and
for each pixel in the array:
determining a relative phase of the light with respect to the capture time of the pixel;
determining a compensating gain based on the relative phase of the light and the frequency of the light; and
adjusting the pixel output of the pixel in relation to the compensating gain;
wherein determining a frequency of light produced by a light source illuminating the scene comprises:
using pixel outputs relating to the captured image to calculate a sum of pixel outputs for a plurality of pixels in a row of pixels;
spectrally analyzing the sum; calculating at least two energy values associated with the sum; and comparing the at least two energy values.

5. An image capture device, comprising:
an array of pixels, wherein each pixel is configured to provide a pixel output; and
a programmable core, wherein the programmable core includes instructions executable by the programmable core to:
determine a frequency of light produced by a light source illuminating a scene;
cause the pixel array to capture an image of the scene, wherein a first capture time for one or more pixels in the array is different from a second capture time of one or more other pixels in the array; and
for each pixel in the array:
determine a relative phase of the light with respect to the capture time of the pixel;
determine a compensating gain based on the relative phase of the light and the frequency of the light; and
adjust the pixel output of the pixel in relation to the compensating gain;
wherein in programming the core to determine a frequency of light produced by a light source illuminating the scene, the instructions program the core to:
capture an image of a generally uniform scene; and
compare pixel outputs relating to the captured image to determine a variation between pixel outputs for one or more pixels in the array of pixels.

6. The image capture device of claim 5, wherein the image capture device comprises a CMOS image capture device.

7. The image capture device of claim 5, wherein in programming the core to determining a compensating gain based on the relative phase of the light and the frequency of the light, the instructions program the core to determine a compensating gain based on a color associated with the pixel.

8. An image capture device, comprising:
an array of pixels, wherein each pixel is configured to provide a pixel output; and
a programmable core, wherein the programmable core includes instructions executable by the programmable core to:
determine a frequency of light produced by a light source illuminating a scene;
cause the pixel array to capture an image of the scene, wherein a first capture time for one or more pixels in the array is different from a second capture time of one or more other pixels in the array; and
for each pixel in the array:
determine a relative phase of the light with respect to the capture time of the pixel;
determine a compensating gain based on the relative phase of the light and the frequency of the light; and
adjust the pixel output of the pixel in relation to the compensating gain
wherein in programming the core to determine a frequency of light produced by a light source illuminating the scene, the instructions program the core to:
use pixel outputs relating to a captured image to calculate a sum of pixel outputs for a plurality of pixels in a row of pixels;
spectrally analyze the sum; calculate at least two energy values associated with the sum; and compare the at least two energy values.

9. An image capture device, comprising:
an array of pixels, wherein each pixel is configured to provide a pixel output;
means for determining a frequency of light produced by a light source illuminating a scene;
means for determining a phase of the light relative to a pixel capture time;
means for determining a compensating gain for each pixel in the array based on the frequency and the phase; and
means for adjusting each pixel's pixel output, during an image capture, in relation to the pixel's compensating gain;
wherein the means for determining a frequency of light produced by a light source illuminating the scene comprises:
means for capturing an image of a generally uniform scene; and means for comparing pixel outputs relating to the captured image to determine a variation between pixel outputs for one or more pixels in the array of pixels.

10. The image capture device of claim 9, wherein the image capture device comprises a CMOS image capture device.

11. The image capture device of claim 9, wherein each pixel of the array includes a plurality of sub-pixels and wherein the image capture device further includes means for determining a compensating gain for each sub-pixel of each pixel.

12. An image capture device, comprising:
an array of pixels, wherein each pixel is configured to provide a pixel output;
means for determining a frequency of light produced by a light source illuminating a scene;

means for determining a phase of the light relative to a pixel capture time;
means for determining a compensating gain for each pixel in the array based on the frequency and the phase; and
means for adjusting each pixel's pixel output, during an image capture, in relation to the pixel's compensating gain;
wherein the means for determining a frequency of light produced by a light source illuminating the scene comprises:

means for using pixel outputs relating to a captured image to calculate a sum of pixel outputs for a plurality of pixels in a row of pixels;
means for spectrally analyzing the sum; means for calculating at least two energy values associated with the sum; and means for comparing the at least two energy values.

* * * * *